US011902871B2

(12) United States Patent
Pellegrini et al.

(10) Patent No.: US 11,902,871 B2
(45) Date of Patent: Feb. 13, 2024

(54) SYSTEMS AND METHODS FOR IDENTIFYING AND ACTIVATING EMERGENCY RESPONSE ASSETS

(71) Applicant: RapidSOS, Inc., New York, NY (US)

(72) Inventors: William Pellegrini, Graham, WA (US); Hirsch Meir King-Berkman, New York City, NY (US); Alexander Morgan Hamlin, San Diego, CA (US); Krishnakumar Unnikrishnan, Brooklyn, NY (US); Jee Yoon Choi, Brooklyn, NY (US); Gabriel Charles Mahoney, Brooklyn, NY (US)

(73) Assignee: RapidSOS, Inc., New York, NY (US)

( * ) Notice: Subject to any disclaimer, the term of this patent is extended or adjusted under 35 U.S.C. 154(b) by 0 days.

(21) Appl. No.: 18/147,123

(22) Filed: Dec. 28, 2022

(65) Prior Publication Data
US 2023/0284004 A1 Sep. 7, 2023

Related U.S. Application Data

(63) Continuation of application No. 17/221,568, filed on Apr. 2, 2021, now Pat. No. 11,570,607.

(60) Provisional application No. 63/005,129, filed on Apr. 3, 2020.

(51) Int. Cl.
H04W 4/90 (2018.01)
H04W 4/021 (2018.01)
G06Q 50/26 (2012.01)
G06F 3/0482 (2013.01)
G06F 3/0484 (2022.01)
G08B 25/10 (2006.01)

(52) U.S. Cl.
CPC ............ H04W 4/90 (2018.02); G06F 3/0482 (2013.01); G06F 3/0484 (2013.01); G06Q 50/265 (2013.01); G08B 25/10 (2013.01); H04W 4/021 (2013.01)

(58) Field of Classification Search
CPC ....... H04W 4/90; H04W 4/021; G06F 3/0482; G06Q 50/265; G08B 25/10
See application file for complete search history.

(56) References Cited

U.S. PATENT DOCUMENTS

2017/0238129 A1* 8/2017 Maier .................. H04W 4/029 455/404.2

* cited by examiner

Primary Examiner — Curtis B Odom
(74) Attorney, Agent, or Firm — Fitch, Even, Tabin & Flannery LLP

(57) ABSTRACT

Described herein are systems, devices, methods, and media for activating emergency response assets in response to emergency alerts.

20 Claims, 29 Drawing Sheets

Nick Of Time 2082 Log Out

Asset Provisioning Interface

New Emergency Response Asset Type

Name 2083A

| Company #1 Connected Buildings |

Source 2083B

| Connected Building Company #1 |

API Call 2083C

| http://company01.com/activate_build.. |

Categories 2083D

| Connected Buildings |

Polygon Color 2083E

| #000000 |

Polygon Opacity 2083F

| 0.5 |

Attributes 2084

| {"address":{"properties":{"street_address":{"data_type":"string","label":"Street Address","required":true},"locality":{"data_type":"string","label":"City","required":true},"state":{"data_type":"string","label":"State","required":true},"postal_code":{"data_type":"string","label":"Postal Code","required":true}}} |

FIG. 20A

SYSTEMS AND METHODS FOR IDENTIFYING AND ACTIVATING EMERGENCY RESPONSE ASSETS

CROSS-REFERENCE

This application is a continuation of U.S. application Ser. No. 17/221,568, filed Apr. 2, 2021, issued as U.S. Pat. No. 11,570,607 on Jan. 31, 2023, which claims the benefit of U.S. Provisional Application No. 63/005,129, filed Apr. 3, 2020, which is hereby incorporated herein by reference in its entirety.

BACKGROUND OF THE INVENTION

A person in an emergency situation may request help using a mobile communication device such as a cell phone to dial a designated emergency number like 9-1-1 or a direct access phone number for the local emergency service provider (e.g. an emergency dispatch center). This call is assigned to one or more first responders by the emergency service provider. However, in various situations, the first responders may be delayed in providing timely assistance at the location of the emergency such as due to distance from the emergency location, inaccurate location, or a lack of available first responders.

SUMMARY OF THE INVENTION

One advantage provided by the systems, servers, devices, methods, and media of the instant application is the ability to identify and activate one or more emergency response assets in the vicinity of an emergency. This allows for emergency assistance to be rendered more promptly in response to an emergency before first responders are able to arrive at the emergency location. The emergency response asset(s) can provide immediate and potentially life-saving aid and/or facilitate the overall emergency response such as by performing triage or gathering more information to provide situational awareness to first responders or dispatchers tasked with responding to the emergency. In various embodiments, an asset management system (AMS) functions to receive a location of an emergency (hereinafter, "emergency location"), retrieve locations of one or more emergency response assets, identify one or more emergency response assets in the vicinity of (e.g., within a threshold distance of) the emergency location, and activate the one or more emergency response assets. The functions of the AMS may be performed entirely by an emergency management system (EMS), an independent asset service provider (ASP), or a combination thereof, as will be discussed in further detail. In some embodiments, the AMS further determines or identifies an availability of the one or more emergency response assets identified as being within the vicinity of the emergency location. The EMS can be in operative communication with a plurality of ASPs that each operate one or more emergency response assets.

Another advantage provided by the systems, servers, devices, methods, and media of the instant application is the ability to gather and relay information regarding one or more emergency response assets to emergency service providers (ESPs; e.g., public safety answering points, fire departments, police departments, paramedics, police officers, etc.). In various embodiments, an emergency management system (EMS) functions to receive information regarding one or more emergency response assets (e.g., whether or not an emergency response asset is within the vicinity of an emergency location and/or the availability of the emergency response asset) from an asset management system (AMS) and transmit the information regarding the one or more emergency response assets to an ESP. In some cases, the EMS serves as a data pipeline between smart devices and systems and ESPs. Aside from conveying information between the devices/ASPs and ESPs, the EMS can also facilitate control or instructions by the ESPs regarding the emergency response assets.

Another advantage provided by the systems, servers, devices, methods, and media of the instant application is the ability to visualize information regarding one or more emergency response assets. In various embodiments, an emergency management system (EMS) provides an emergency response application to emergency service providers (ESPs) that functions to receive information regarding one or more emergency response assets (e.g., whether or not an emergency response asset is within the vicinity of an emergency location and the availability of the emergency response asset) and display the information regarding the one or more emergency response assets within a graphical user interface (GUI) of the emergency response application. In some embodiments, after one or more emergency response assets have been identified as within the vicinity of an emergency location, the emergency response application can display asset controls for activating the one or more emergency response assets. User interactions with the asset controls (e.g., by a call taker at a public safety answering point) can prompt the EMS to employ an asset management system (AMS) to activate the one or more emergency response assets according to the user interactions with the asset controls. In some embodiments, the emergency response application is not provided by the EMS but is communicatively coupled to the EMS.

Disclosed herein, in one aspect, is a computer-implemented method for activating an emergency response asset, comprising: a) identifying an emergency response asset available for an emergency location; b) detecting one or more user interactions with asset controls from an emergency response application executed on a computing device at an emergency service provider (ESP); and c) activating the emergency response asset according to the selection of the asset controls. In some embodiments, identifying the emergency response asset available for the emergency location comprises: a) retrieving a plurality of geofences associated with a plurality of emergency response assets; and b) determining that the emergency location falls within a geofence associated with the emergency response asset from the plurality of emergency response assets. In some embodiments, identifying the emergency response asset available for the emergency location comprises: a) accessing a database comprising a plurality of locations associated with a plurality of emergency response assets, wherein the plurality of locations comprises a location associated with the emergency response asset; and b) determining that the location of the emergency response asset is closest to the emergency location. In some embodiments, the method further comprises, in response to determining that the emergency location falls within the geofence associated with the emergency response asset, providing asset controls to the emergency response asset through a graphical user interface (GUI) of the emergency response application. In some embodiments, providing the asset controls to the emergency response asset within the GUI of the emergency response application further comprises: a) determining an availability of the emergency response asset; and b) transmitting an indication of the availability of the emergency response asset to the ESP for display within the GUI of the emergency response application. In some embodiments, a) the emergency response asset is a smart automatic external defibrillator (AED); and b) activating the emergency response asset comprises activating an alarm on the smart AED. In some embodiments, a) the emergency response asset is a drone; and b) activating the emergency response asset further comprises dispatching the drone to the emergency location. In some embodiments, a) the emergency response asset is a telemedicine vehicle unit; and b) activating the emergency response asset further comprises dispatching the telemedicine vehicle unit to the emergency location. In some embodiments, a) the emergency response asset is provided and managed by an asset service provider (ASP) distinct from the EMS; and b) activating the emergency response asset comprises transmitting a request to the ASP to activate the emergency response asset according to the selection of the asset controls. In some embodiments, activating the emergency response asset further comprises launching a secondary application provided by the ASP on the computing device at the ESP through the emergency response application. In some embodiments, activating the emergency response asset comprises opening a locking mechanism securing the emergency response asset to an enclosure or storage unit. In some embodiments, the method further comprises providing the emergency response application to the ESP, wherein the emergency response application is a web application accessible through a web browser using a URL. In some embodiments, the emergency location is a device-based hybrid location received in an emergency alert from an electronic device. In some embodiments, the emergency alert is generated in response to an emergency call made from the electronic device. In some embodiments, the emergency location is received within an electronic communication from the ESP through the emergency response application. In some embodiments, the method further comprises establishing a persistent communication link between the EMS and the ESP through the emergency response application. In some embodiments, the method further comprises a) retrieving a set of geofences associated with a set of ESPs; b) determining that the emergency location falls within a geofence associated with the ESP; c) in response to determining that the emergency location falls within the geofence associated with the ESP: i) transmitting the emergency location to the emergency response application through the persistent communication link; and ii) displaying an indication of the emergency location within the GUI of the emergency response application. In some embodiments, the method further comprises retrieving the set of geofences associated with the set of emergency response assets in response to receiving selection of the indication of the emergency location within the GUI of the emergency response application. In some embodiments, the method further comprises monitoring the emergency response asset. In some embodiments, monitoring the emergency response asset comprises monitoring at least one of a location, status, or usage of the emergency response asset. In some embodiments, the method further comprises deactivating the emergency response asset. In some embodiments, deactivating the emergency response asset is in response to the emergency response asset being returned to an initial location.

Disclosed herein, in another aspect, is a method for providing access to an emergency response asset to an emergency service provider (ESP) by an emergency management system (EMS), the method comprising: a) receiving an emergency location associated with an emergency alert; b) identifying an emergency response asset available for the emergency location; c) displaying asset controls for the emergency response asset within a graphical user interface (GUI) of an emergency response application executed on a computing device at the ESP; d) detecting one or more user interactions with the asset controls from the ESP through the emergency response application; and e) activating the emergency response asset according to the selection of the asset controls.

Disclosed herein, in another aspect, is a method for providing access to an emergency response asset to an emergency service provider (ESP) by an emergency management system (EMS), the method comprising: a) receiving an emergency location associated with an emergency alert; b) retrieving a set of geofences associated with a set of emergency response assets; c) determining that the emergency location associated with the emergency alert falls within a geofence associated with an emergency response asset from the set of emergency response assets; d) in response to determining that the location associated with the emergency alert falls within the geofence associated with the emergency response asset, displaying asset controls to the emergency response asset within a graphical user interface (GUI) of an emergency response application executed on a computing device at the ESP; e) detecting one or more user interactions with the asset controls from the ESP through the emergency response application; and f) activating the emergency response asset according to the selection of the asset controls.

Disclosed herein, in another aspect, is a method for identifying and activating an emergency response asset, the method comprising: a) receiving an emergency location associated with an emergency alert; b) identifying an emergency response asset available for an emergency location; and c) activating the emergency response asset. In some embodiments, identifying the emergency response asset available for the emergency location comprises: a) retrieving a set of geofences associated with a set of emergency response assets; and b) determining that the emergency location falls within a geofence associated with an emergency response asset from the set of emergency response assets. In some embodiments, a) the emergency response asset is a smart AED; and b) activating the emergency response asset further comprises activating an alarm on the smart AED. In some embodiments, a) the emergency response asset is a drone; and b) activating the emergency response asset further comprises dispatching the drone to the emergency location. In some embodiments, a) the emergency response asset is a telemedicine vehicle unit; and b) activating the emergency response asset further comprises dispatching the telemedicine vehicle unit to the emergency location. In some embodiments, a) the emergency response asset is provided and managed by an asset service provider (ASP) distinct from the EMS; and b) activating the emergency response asset comprises transmitting a request to the ASP to activate the emergency response asset according to the selection of the asset controls. In some embodiments, the emergency location is a device-based hybrid location received in the emergency alert from an electronic device. In some embodiments, the emergency alert is generated in response to an emergency call made from the electronic device. In some embodiments, the emergency location is received within an electronic communication from an emergency service provider (ESP).

Disclosed herein, in another aspect, is an emergency management system comprising a processor, a network element, and a non-transitory computer readable storage medium that stores computer executable instructions that, when executed by the processor, cause the processor to: a) identify an emergency response asset available for an emergency location; b) detect one or more user interactions with asset controls from an emergency response application executed on a computing device at an emergency service provider (ESP); and c) activate the emergency response asset according to the selection of the asset controls. In some embodiments, the instructions further cause the processor to: a) retrieve a plurality of geofences associated with a plurality of emergency response assets; and b) determine that the emergency location falls within a geofence associated with the emergency response asset from the plurality of emergency response assets. In some embodiments, the instructions further cause the processor to: a) access a database comprising a plurality of locations associated with a plurality of emergency response assets, wherein the plurality of locations comprises a location associated with the emergency response asset; and b) determine that the location of the emergency response asset is closest to the emergency location. In some embodiments, the instructions further cause the processor to provide asset controls to the emergency response asset through a graphical user interface (GUI) of the emergency response application in response to determining that the emergency location falls within the geofence associated with the emergency response asset. In some embodiments, the instructions further cause the processor to: a) determine an availability of the emergency response asset; and b) transmit an indication of the availability of the emergency response asset to the ESP for display within the GUI of the emergency response application. In some embodiments, a) the emergency response asset is a smart automatic external defibrillator (AED); and b) activating the emergency response asset comprises activating an alarm on the smart AED In some embodiments, a) the emergency response asset is a drone; and b) activation of the emergency response asset further comprises dispatching the drone to the emergency location. In some embodiments, a) the emergency response asset is a telemedicine vehicle unit; and b) activation of the emergency response asset further comprises dispatching the telemedicine vehicle unit to the emergency location. In some embodiments, a) the emergency response asset is provided and managed by an asset service provider (ASP) distinct from the EMS; and b) activation of the emergency response asset comprises transmitting a request to the ASP to activate the emergency response asset according to the selection of the asset controls. In some embodiments, the instructions further cause the processor to launch a secondary application provided by the ASP on the computing device at the ESP through the emergency response application. In some embodiments, the instructions further cause the processor to open a locking mechanism securing the emergency response asset to an enclosure or storage unit after the emergency response asset is activated. In some embodiments, the instructions further cause the processor to provide the emergency response application to the ESP, wherein the emergency response application is a web application accessible through a web browser using a URL. In some embodiments, the emergency location is a device-based hybrid location received in an emergency alert from an electronic device. In some embodiments, the emergency alert is generated in response to an emergency call made from the electronic device. In some embodiments, the emergency location is received within an electronic communication from the ESP through the emergency response application. In some embodiments, the instructions further cause the processor to establish a persistent communication link between the EMS and the ESP through the emergency response application. In some embodiments, the instructions further cause the processor to: a) retrieve a set of geofences associated with a set of ESPs; b) determine that the emergency location falls within a geofence associated with the ESP; c) in response to determining that the emergency location falls within the geofence associated with the ESP: i) transmit the emergency location to the emergency response application through the persistent communication link; and ii) display an indication of the emergency location within the GUI of the emergency response application. In some embodiments, the instructions further cause the processor to retrieve the set of geofences associated with the set of emergency response assets in response to selection of the indication of the emergency location within the GUI of the emergency response application. In some embodiments, the instructions further cause the processor to monitor the emergency response asset. In some embodiments, the instructions further cause the processor to monitor at least one of a location, status, or usage of the emergency response asset. In some embodiments, the instructions further cause the processor to deactivate the emergency response asset. In some embodiments, the emergency response asset is deactivated in response to the emergency response asset being returned to an initial location.

Disclosed herein, in another aspect, is an emergency management system comprising a processor, a network element, and a non-transitory computer readable storage medium that stores computer executable instructions that, when executed by the processor, cause the processor to: a) receive an emergency location associated with an emergency alert; b) identify an emergency response asset available for the emergency location; c) display asset controls for the emergency response asset within a graphical user interface (GUI) of an emergency response application executed on a computing device at an emergency service provider (ESP); d) detect one or more user interactions with the asset controls from the ESP through the emergency response application; and e) activate the emergency response asset according to the selection of the asset controls.

Disclosed herein, in another aspect, is an emergency management system comprising a processor, a network element, and a non-transitory computer readable storage medium that stores computer executable instructions that, when executed by the processor, cause the processor to: a) receive an emergency location associated with an emergency alert; b) retrieve a set of geofences associated with a set of emergency response assets; c) determine that the emergency location associated with the emergency alert falls within a geofence associated with an emergency response asset from the set of emergency response assets; d) display asset controls to the emergency response asset within a graphical user interface (GUI) of an emergency response application executed on a computing device at the ESP; e) detect one or more user interactions with the asset controls from the ESP through the emergency response application; and f) activate the emergency response asset according to the selection of the asset controls.

Disclosed herein, in another aspect, is an emergency management system comprising a processor, a network element, and a non-transitory computer readable storage medium that stores computer executable instructions that, when executed by the processor, cause the processor to: a) receive an emergency location associated with an emergency alert; b) identify an emergency response asset available for an emergency location; and c) activate the emergency response asset. In some embodiments, the instructions further cause the processor to: a) retrieve a set of geofences associated with a set of emergency response assets; and b) determine that the emergency location falls within a geofence associated with an emergency response asset from the set of emergency response assets. In some embodiments, a) the emergency response asset is a smart AED; and b) activation of the emergency response asset further comprises activating an alarm on the smart AED. In some embodiments, a) the emergency response asset is a drone; and b) activation of the emergency response asset further comprises dispatching the drone to the emergency location. In some embodiments, a) the emergency response asset is a telemedicine vehicle unit; and b) activation of the emergency response asset further comprises dispatching the telemedicine vehicle unit to the emergency location. In some embodiments, a) the emergency response asset is provided and managed by an asset service provider (ASP) distinct from the EMS; and b) activation of the emergency response asset comprises transmitting a request to the ASP to activate the emergency response asset according to the selection of the asset controls. In some embodiments, the emergency location is a device-based hybrid location received in the emergency alert from an electronic device. In some embodiments, the emergency alert is generated in response to an emergency call made from the electronic device. In some embodiments, the emergency location is received within an electronic communication from an emergency service provider (ESP).

Disclosed herein, in another aspect, is a non-transitory computer readable storage medium that stores computer executable instructions that, when executed by a processor, cause the processor to: a) identify an emergency response asset available for an emergency location; b) detect one or more user interactions with asset controls from an emergency response application executed on a computing device at an emergency service provider (ESP); and c) activate the emergency response asset according to the selection of the asset controls. In some embodiments, the instructions further cause the processor to: a) retrieve a plurality of geofences associated with a plurality of emergency response assets; and b) determine that the emergency location falls within a geofence associated with the emergency response asset from the plurality of emergency response assets. In some embodiments, the instructions further cause the processor to: a) access a database comprising a plurality of locations associated with a plurality of emergency response assets, wherein the plurality of locations comprises a location associated with the emergency response asset; and b) determine that the location of the emergency response asset is closest to the emergency location. In some embodiments, the instructions further cause the processor to provide asset controls to the emergency response asset through a graphical user interface (GUI) of the emergency response application in response to determining that the emergency location falls within the geofence associated with the emergency response asset. In some embodiments, the instructions further cause the processor to: a) determine an availability of the emergency response asset; and b) transmit an indication of the availability of the emergency response asset to the ESP for display within the GUI of the emergency response application. In some embodiments, a) the emergency response asset is a smart automatic external defibrillator (AED); and b) activating the emergency response asset comprises activating an alarm on the smart AED In some embodiments, a) the emergency response asset is a drone; and b) activation of the emergency response asset further comprises dispatching the drone to the emergency location. In some embodiments, a) the emergency response asset is a telemedicine vehicle unit; and b) activation of the emergency response asset further comprises dispatching the telemedicine vehicle unit to the emergency location. In some embodiments, a) the emergency response asset is provided and managed by an asset service provider (ASP) distinct from the EMS; and b) activation of the emergency response asset comprises transmitting a request to the ASP to activate the emergency response asset according to the selection of the asset controls. In some embodiments, the instructions further cause the processor to launch a secondary application provided by the ASP on the computing device at the ESP through the emergency response application. In some embodiments, the instructions further cause the processor to open a locking mechanism securing the emergency response asset to an enclosure or storage unit after the emergency response asset is activated. In some embodiments, the instructions further cause the processor to provide the emergency response application to the ESP, wherein the emergency response application is a web application accessible through a web browser using a URL. In some embodiments, the emergency location is a device-based hybrid location received in an emergency alert from an electronic device. In some embodiments, the emergency alert is generated in response to an emergency call made from the electronic device. In some embodiments, the emergency location is received within an electronic communication from the ESP through the emergency response application. In some embodiments, the instructions further cause the processor to establish a persistent communication link between the EMS and the ESP through the emergency response application. In some embodiments, the instructions further cause the processor to: a) retrieve a set of geofences associated with a set of ESPs; b) determine that the emergency location falls within a geofence associated with the ESP; c) in response to determining that the emergency location falls within the geofence associated with the ESP: i) transmit the emergency location to the emergency response application through the persistent communication link; and ii) display an indication of the emergency location within the GUI of the emergency response application. In some embodiments, the instructions further cause the processor to retrieve the set of geofences associated with the set of emergency response assets in response to selection of the indication of the emergency location within the GUI of the emergency response application. In some embodiments, the instructions further cause the processor to monitor the emergency response asset. In some embodiments, the instructions further cause the processor to monitor at least one of a location, status, or usage of the emergency response asset. In some embodiments, the instructions further cause the processor to deactivate the emergency response asset. In some embodiments, the emergency response asset is deactivated in response to the emergency response asset being returned to an initial location.

Disclosed herein, in another aspect, is a non-transitory computer readable storage medium that stores computer executable instructions that, when executed by a processor, cause the processor to: a) receive an emergency location associated with an emergency alert; b) identify an emergency response asset available for the emergency location; c) display asset controls for the emergency response asset within a graphical user interface (GUI) of an emergency response application executed on a computing device at an emergency service provider (ESP); d) detect one or more user interactions with the asset controls from the ESP through the emergency response application; and e) activate the emergency response asset according to the selection of the asset controls.

Disclosed herein, in another aspect, is a non-transitory computer readable storage medium that stores computer executable instructions that, when executed by a processor, cause the processor to: a) receive an emergency location associated with an emergency alert; b) retrieve a set of geofences associated with a set of emergency response assets; c) determine that the emergency location associated with the emergency alert falls within a geofence associated with an emergency response asset from the set of emergency response assets; d) display asset controls to the emergency response asset within a graphical user interface (GUI) of an emergency response application executed on a computing device at the ESP; e) detect one or more user interactions with the asset controls from the ESP through the emergency response application; and f) activate the emergency response asset according to the selection of the asset controls.

Disclosed herein, in another aspect, is a non-transitory computer readable storage medium that stores computer executable instructions that, when executed by a processor, cause the processor to: a) receive an emergency location associated with an emergency alert; b) identify an emergency response asset available for an emergency location; and c) activate the emergency response asset. In some embodiments, the instructions further cause the processor to: a) retrieve a set of geofences associated with a set of emergency response assets; and b) determine that the emergency location falls within a geofence associated with an emergency response asset from the set of emergency response assets. In some embodiments, a) the emergency response asset is a smart AED; and b) activation of the emergency response asset further comprises activating an alarm on the smart AED. In some embodiments, a) the emergency response asset is a drone; and b) activation of the emergency response asset further comprises dispatching the drone to the emergency location. In some embodiments, a) the emergency response asset is a telemedicine vehicle unit; and b) activation of the emergency response asset further comprises dispatching the telemedicine vehicle unit to the emergency location. In some embodiments, a) the emergency response asset is provided and managed by an asset service provider (ASP) distinct from the EMS; and b) activation of the emergency response asset comprises transmitting a request to the ASP to activate the emergency response asset according to the selection of the asset controls. In some embodiments, the emergency location is a device-based hybrid location received in the emergency alert from an electronic device. In some embodiments, the emergency alert is generated in response to an emergency call made from the electronic device. In some embodiments, the emergency location is received within an electronic communication from an emergency service provider (ESP).

Disclosed herein, in another aspect, is a system for identifying and activating emergency response assets, the system comprising: (a) an emergency management system (EMS) communicatively coupled to a plurality of asset management systems (AMSs) that manage a plurality of emergency response assets, wherein the EMS is configured to: receive information regarding the plurality of emergency response assets managed by the plurality of AMSs, wherein each of the plurality of emergency response assets is associated with an emergency response function and a location or a geofence; and identify, based on the location or geofence associated with each of the pluralities of emergency response assets managed by the plurality of AMSs, an emergency response asset available for an emergency location; and (b) an emergency response application communicatively coupled to the EMS, the emergency response application configured to: display asset controls associated with the emergency response asset identified as available for the emergency location within a graphical user interface (GUI) of the emergency response application; receive selection of the asset controls through the GUI of the emergency response application; and prompt the EMS to activate the emergency response asset identified as available for the emergency location to perform the emergency response function according to the selection of the asset controls. In some embodiments, each of the plurality of AMSs communicatively coupled to the EMS manages a different type of emergency response asset. In some embodiments, a first AMS of the plurality of AMSs communicatively coupled to the EMS manages static emergency response assets, and wherein a second AMS of the plurality of AMSs communicatively coupled to the EMS manages dynamic emergency response assets. In some embodiments, each emergency response asset managed by the plurality of AMSs communicatively coupled to the EMS is a non-human device that performs a physical function. In some embodiments, the EMS is further configured to identify the emergency response asset available for the emergency location by: retrieving a set of geofences associated with the plurality of emergency response assets; and determine that the emergency location falls within a geofence associated with the emergency response asset, thereby identifying the emergency response asset as available for the emergency location. In some embodiments, the EMS is further configured to provide the emergency response application to an emergency service provider (ESP) and wherein the emergency response application is executed on a computing device associated with the ESP. In some embodiments, the ESP is associated with a geofence, wherein the emergency location falls within the geofence associated with the ESP, and wherein the EMS is further configured to identify the emergency response asset available for the emergency location by determining that the location or geofence associated with the emergency response asset identified as available for the emergency location at least partially overlaps with the geofence associated with the ESP. In some embodiments, the emergency response application is a web application accessible through a web browser using a URL. In some embodiments, the emergency location is a device-based hybrid location and wherein the EMS receives the device-based hybrid location within an emergency alert generated by an electronic device. In some embodiments, the EMS is further configured to identify the emergency response asset available for the emergency location by applying a radius to the emergency location and determining that the radius applied to the emergency location at least partially overlaps with the location or geofence associated with the emergency response asset identified as available for the emergency response location. In some embodiments, the EMS is further configured to provide a graphical user interface (GUI) for provisioning emergency response assets. In some embodiments, at least some of the locations or geofences associated with the pluralities of emergency response assets are received by the EMS through the GUI for provisioning emergency response assets. In some embodiments, the selection of the asset controls prompts the EMS to transmit a request to activate the emergency response asset identified as available for the emergency location to an AMS that manages the emergency response asset identified as available for the emergency location. In some embodiments, the selection of the asset controls prompts the EMS to transmit a request to activate the emergency response asset identified as available for the emergency location to the emergency response asset identified as available for the emergency location. In some embodiments, the EMS is further configured to receive a status update from the emergency response asset identified as available for the emergency location. In some embodiments, the emergency response application is further configured to display the status update within the GUI of the emergency response application. In some embodiments, at least one of the plurality of AMSs communicatively coupled to the EMS manages connected building systems. In some embodiments, the emergency response asset identified as available for the emergency location is a connected building system. In some embodiments, activating the emergency response asset identified as available for the emergency location according to the selection of the asset controls comprises retrieving a floor plan associated with the connected building system and transmitting the floor plan associated with the connected building system to the ESP for display within the emergency response application.

Disclosed herein, in another aspect, is an emergency management system (EMS) communicatively coupled to a plurality of asset management systems (AMSs) that manage a plurality of emergency response assets, wherein the EMS is configured to: receive information regarding the plurality of emergency response assets managed by the plurality of AMSs, wherein each of the plurality of emergency response assets is associated with an emergency response function and a location or a geofence; identify, based on the location or geofence associated with each of the pluralities of emergency response assets managed by the plurality of AMSs, an emergency response asset available for an emergency location; and provide the information regarding the emergency response asset available for the emergency location to an emergency response application at an emergency service provider (ESP).

Disclosed herein, in another aspect, is non-transitory computer readable storage medium comprising instructions that, when executed, cause at least one processor to: receive information regarding a plurality of emergency response assets managed by a plurality of AMSs, wherein each of the plurality of emergency response assets is associated with an emergency response function and a location or a geofence; identify, based on the location or geofence associated with each of the pluralities of emergency response assets managed by the plurality of AMSs, an emergency response asset available for an emergency location; and provide the information regarding the emergency response asset available for the emergency location to an emergency response application at an emergency service provider (ESP).

Disclosed herein, in another aspect, is a computer-implemented method comprising: receiving information regarding a plurality of emergency response assets managed by a plurality of AMSs, wherein each of the plurality of emergency response assets is associated with an emergency response function and a location or a geofence; identifying, based on the location or geofence associated with each of the pluralities of emergency response assets managed by the plurality of AMSs, an emergency response asset available for an emergency location; and providing the information regarding the emergency response asset available for the emergency location to an emergency response application at an emergency service provider (ESP).

Disclosed herein, in another aspect, is a computing system comprising an emergency response application communicatively coupled to an emergency management system, the emergency response application configured to: display, within a graphical user interface (GUI), a map showing an emergency location corresponding to an emergency alert; display, within the GUI, asset controls associated with an emergency response asset identified as available for the emergency location; receive, through the GUI, selection of the asset controls; and prompt the EMS to activate the emergency response asset identified as available for the emergency location to perform the emergency response function according to the selection of the asset controls.

Disclosed herein, in another aspect, is non-transitory computer readable storage medium comprising instructions that, when executed, cause at least one processor to: display, within a graphical user interface (GUI), a map showing an emergency location corresponding to an emergency alert; display, within the GUI, asset controls associated with an emergency response asset identified as available for the emergency location; receive, through the GUI, selection of the asset controls; and prompt the EMS to activate the emergency response asset identified as available for the emergency location to perform the emergency response function according to the selection of the asset controls.

Disclosed herein, in another aspect, is a computer-implemented method comprising: displaying, within a graphical user interface (GUI), a map showing an emergency location corresponding to an emergency alert; displaying, within the GUI, asset controls associated with an emergency response asset identified as available for the emergency location; receiving, through the GUI, selection of the asset controls; and prompting the EMS to activate the emergency response asset identified as available for the emergency location to perform the emergency response function according to the selection of the asset controls.

In another aspect, disclosed herein is a method for identifying and activating one or more emergency response assets, the method comprising: receiving an emergency location associated with an emergency alert; retrieving a set of geofences associated with a plurality of connected building systems; determining that the emergency location falls within a geofence associated with a first connected building system from the plurality of connected building systems; in response to determining that the emergency location falls within the geofence associated with the first connected building system, displaying asset controls associated with the first connected building system within a graphical user interface (GUI) of an emergency response application executed on a computing device at an emergency service provider (ESP); receiving selection of the asset controls associated with the first connected building system through the GUI of the emergency response application; and activating the first connected building system according to the selection of the asset controls. In some embodiments, activating the first connected building system according to the selection of the asset controls comprises retrieving a floor plan associated with the first connected building system and transmitting the floor plan associated with the first connected building system to the ESP for display within the emergency response application. In some embodiments, activating the first connected building system according to the selection of the asset controls comprises accessing a video feed from a surveillance camera associated with the first connected building system. In some embodiments, activating the first connected building system comprises prompting the first connected building to lock a door or sound an alarm associated with the first connected building system. In some embodiments, activating the first connected building system comprises transmitting a request to activate the first connected building system to an AMS that manages the first connected building system.

Disclosed herein, in another aspect, is a computing system for identifying and activating connected building systems, the computing system configured to: receive an emergency location associated with an emergency alert; retrieve a set of geofences associated with a plurality of connected building systems; determine that the emergency location falls within a geofence associated with a first connected building system from the plurality of connected building systems; in response to determining that the emergency location falls within the geofence associated with the first connected building system, display asset controls associated with the first connected building system within a graphical user interface (GUI) of an emergency response application executed on a computing device at an emergency service provider (ESP); receive selection of the asset controls associated with the first connected building system through the GUI of the emergency response application; and activate the first connected building system according to the selection of the asset controls.

Disclosed herein, in another aspect, is non-transitory computer readable storage medium comprising instructions that, when executed, cause at least one processor to: receive an emergency location associated with an emergency alert; retrieve a set of geofences associated with a plurality of connected building systems; determine that the emergency location falls within a geofence associated with a first connected building system from the plurality of connected building systems; in response to determining that the emergency location falls within the geofence associated with the first connected building system, display asset controls associated with the first connected building system within a graphical user interface (GUI) of an emergency response application executed on a computing device at an emergency service provider (ESP); receive selection of the asset controls associated with the first connected building system through the GUI of the emergency response application; and activate the first connected building system according to the selection of the asset controls.

In another aspect, disclosed herein is a method for identifying and activating automated external defibrillators (AEDs), the method comprising: receiving an emergency location associated with an emergency alert; applying a radius to the emergency location to generate an emergency area; retrieving a plurality of asset locations associated with a plurality of connected AEDs; determining that an asset location associated with a first connected AED from the plurality of connected AEDs falls within the emergency area generated for the emergency location; in response to determining that the asset location associated with the first connected AED falls within the emergency area, displaying asset controls associated with the first connected AED within a graphical user interface (GUI) of an emergency response application executed on a computing device at an emergency service provider (ESP); receiving selection of the asset controls associated with the first connected AED through the GUI of the emergency response application; and activating the first connected AED according to the selection of the asset controls. In some embodiments, activating the first connected AED according to the selection of the asset controls comprises activating an audio or visual alarm built into the first connected AED. In some embodiments, activating the first connected AED according to the selection of the asset controls comprises unlocking a locking mechanism built into the first connected AED. In some embodiments, activating the first connected AED according to the selection of the asset controls comprises transmitting a request to activate the first connected AED to an asset management system (AMS) that manages the first connected AED.

Disclosed herein, in another aspect, is a computing system for identifying and activating automated external defibrillators (AEDs), the computing system configured to: receive an emergency location associated with an emergency alert; apply a radius to the emergency location to generate an emergency area; retrieve a plurality of asset locations associated with a plurality of connected AEDs; determine that an asset location associated with a first connected AED from the plurality of connected AEDs falls within the emergency area generated for the emergency location; in response to determining that the asset location associated with the first connected AED falls within the emergency area, display asset controls associated with the first connected AED within a graphical user interface (GUI) of an emergency response application executed on a computing device at an emergency service provider (ESP); receive selection of the asset controls associated with the first connected AED through the GUI of the emergency response application; and activate the first connected AED according to the selection of the asset controls.

Disclosed herein, in another aspect, is non-transitory computer readable storage medium comprising instructions that, when executed, cause at least one processor to: receive an emergency location associated with an emergency alert; apply a radius to the emergency location to generate an emergency area; retrieve a plurality of asset locations associated with a plurality of connected AEDs; determine that an asset location associated with a first connected AED from the plurality of connected AEDs falls within the emergency area generated for the emergency location; in response to determining that the asset location associated with the first connected AED falls within the emergency area, display asset controls associated with the first connected AED within a graphical user interface (GUI) of an emergency response application executed on a computing device at an emergency service provider (ESP); receive selection of the asset controls associated with the first connected AED through the GUI of the emergency response application; and activate the first connected AED according to the selection of the asset controls.

Disclosed herein, in another aspect, is an emergency management system (EMS) for identifying and activating emergency response assets, the EMS communicatively coupled to a plurality of asset management systems (AMSs) that manage a plurality of emergency response assets, wherein the EMS is configured to: receive information regarding the plurality of emergency response assets managed by the plurality of AMSs, wherein each of the plurality of emergency response assets is associated with an emergency response function and a location or a geofence; identify, based on the location or geofence associated with each of the pluralities of emergency response assets managed by the plurality of AMSs, an emergency response asset available for an emergency location; provide information regarding the emergency asset available for the emergency location to an emergency response application communicatively coupled to the EMS; receive instructions from the emergency response application to activate the emergency response asset to perform an emergency response function; and send instructions to an AMS having control over the emergency response asset to activate the emergency response asset in order to perform the emergency response function.

Disclosed herein, in another aspect, is non-transitory computer readable storage medium comprising instructions that, when executed, cause at least one processor of an emergency management system (EMS) to: receive information regarding a plurality of emergency response assets managed by a plurality of AMSs communicatively coupled to the EMS, wherein each of the plurality of emergency response assets is associated with an emergency response function and a location or a geofence; identify, based on the location or geofence associated with each of the pluralities of emergency response assets managed by the plurality of AMSs, an emergency response asset available for an emergency location; provide information regarding the emergency asset available for the emergency location to an emergency response application communicatively coupled to the EMS; receive instructions from the emergency response application to activate the emergency response asset to perform an emergency response function; and send instructions to an AMS having control over the emergency response asset to activate the emergency response asset in order to perform the emergency response function.

Disclosed herein, in another aspect, is a computer-implemented method comprising: receiving information regarding a plurality of emergency response assets managed by a plurality of AMSs communicatively coupled to a EMS, wherein each of the plurality of emergency response assets is associated with an emergency response function and a location or a geofence; identifying, based on the location or geofence associated with each of the pluralities of emergency response assets managed by the plurality of AMSs, an emergency response asset available for an emergency location; providing information regarding the emergency asset available for the emergency location to an emergency response application communicatively coupled to the EMS; receiving instructions from the emergency response application to activate the emergency response asset to perform an emergency response function; and sending instructions to an AMS having control over the emergency response asset to activate the emergency response asset in order to perform the emergency response function.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 20A, 20B, and 20C illustrate an example of an asset provisioning interface in accordance with one embodiment of the present disclosure.

DETAILED DESCRIPTION

Figure 1A:
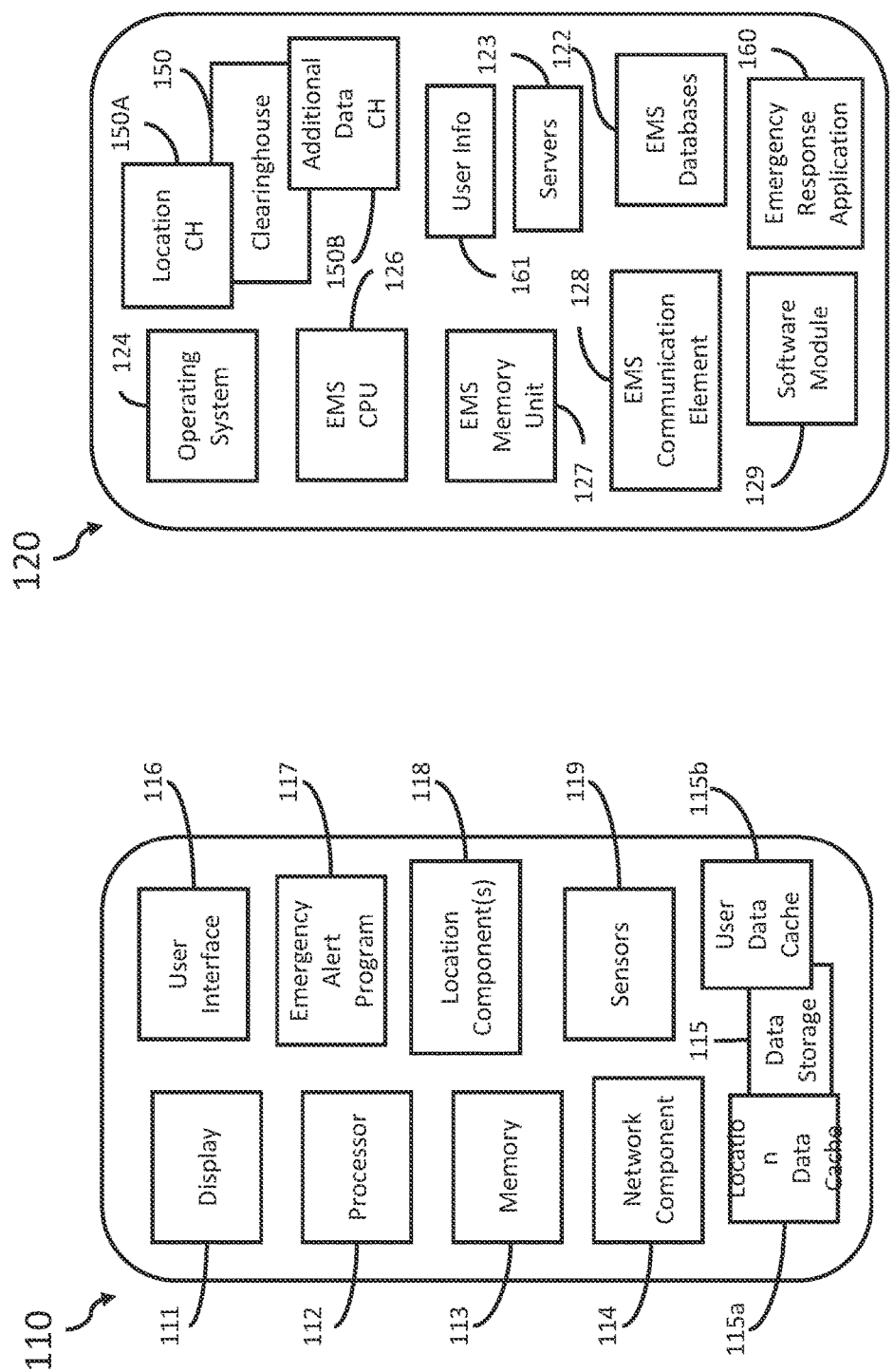
FIG. 1A depicts diagrams of (i) an electronic device and (ii) an emergency management system (EMS) in accordance with one embodiment of the present disclosure.

Disclosed herein are systems, devices, media, and methods for providing enhanced emergency communications and functions for emergency response. Smart systems and devices can be leveraged to provide new modes of emergency response that do not rely upon the presence of official first responders. Instead, these smart systems and devices provide enhanced functionality that can be controlled or directed according to one or more remote operators. Embodiments of the present disclosure take advantage of technological advancements that have allowed for mobile communication devices to generate accurate locations by incorporating multiple technologies embedded in the devices, such as GPS, Wi-Fi, and Bluetooth to create device-based hybrid locations. Device-based hybrid locations are locations calculated on an electronic or communication device, as opposed to locations calculated using a network (e.g., a carrier network). Device-based hybrid locations can be generated using GPS, network-based technologies, Wi-Fi access points, Bluetooth beacons, barometric pressure sensors, dead reckoning using accelerometers and gyrometers, and a variety of crowdsourced and proprietary databases that device operating systems providers are running to enhance location technology. These device-based hybrid locations can be quickly generated during emergency calls. The accurate location mapping of emergencies allows for emergency response assets that are in proximity to the emergency location to be activated to help render assistance while the main first responder(s) are underway. Examples of such smart systems and devices include internet-enabled automated external defibrillators (hereinafter, "smart AEDs") or unmanned aerial vehicles (UAVs; e.g., drones), which have enabled new modes of providing emergency response.

Furthermore, mobile communication devices (e.g., mobile phones, wearables, IoT devices, smart home devices, vehicle computers, etc.) are often capable of generating or storing additional information that may be useful in responding to emergency situations, such as health data or medical histories. For example, during an emergency, a modern mobile communication device may have access to an implicated person's blood type, preexisting medical conditions, or even the implicated person's current heartrate. In some embodiments, the mobile communication device has access to data from sensors (e.g., health or environmental sensors). For example, a video feed of the emergency via a connected surveillance camera can provide valuable situational awareness regarding the emergency. This additional information can be put to greater use with the advent of emergency response assets. For example, sensor data indicating a person is experiencing a cardiac arrhythmia may be provided to the dispatcher managing the emergency response. The dispatcher may then choose to activate an emergency response asset comprising an UAV carrying an automated external defibrillator with a significantly faster estimated time to arrival (ETA) than a first responder in order to initiate defibrillation to correct the arrhythmia more promptly.

Electronic Device, Emergency Management System (EMS), and Emergency Service Provider (ESP)

In various embodiments, disclosed herein are devices, systems, and methods for managing emergency data for emergency response. FIG. 1A depicts exemplary diagrams of (i) an electronic device 110 and (ii) an emergency management system (EMS) 120 in accordance with one embodiment of the present invention. In some embodiments, the electronic device 110 is a digital processing device such as a communication device (e.g., mobile or cellular phone, computer, laptop, etc.). In some embodiments, the electronic device is a wearable device (e.g., a smartwatch). In some embodiments, the electronic device is an Internet of Things (IoT) device, such as a home assistant (e.g., an Amazon Echo) or a connected smoke detector (e.g., a Nest Protect smoke and carbon monoxide alarm). In some embodiments, the electronic device is a walkie-talkie or two-way radio.

In some embodiments, the electronic device 110 includes a display 111, a processor 112, a memory 113 (e.g., an EPROM memory, a RAM, or a solid-state memory), a network component 114 (e.g., an antenna and associated components, Wi-Fi adapters, Bluetooth adapters, etc.), a data storage 115, a user interface 116, an emergency alert program 117, one or more location components 118, and one or more sensors 119. In some embodiments, the processor 112 is implemented as one or more microprocessors, microcomputers, microcontrollers, digital signal processors, central processing units, state machines, logic circuitries, and/or devices that manipulate signals based on operational instructions. Among other capabilities, the processor 112 is configured to fetch and execute computer-readable instructions stored in the memory 113.

In some embodiments, the display 111 is part of the user interface 116 (e.g., a touchscreen is both a display and a user interface in that it provides an interface to receive user input or user interactions). In some embodiments, the user interface 116 includes physical buttons such as an on/off button or volume buttons. In some embodiments, the display 111 and/or the user interface 116 comprises a touchscreen (e.g., a capacitive touchscreen), which is capable of displaying information and receiving user input. In some embodiments, the communication device includes various accessories that allow for additional functionality. In some embodiments, these accessories (not shown) include one or more of the following: a microphone, a camera, speaker, a fingerprint scanner, health or environmental sensors, a USB or micro-USB port, a headphone jack, a card reader, a SIM card slot, or any combination thereof. In some embodiments, the one or more sensors include, but are not limited to: a gyroscope, an accelerometer, a thermometer, a heart rate sensor, a barometer, or a hematology analyzer. In some embodiments, the data storage 115 includes a location data cache 115A and a user data cache 115B. In some embodiments, the location data cache 115A is configured to store locations generated by the one or more location components 118.

In some embodiments, the emergency alert program 117 is an emergency response application or emergency response mobile application. In some embodiments, the emergency alert program 117 is configured to record user data, such as a name, address, or medical data of a user associated with the electronic device 110. In some embodiments, the emergency alert program 117 is configured to detect when an emergency request is generated or sent by the electronic device 110 (e.g., when a user uses the electronic device 110 to make an emergency call). In some embodiments, in response to detecting an emergency request generated or sent by the electronic device 110, the emergency alert program 117 is configured to deliver a notification to the EMS 120. In some embodiments, the notification is an HTTP post containing information regarding the emergency request. In some embodiments, the notification includes a location (e.g., a device-based hybrid location) generated by or for the electronic device 110. In some embodiments, in response to detecting an emergency request generated or sent by the electronic device 110, the emergency alert program 117 is configured to deliver user data to the EMS 120.

In some embodiments, as depicted in FIG. 1A, the emergency management system (EMS) 120 includes an EMS operating system 124, an EMS CPU 126, an EMS memory unit 127, an EMS communication element 128, and one or more software modules 129. In some embodiments, the EMS CPU 126 is implemented as one or more microprocessors, microcomputers, microcontrollers, digital signal processors, central processing units, state machines, logic circuitries, and/or devices that manipulate signals based on operational instructions. Among other capabilities, the EMS CPU 126 is configured to fetch and execute computer-readable instructions stored in the EMS memory unit 127. The EMS memory unit 127 optionally includes any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The EMS memory unit 127 optionally includes modules, routines, programs, objects, components, data structures, etc., which perform particular tasks or implement particular abstract data types.

In some embodiments, the EMS 120 includes one or more EMS databases 122, one or more servers 123, and a clearinghouse 150. In some embodiments, the clearinghouse 150, as described in further detail below, is an input/output (I/O) interface configured to manage communications and data transfers to and from the EMS 120 and external systems and devices. In some embodiments, the clearinghouse 150 includes a variety of software and hardware interfaces, for example, a web interface, a graphical user interface (GUI), and the like. The clearinghouse 150 optionally enables the EMS 120 to communicate with other computing devices, such as web servers and external data servers (not shown). In some embodiments, the clearinghouse 150 facilitates multiple communications within a wide variety of networks and protocol types, including wired networks, for example, LAN, cable, etc., and wireless networks, such as WLAN, cellular, or satellite. In some embodiments, the clearinghouse 150 includes one or more ports for connecting a number of devices to one another or to another server. In some embodiments, the clearinghouse 150 includes one or more sub-clearinghouses, such as location clearinghouse 150A and additional data clearinghouse 150B, configured to manage the transfer of locations and additional data, respectively. In some embodiments, the EMS 120 additionally includes a user information module 161 that receives and stores user information (e.g., personal information, demographic information, medical information, location information, etc.) within the EMS 120. In some embodiments, users can submit user information through a website, web application, or mobile application, such as during a registration process for an emergency response application. In some embodiments, when the EMS 120 receives emergency data including user information, such as through an emergency alert received by the clearinghouse 150 (as described below), the EMS 120 stores the user information in the user information module 161. In some embodiments, user information stored within the user information module 161 is received by the EMS 120 from a third-party server system, as described below. In some embodiments, user information stored within the user information module 161 is associated with an identifier of a user or an electronic device associated with a user, such as a phone number or an email address.

Figure 1B:
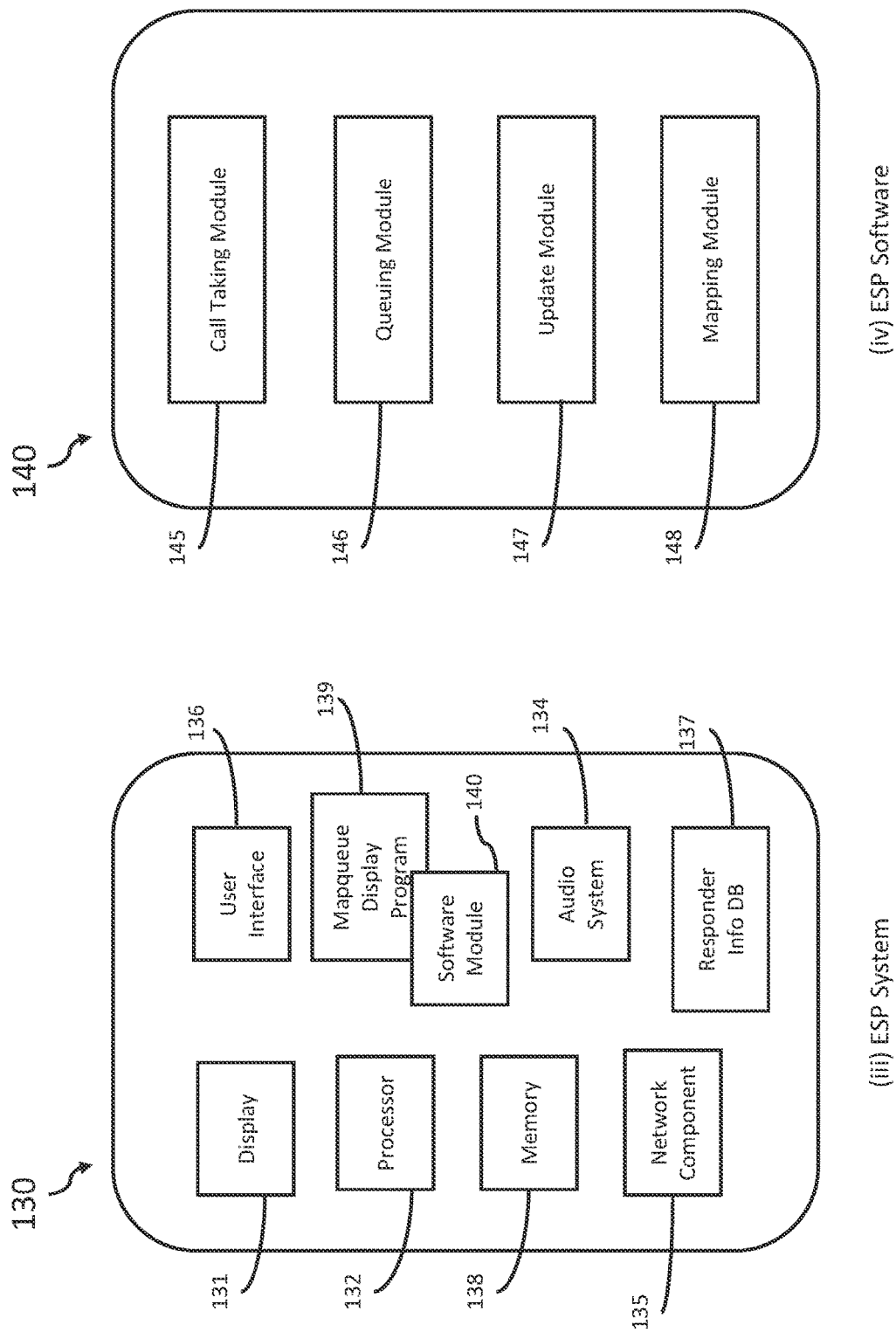
FIG. 1B depicts diagrams of (iii) an emergency service provider (ESP) system and (iv) ESP software in accordance with one embodiment of the present disclosure.

In some embodiments, as depicted in FIG. 1B, an emergency service provider (ESP; e.g., a public safety answering point (PSAP)) system 130 includes one or more of a display 131, a user interface 136, at least one central processing unit or processor 132, a network component 135, an audio system 134 (e.g., microphone, speaker and/or a call-taking headset), and a computer program such as a PSAP Emergency Display Application or Location Display Program 139. In some embodiments, the PSAP application or program 139 comprises one or more software modules 140. In some embodiments, the PSAP system 130 comprises a database of emergency responders 137, such as medical assets, police assets, fire response assets, rescue assets, safety assets, etc. Such assets can be non-human assets such as, for example, autonomous drones or automated devices.

In some embodiments, as depicted in FIG. 1B, the PSAP application or program 139 installed on a PSAP system 130 comprising a software module 140 is a call taking module 145, an ESP display module 146, a supplemental or updated information module 147, or a combination thereof. In some embodiments, the PSAP application 139 displays the information on a map (e.g., on the display 131). In some embodiments, location and supplemental information is displayed for emergency service providers (e.g., police, fire, medical, etc.) and/or responders on their devices. It is contemplated that responder devices have optionally installed a responder device program (not shown) similar to PSAP display module 146. In some embodiments, the responder device program displays the emergency location on a map.

Emergency Clearinghouse

In some embodiments, as mentioned above with respect to FIG. 1A, the emergency management system (EMS) 120 includes a clearinghouse 150 (also referred to as an "Emergency Clearinghouse") for storing, retrieving, and transmitting emergency data. In some embodiments, the clearinghouse 150 includes a location clearinghouse 150A and an additional data clearinghouse 150B. In some embodiments, the location clearinghouse 150A includes a location ingestion module and a location retrieval module, as described below with respect to FIG. 2. In some embodiments, the additional data clearinghouse 150B includes an additional data ingestion module and an additional data retrieval module, as described below with respect to FIG. 2. In other embodiments, additional data and location data (hereinafter "emergency data") are stored in one or more databases in a distributed manner. In some embodiments, the emergency data is stored in an external or third-party server that is accessible to the EMS 120. The clearinghouse 150 optionally functions as an interface that receives and stores emergency data from electronic or communication devices that are then retrieved, transmitted, and/or distributed to recipients (e.g., emergency service providers) before, during, or after emergencies. As described above, the clearinghouse optionally receives emergency data from electronic or communication devices such as mobile phones, wearable devices, laptop or desktop computers, personal assistants, intelligent vehicle systems, home security systems, IoT devices, camera feeds, and other sources (e.g., emergency response assets and asset service providers, as described in further detail below). As described above and below, emergency data optionally includes locations or additional data such as medical history, personal information, or contact information. In some embodiments, during an emergency, the clearinghouse 150 detects the emergency and/or otherwise identifies the need to provide emergency data pertaining to the emergency. The clearinghouse 150 then identifies any emergency data pertaining to the emergency stored within the clearinghouse 150 and transmits the pertinent emergency data to the requesting ESP. Accordingly, in some embodiments, the clearinghouse 150 acts as a data pipeline that automatically pushes emergency data to an ESP that would otherwise be without access to emergency data that is critical to most effectively and efficiently responding to an emergency. Accordingly, location data stored within the clearinghouse 150 allows emergency responders to arrive at the scene of an emergency faster, and additional data stored within the clearinghouse 150 allows emergency responders to be better prepared for the emergencies they face.

For example, in one embodiment, an emergency alert is triggered by an electronic device 110 (e.g., by pressing a soft button, a physical button, voice command, or gesture) or autonomously based on sensor data (e.g., smoke alarms). In this example, the user then confirms the emergency and/or provides authorization for sending the emergency alert. Emergency data, such as an enhanced location and additional data regarding the user (e.g., the user's medical history) is delivered by the electronic device 110 to the EMS 120 and stored in the clearinghouse 150 (e.g., in the location clearinghouse 150A and the additional data clearinghouse 150B). In some embodiments, the EMS 120 or clearinghouse 150 formats the emergency data into a format that is compatible with industry standards for storing and sharing emergency data. For example, in some embodiments, the emergency data is formatted to be compatible with National Emergency Number Association (NENA) standards. In some embodiments, the clearinghouse 150 transmits the emergency data to a receiving party in response to receiving a query from the receiving party, as described below. In some embodiments, the clearinghouse 150 automatically pushes the emergency data to a receiving party (e.g., without receiving a query from the receiving party), such as a PSAP. For example, in some embodiments, the clearinghouse 150 or emergency management system 120 housing the clearinghouse automatically pushes the emergency data to a receiving party using a subscription system, as described below.

In some embodiments, as mentioned above, a requesting party (such as a PSAP responding to an emergency call) queries the clearinghouse 150 with an emergency data request (such as a HTTP GET request). In some embodiments, the emergency data request is in the form of the Location Information Server (LIS) protocol. In response to the emergency data request, the EMS 120 or clearinghouse 150 sends an appropriate response including relevant emergency data to the requesting party via an encrypted pathway. In some embodiments, the emergency data request is in the form of HTTP-Enabled Location Delivery (HELD) and the response from the EMS 120 or clearinghouse 150 is in the form of Presence Information Data Format Location Object (PIDF-LO). In some embodiments, the emergency data request includes an authorization code (also referred to as an "authorization token" or "temporary access token") in the body, header, or metadata of the request, and the EMS 120 checks that the authorization code is active before providing a response to the requesting party. In some embodiments, authorization is provided in the "Authorization" header of the emergency data request using HTTP Basic Authentication. For example, in some embodiments, authorization is base64-encoded username and password for an account associated with the requesting party. In some embodiments, emergency data requests are sent over public networks using API access keys or credentials. In some embodiments, Transport Layer Security (TLS) is used in the requests and responses from the EMS 120 for encryption security. In some embodiments, the call taking module 145 includes a call-handling application, which is provided by a third-party vendor. In some embodiments, an ESP personnel interacts with the call-handling application to send an emergency data request to the EMS 120. In some embodiments, the response from the EMS 120 is displayed at the ESP display 131.

In some embodiments, as described above, emergency data includes locations and additional data. In some embodiments, emergency data includes one or more emergency data categories (also referred to as "data categories"). In some embodiments, the emergency data categories include: service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments. In some embodiments, emergency data categories are tagged with tags for specific types of data such as "demographics" or "medical data." For example, in some embodiments, gender, height, weight, ethnicity, profile picture (image-url) are tagged as demographic data. In some embodiments, medical data protected under HIPAA and other laws are tagged as "HIPAA" or "private." In some embodiments, medical data includes information on one or more of allergies, medical condition(s) or illness(es), medication(s), disabilities, blood type, medical note(s), and other medical information. In some embodiments, medical information protected under HIPAA are encrypted and/or anonymized. In some embodiments, some data are tagged as "general" or another similar tag, wherein access is not specifically restricted.

An example of an additional data communication from the EMS 120 in a standard format compatible with industry standards, PIDF-LO, is shown below.

```
HTTP/1.1 200 OK
Date: Tue, 01 Dec 2016 23:27:30 GMT
Content-Length: 489
Content-Type: application/EmergencyCallData.DeviceInfo+xml
<dev:EmergencyCallData.DeviceInfo
    xmlns:dev="urn:ietf:params:xml:ns:EmergencyCallData:DeviceInfo">
    <dev:DataProviderReference>d4b3072df.201409182208075@example.org
```

In some embodiments, when the emergency data is stored at a third-party server and receives a request for emergency data from the EMS 120, as a database query, the third-party server formats the requested emergency data and stores this information in an alternate database, and forwards either a response or a reference to the alternate database for accessing the emergency data requested by the EMS 120, which is provided to the ESP 130 over a hybrid analog and/or a data communication channel, depending on the capabilities of ESP 130. In some embodiments, the third-party server stores the emergency data, requested by the EMS 120 or directly by the ESP 130, in the alternate database for a certain period of time after receiving the request for the emergency data regarding a user and any electronic devices 110. In some embodiments, this period of time is a timer value (e.g., a timer countdown or a set time point) defined by the EMS 120 and the third-party server in conjunction with each other prior to the addition of the requested emergency data to the alternate database at the third-party server. In some embodiments, once the timer value has passed and no new requests for the emergency data pertaining to the particular user and the electronic device 110, or other devices associated with the user, are received by the third-party server, then the third-party server marks the particular alternate database entries to be deleted and waits for another, different, time-out interval. In some embodiments, once this particular second time-out interval has also been completed and no new requests for location data for the particular user or associated electronic devices 110 are received by the third-party server, the third-party server removes the specific marked entries from the alternate database in the next cycle of updates for the alternate database. In some embodiments, after adding the emergency data in the alternate database by the third-party server, the third-party server keeps updating the emergency data in the alternate database on a periodic, or as-needed basis, for the purpose of keeping the emergency data about the user or electronic device 110 current for providing the most recent and accurate emergency data to the EMS 120 and the ESP 130 for the purposes of responding to a request for emergency assistance. In some embodiments, the third-party server is updated by the EMS 120 for all the emergency data pertaining to all users and their associated electronic devices 110 that are served by the EMS 120 at any current time.

In some non-emergency situations, there is a need to access location data, user data, emergency data or sensor data. For example, in some embodiments, a user of an electronic device 110 grants authorization to family members to access location data for the user. Accordingly, when a family member requests location data for a user, access is granted if there is proper authorization. As another example, in some embodiments, a taxi operations company requests and obtains location data of one or more fleet members to keep track of its vehicles (e.g., via onboard vehicle console or terminal).

Various embodiments and applications of the clearinghouse 150 are described in detail herein. However, the embodiments and applications described herein should not be considered exhaustive or limiting in any way.

Figure 2:
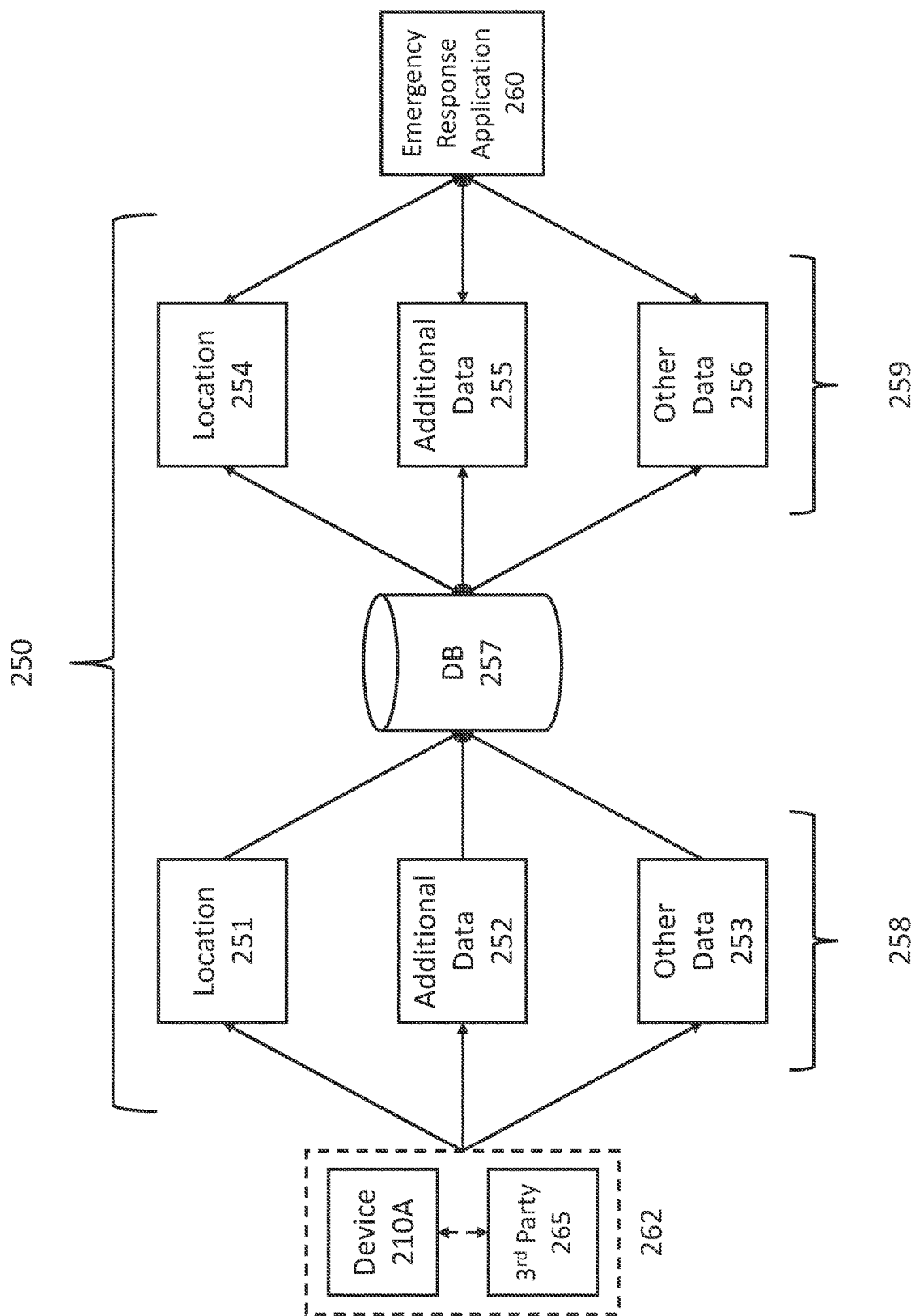
FIG. 2 depicts a diagram of a clearinghouse for emergency data in accordance with one embodiment of the present disclosure.

FIG. 2 depicts an embodiment of an Emergency Clearinghouse 250 for storing and retrieving emergency data. In some embodiments, the clearinghouse 250 includes a set of ingestion modules 258 (also referred to as "ingestion modules") and a set of retrieval modules 259 (also referred to as "retrieval modules"). The set of ingestion modules 258 is configured to receive various forms of emergency data from various emergency data sources 262, such as an electronic device 210A or a third-party server system 265 (hereinafter, "third-party server"). In some embodiments, an electronic device 210A is a communication device (e.g., a mobile phone), a wearable device (e.g., a smartwatch), or an internet of things (IoT) device (e.g., a smart speaker) that can communicate with one or more of the ingestion modules within the set of ingestion modules 258. In some embodiments, a third-party server 265 stores data that is not generated by or stored within an electronic device. For example, in some embodiments, a third-party server includes a database of static medical information that can be sent to the clearinghouse during an emergency. In some embodiments, when the emergency management system 120 detects an emergency (e.g., when a person calls 9-1-1), the clearinghouse 250 can query an emergency data source 262 for emergency data regarding the emergency. For example, in some embodiments, in response to detecting a 9-1-1 call made from a mobile phone, the additional data ingestion module 252 (as described below) sends a query including the phone number of the mobile phone to a third-party server 265 that stores static medical information. The third-party server 265 can then return any available medical information associated with the phone number of the mobile phone to the additional data ingestion module. In some embodiments, multiple ingestion modules within the set of ingestion modules can receive emergency data for a single emergency. For example, in some embodiments, when a person calls 9-1-1 from a mobile phone, the mobile phone can send a device-based hybrid location to the location ingestion module 251 (as described below) and demographic data (as described above) to the additional data ingestion module 252. In some embodiments, the clearinghouse can receive emergency data from multiple emergency data sources 262 for a single emergency. For example, in some embodiments, when a person calls 9-1-1 from a mobile phone, the clearinghouse can receive a location from the mobile phone (such as through the location ingestion module 251) and a heartrate from a smartwatch that the person is wearing (such as through additional data ingestion module 252). Or for example, in some embodiments, when a person calls 9-1-1 from a mobile phone, the clearinghouse can receive a location from the mobile phone and medical information associated with the person from a third-party server 265.

The set of ingestion modules 258 optionally include a location ingestion module 251, an additional data ingestion module 252, and one or more other data ingestion modules 253. In some embodiments, the location ingestion module 251 is an emergency location service ingestion interface for posting or receiving emergency locations. In some embodiments, the location ingestion module 251 is a REST API that receives an HTTP POST including location data when an emergency alert is generated (e.g., when an emergency call is made from a cell phone). The location data includes a location generated concurrently or in response to the generation of the emergency alert. In some embodiments, the location data includes a location generated before the emergency alert. For example, when an emergency call is made from a cell phone, thereby generating an emergency alert, the location ingestion module 251 receives a location recently generated by the phone but before the emergency alert was generated, ensuring that a location for the emergency is available as quickly as possible. In some embodiments, the location data includes a device-based hybrid location generated by an electronic device 210 that generated the emergency alert. In some embodiments, the location data includes a location generated by a second electronic device communicatively coupled to the electronic device that generated the emergency alert. The location ingestion module 251 is integrated into an electronic device 210 through a mobile application installed on the device 210 or integrated into the firmware or operating system of the electronic device 210.

In some embodiments, the location data is generated by the electronic device 210 before the emergency and is accessible to a PSAP during an emergency. For example, a taxi company may have software that transmits the location of its cars or assets to the emergency clearinghouse 250 preemptively. Thus, when an emergency arises, the location of the affected taxi can be made accessible quicker to send help. In some embodiments, the location data is generated by the electronic device 210 after the emergency has commenced and is made accessible to a PSAP during the on-going emergency. For example, updated location data of a hijacked taxi is also periodically transmitted to the emergency clearinghouse 250 and made accessible to a PSAP.

In some embodiments, the additional data ingestion module 252 is an interface for posting or receiving static or dynamic emergency profile data (hereinafter, "additional data" or "additional information"). In some embodiments, additional data comprises medical data, personal data, demographic data, health data, or any combination thereof. Examples of medical data include information relating to a person's medical history, such as past surgeries or preexisting conditions. Examples of personal data include a person's name, date of birth, height, weight, occupation, address(es) (e.g., home address, work address, etc.), spoken languages, and other personal information. Examples of demographic data include a person's gender, ethnicity, age, etc. Examples of health data include information such as a person's blood type or heartrate. In some embodiments, additional data comprises data received from connected devices such as vehicles, IoT devices, and wearable devices. For example, some intelligent vehicle systems generate and send data regarding a crash, such as the speed at which the vehicle was moving just before the collision, where the vehicle was struck, the number of occupants, etc. In some embodiments, the additional data ingestion module 252 is a REST API (e.g., a JSON (JavaScript Object Notation) REST API). For example, in some embodiments, when an emergency call is made from a cell phone, thereby generating an emergency alert, the cell phone receives a heartrate of the person who made the emergency call from a smartwatch worn by the person and communicatively coupled to the cell phone (e.g., Wi-Fi or Bluetooth connectivity). The cell phone sends the heartrate to the additional data ingestion module 252, along with any other additional data, in an HTTP POST. In some embodiments, the additional data ingestion module 252 is integrated into an electronic device 210 through a mobile application installed on the device 210 or integrated into the firmware or operating system of the electronic device 210. In some embodiments, additional data is sent to the additional data ingestion module 252 from a network server. The additional data ingestion module 252 is accessed by any connected platform that receives data that might be relevant in an emergency. Connected platforms optionally send additional data to the additional data ingestion module 252 at any time. For example, in some embodiments, a website, web application, or mobile application integrated with the additional data ingestion module 252 that allows users to create profiles sends additional data included in the profiles to the additional data ingestion module 252 every time a profile is created or updated.

In some embodiments, the set of ingestion modules 258 includes one or more other data ingestion modules 253. Another data ingestion module 253 is optionally an interface for posting or receiving data relevant to emergencies that is not received by the location ingestion module 251 or the additional data ingestion module 252. In some embodiments, the other data ingestion module 253 receives audio or video streams during an emergency from electronic or communication devices associated with the emergency or proximal to the emergency. For example, an emergency alert is generated by an intelligent vehicle system installed in a vehicle in response to the vehicle experiencing a collision. In this example, the emergency alert is sent to the EMS 120 by the intelligent vehicle system or by an electronic device communicatively coupled to the intelligent vehicle system, such as a cell phone coupled to the intelligent vehicle system via Bluetooth. In response to generating the emergency alert, the intelligent vehicle system additionally begins streaming audio and video from microphones and cameras installed inside or outside of the vehicle to the clearinghouse 250 through the other data ingestion module 253. A cell phone communicatively coupled to the intelligent vehicle system additionally or alternatively streams audio or video from microphones and cameras integrated into the cell phone to the clearinghouse 250 through the other data ingestion module 253. In some embodiments, the one or more other data ingestion modules 253 are REST APIs that are accessed with an HTTP POST.

After receiving the relevant data, the set of ingestion modules 258 can store the data in one or more clearinghouse databases 257. For example, in some embodiments, the clearinghouse databases 257 includes a location database and an additional data database. In some embodiments, as described above, the one or more clearinghouse databases 257 are stored on a third-party server communicatively coupled to or otherwise accessible by the EMS 120. In some embodiments, the set of ingestion modules 258 tags or otherwise associates the data received by the modules with an identifier of a user or device associated with the data. For example, the set of ingestions modules 258 tag the data the received by the modules with a user ID number, an email address, or a phone number (e.g., caller ID). In some embodiments, the ingestion modules 258 tag the data received by the clearinghouse 250 based on the data source (e.g., device name or type, application name, username, phone number, corporate account, etc.).

In some embodiments, the emergency data maintained by the clearinghouse is purged. In some embodiments, the data is purged on a regular or periodic basis. In some embodiments, data that is older than a defined threshold is purged. In some embodiments, different data types are purged according to different schedules and/or thresholds. For example, dynamic data (e.g., data that is subject to constant or regular change) such as location data may be more likely to become out-of-date over time and so may be purged more frequently than static data such as a permanent home address, which may remain permanently in the database until it is replaced with an updated address.

In some embodiments, an individual or group of individuals are associated with multiple identifiers. For example, the location ingestion module 251 receives a location generated by a phone associated with the phone number +1-555-555-5555, associated with John Doe. The additional data ingestion module 252 also receives a heartrate from a smartwatch associated with the email address johndoe@email.com, also associated with John Doe. In this example, the set of ingestion modules 258 tag the location with the phone number "+1-555-555-5555," tag the heartrate with the email address "johndoe@email.com," and associate both the location and the heartrate with John Doe in the clearinghouse databases 257.

In some embodiments, as depicted in FIG. 2, the clearinghouse 250 includes a set of retrieval modules 259. The set of retrieval modules 259 optionally include a location retrieval module 254, an additional data retrieval module 255, and one or more other data retrieval modules 256. In some embodiments, the location retrieval module 254 is an interface for retrieving location data from the clearinghouse databases 257. In some embodiments, the location retrieval module 254 is a JSON REST API that receives a query or request (e.g., in the form of an HTTP GET request) from a requesting party, such as an ESP. In some embodiments, the request is sent from a call-taking application (e.g., call taking module 145) integrated into the ESP system 130. In some embodiments, the request (also referred to as an "emergency data request") is sent from an emergency response application 260. In some embodiments, the location retrieval module 254 provides a single GET endpoint for retrieving either the latest or paginated list of locations for a specific caller ID (e.g., an identifier of a user or an electronic device associated with a user, such as a phone number). For example, as described above, a phone number associated with a device 210 from which a location was received is included in the header, body, or metadata of the request sent to the location retrieval module 254. The clearinghouse 250 then retrieves a location or set of locations from the clearinghouse databases 257 and deliver the location or set of locations to the requesting party. In some embodiments, the location retrieval module 254 is a location information server (LIS). In some embodiments, the LIS is a NG911 standards-based XML API for the retrieval of location data from the clearinghouse databases 257. In some embodiments, as described above, the location retrieval module 254 accepts HELD requests from requesting parties and returns location data for a specific caller ID or anonymous reference. However, in some embodiments, the location retrieval module 254 automatically retrieves and transmits location data using a subscription system, as described below.

As depicted in FIG. 2, the set of retrieval modules 259 optionally include an additional data retrieval module 255. In some embodiments, the additional data retrieval module 255 is a JSON REST API for the retrieval of emergency or additional data. As described above, additional data optionally includes medical data, personal data, demographic data, and health data. Additional data also optionally includes data received from connected devices such as vehicles, IoT devices, and wearable devices. In some embodiments, the additional data retrieval module 255 receives a query or request (e.g., in the form of an HTTP GET request) from a requesting party, such as an ESP. In some embodiments, the request (also referred to as an "emergency data request") is sent from an emergency response application 260. The additional data then retrieves additional data associated with a specific or particular identifier of a user or an electronic device associated with the user, such as a phone number, and returns the data to the requesting party. In some embodiments, the set of retrieval modules 259 further includes one or more other data retrieval modules 256, which function similarly to the location retrieval module 254 and additional data retrieval module 255, for the retrieval of data stored in the clearinghouse databases 257 not retrieved by the location retrieval module 254 or additional data retrieval module 255. However, in some embodiments, the additional data retrieval module 255 automatically retrieves and transmits additional data using a subscription system, as described below.

In some embodiments, a retrieval module within the set of retrieval modules 259 and a corresponding ingestion module within the set of ingestion modules 258 form a sub-clearinghouse. For example, in some embodiments, location ingestion module 251 and location retrieval module 254 combine to form location clearinghouse 150A (as shown in FIG. 1B). Likewise, in some embodiments, additional data ingestion module 252 and additional data retrieval module 255 combine to form additional data clearinghouse 150B. In some embodiments, a requesting party is only given access to a particular sub-clearinghouse. For example, a police officer is only given access to the location clearinghouse 150A, while an EMT (emergency medical technician) is only given access to the additional data clearinghouse 150B. However, a requesting party is given differential access to the clearinghouse 150, sub-clearinghouses, or particular emergency data categories within the clearinghouse 150 based on any factor or set of factors. In some embodiments, a requesting party initiates a query or request (i.e., an emergency data request) using an emergency response application 260 (as described below), which in turn generates the query and transmits the query to the clearinghouse 250.

In some embodiments, the clearinghouse 250 includes an emergency data streaming module or streaming module (not shown). In some embodiments, a streaming module is capable of both receiving and transmitting emergency data, but emergency data received by the streaming module is not stored within a database. Instead, emergency data is streamed through the streaming module without being committed to memory within the clearinghouse 250. In some embodiments, the streaming module establishes an active or persistent communication link (e.g., a websocket connection, as described below) between the EMS or clearinghouse 250 and an emergency data recipient. For example, in some embodiments in which emergency data is pushed from the EMS or clearinghouse 250 to an emergency data recipient, the streaming module can establish a persistent communication link between the EMS or clearinghouse 250 and the emergency data recipient, and any emergency data that is received by the EMS or clearinghouse 250 to which the emergency data recipient is subscribed (as described below) is pushed to the emergency data recipient through the persistent communication link without being committed to memory within the EMS or clearinghouse 250.

As described above, in some embodiments, an emergency management system (EMS) maintains a clearinghouse 250 that obtains and shares emergency data to aid emergency service providers (ESPs) in responding to emergencies. During an emergency, in some embodiments, an ESP can send an emergency data request to the EMS through the emergency response application 260, and, in response, the EMS can send any available emergency data associated with the emergency back to the emergency response application 260. In some embodiments, as described above, the emergency response application 260 includes an identifier associated with an emergency alert in the emergency data request. The EMS can then use the identifier associated with the emergency alert to retrieve emergency data associated with the emergency alert from the clearinghouse. For example, as described above, an ESP 230 (e.g., a public safety answering point (PSAP)) can receive an emergency alert in the form of a 9-1-1 phone call (representative of an emergency or potential emergency) from a mobile phone associated with a phone number (e.g., (555) 555-5555). The ESP 230 can then send an emergency data request including the phone number (i.e., the identifier of the emergency alert) to the EMS, which can then retrieve any emergency data within or otherwise accessible by the clearinghouse 250 associated with the phone number and return the available emergency data to the requesting ESP 230. This process of returning emergency data to the emergency response application 260 in response to an emergency data request is referred to as "pulling" emergency data from the clearinghouse.

However, in some embodiments, the EMS can "push" emergency data from the clearinghouse 250 to the emergency response application (i.e., the EMS can send emergency data to the emergency response application 260 without receiving an emergency data request). In some embodiments, the EMS pushes emergency data to the emergency response application 260 using an emergency data subscription system. Using the emergency data subscription system, a recipient (or potential recipient) of emergency data from the clearinghouse 250 can subscribe to the clearinghouse 250 for a particular device identifier, user identifier, or ESP account (hereinafter, "subscription"). After subscribing to a subscription, the recipient (e.g., an ESP) may automatically receive updates regarding the subscription without first sending an emergency data request. For example, in some embodiments, if an ESP subscribes to a phone number, whenever the clearinghouse 250 receives updated emergency data associated with the phone number, the clearinghouse 250 can automatically send the updated emergency data associated with the phone number to the ESP (e.g., through the emergency response application 260), without first receiving an emergency data request including the phone number. For example, in some embodiments, if a recipient is subscribed to a particular phone number, and the clearinghouse 250 receives a new or updated location associated with the particular phone number, the clearinghouse 250 will instantly and automatically push the new or updated location associated with the particular phone number to the recipient the moment that the new or updated location is received by the clearinghouse 250, without the recipient having to send an emergency data request. In some embodiments, when an ESP or ESP personnel accesses the emergency response application 260 at a computing device associated with the ESP or ESP personnel, the EMS establishes a persistent or active communication link (e.g., a websocket connection) with the computing device in order to push emergency data regarding a subscription to which the ESP or ESP personnel is subscribed to the emergency response application 260.

In some embodiments, an active communication link is a connection, or a potential connection (e.g., two corresponding endpoints), between two entities (e.g., an EMS and an ESP) through which data can be freely transmitted (i.e., without a recipient entity having to actively accept transmitted data). In some embodiments, an active communication link is a persistent communication link. In some embodiments, a persistent communication link is a communication link that endures for a period of time that is not dependent on the transmission of a particular packet of data. For example, in some embodiments, a persistent communication link between two entities (e.g., an EMS and an ESP) endures until the communication link is actively terminated by one of the entities, as opposed to passively terminating once a particular packet of data (e.g., a particular emergency alert) has been transmitted. In another example, a persistent communication link endures for a predetermined amount of time (e.g., five minutes or an hour). In another example, a persistent communication link established between an EMS and an ESP through an emergency response application endures until a login session on the emergency response application is terminated or the emergency response application itself is terminated. In some embodiments, a persistent communication link is a websocket connection. Web Socket is a type of computer communications protocol. A websocket connection is a longstanding or persistent internet connection between a client and a server that allows for bidirectional communication between the client and server without the client needing to send data requests to the server, which differentiates the Web Socket computer communications protocol from other types of computer communications protocols such as the HyperTextual Transfer Protocol (HTTP). The Web Socket protocol is often used by chat clients to facilitate user to user webchats. In some embodiments, the EMS establishes an active communication link with a computing device (e.g., an ESP console 130) in response to receiving an emergency data request. In some embodiments, the EMS establishes an active communication link with an ESP console when an ESP personnel logs into the emergency response application 260 at the ESP console.

In some embodiments, the EMS establishes an active communication link with a responder device when an ESP personnel logs into the emergency response application 260 at the responder device. In some embodiments, an active communication link established between the EMS and a computing device associated with ESP personnel is maintained by the EMS for the duration of the ESP personnel's log-in session.

In some embodiments, the EMS automatically subscribes a recipient to a subscription (e.g., a particular device identifier or user identifier) in response to receiving an emergency data request including the subscription or an identifier of the subscription. For example, in some embodiments, when an ESP personnel sends an emergency data request including a phone number to the EMS through their ESP console (e.g., through the emergency response application 260), the EMS subscribes the ESP personnel to the phone number and establishes a persistent or active communication link with the ESP console. Then, whenever the clearinghouse 250 receives updated emergency data associated with the phone number, the EMS can automatically push the updated emergency data associated with the phone number to the ESP console. For example, an ESP personnel logs into an emergency response application 260 in communication with the EMS on the ESP personnel's ESP console. Subsequently, the ESP personnel receives a 9-1-1 call from a mobile phone and then generates and sends an emergency data request including the phone number of the mobile phone to the EMS through the emergency response application 260. The EMS then uses the phone number of the mobile phone to retrieve the most recent location associated with the mobile phone received by the clearinghouse and returns the most recent location associated with the mobile phone to the ESP personnel through the emergency response application 260. The EMS simultaneously subscribes the ESP personnel to the phone number of the mobile phone and establishes a websocket connection between the EMS and the ESP console and automatically pushes any updated emergency data (e.g., enhanced locations) associated with the phone number received by the clearinghouse to the emergency response application 260 as soon as the updated emergency data associated with the phone number is received by the clearinghouse 250.

In some embodiments, an ESP is associated with an identifier of the ESP (e.g., a unique ESP account ID; also referred to as an "ESP identifier") that an ESP or ESP personnel can subscribe to. The EMS can then establish a persistent or active communication link with a computing device associated with an ESP or ESP personnel subscribed to the unique ESP identifier and push emergency data associated with the unique ESP identifier to the computing device (e.g., through the emergency response application 260) whenever new or updated emergency data associated or tagged with the unique ESP identifier is received by the clearinghouse 250. For example, in some embodiments, when the clearinghouse 250 receives a location (e.g., an emergency location) associated with an emergency alert (e.g., when a person calls 9-1-1 from a mobile phone and the mobile phone responsively sends a current location of the mobile phone to the clearinghouse 250), the EMS retrieves one or more geofences (as described below) associated with each ESP registered with the EMS and determines which (if any) of the geofences that the location associated with the emergency alert falls within. The EMS then tags the location associated with the emergency alert with the unique ESP identifiers associated with each of the ESPs associated with geofences that the location associated with the emergency alert falls within. For example, if four ESPs are registered with the EMS—ESP A, ESP B, ESP C, and ESP D—and the clearinghouse 250 receives a location associated with an emergency that falls within the one or more of the geofences associated with ESP A and ESP D, the EMS can tag the location associated with the emergency alert with the unique ESP account ID associated with ESP A and the unique ESP account ID associated with ESP D. The EMS can then push the location associated with the emergency alert to any ESPs or ESP personnel with an established persistent or active communication link with the EMS and currently subscribed to either the unique ESP account ID for ESP A or the unique ESP account ID for ESP D. In some embodiments, when an ESP personnel logs into the emergency response application 260, a communication is sent to the EMS that includes one or more unique ESP account IDs that the ESP personnel or their respective ESP is currently subscribed to.

Emergency Data Geofencing

Figure 3:
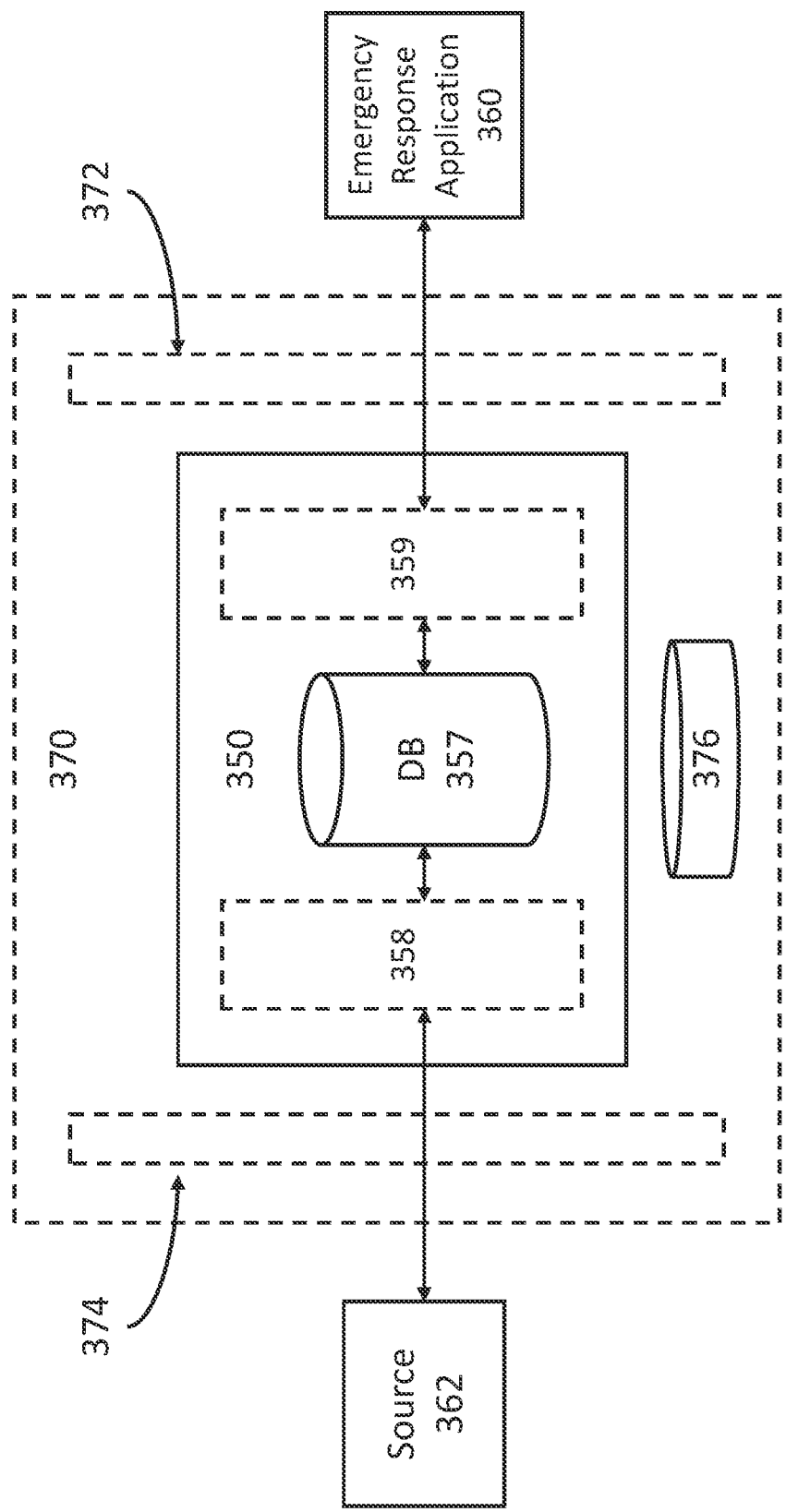
FIG. 3 depicts a diagram of a geofence system applied to a clearinghouse for emergency data in accordance with one embodiment of the present disclosure.

FIG. 3 depicts a diagram of a geofence applied to a clearinghouse for emergency data. In some embodiments, a geofence module 370 is applied to the clearinghouse 350 to protect potentially sensitive emergency data using geospatial analysis. In some embodiments, as described above with respect to FIG. 2, the clearinghouse 350 includes a set of ingestion modules 358 and a set of retrieval modules 359. The set of ingestion modules can receive emergency data, or other information that can be useful in responding to an emergency, from a variety of sources. For example, in some embodiments, a smartphone sends emergency data to the clearinghouse 350 in the form of an HTTP POST API call in response to a user of the smartphone initiating a 911 emergency call. As depicted in FIG. 3, in some embodiments, when emergency data (e.g., an emergency location or additional emergency data) is sent (directly or indirectly, such as through a third-party server) from an electronic device 310 to the clearinghouse 350, the emergency data is first processed by a geofence module 370 before being received by the set of ingestion modules 358 within the clearinghouse 350. Similarly, in some embodiments, when an emergency data request is sent from a requesting party (e.g., through an emergency response application 360, as described below), the emergency data request is processed by the geofence module 370 before being received by the set of retrieval modules 359.

In some embodiments, as mentioned above, a geofence module 370 is applied to the clearinghouse 350 to protect potentially sensitive emergency data using geofences. Generally, a geofence is a virtual perimeter for a real-world geographic area. A geofence can be dynamically generated—as in a radius around a point location—or a geofence can be a predefined set of boundaries (such as school zones or neighborhood boundaries). The use of a geofence is called geofencing, and one example of usage involves a location-aware device of a location-based service (LBS) user entering or exiting a geofence. Entry or exit from a geofence could trigger an alert to the device's user as well as messaging to the geofence operator. The geofence information, which could contain the location of the device, could be sent to a mobile telephone or an email account.

For emergency response, an emergency service provider (public or private entities) may be given jurisdictional authority to a certain geographical region or jurisdiction (also referred to as "authoritative regions"). In the context of emergency services, one or more geofences may correspond to the authoritative region of an ESP. In many cases, the ESP is a public entity such as a public safety answering point (PSAP) or a public safety service (PSS; e.g., a police department, a fire department, a federal disaster management agency, national highway police, etc.), which have jurisdiction over a designated area (sometimes, overlapping areas). Geofences are used to define the jurisdictional authority by various methods and in various Geographic Information System (GIS) formats. In some embodiments, geofences only represent authoritative regions if the geofence has been assigned or verified by a local, state, or federal government. In some embodiments, geofences represent assigned jurisdictions that are not necessarily authoritative regions. For example, in some embodiments, a geofence is unilaterally created by its associated ESP without verification or assignment by a local, state, or federal government.

Geofences can be defined in various ways. For example, in some embodiments, a geofence comprises one or more of the following: a county boundary, a state boundary, a collection of postal/zip codes, a collection of cell sectors, simple shapes, complex polygons, or other shapes or areas. In some embodiments, geofences comprise approximations where the "approximated" geofence encloses an approximation of the authoritative region.

Updates to geofences may be required over time because the authoritative regions may change over time. Geofences may change over time (e.g., a new sub-division has cropped up) and require updates. In some embodiments, the systems and methods described herein allow geofences to be updated (e.g., a PSAP administrator can upload updated geofence GIS shapefiles).

For maintaining the privacy, security and integrity of the data, geofencing may be applied to emergency data. For example, applying geofence filters to the emergency data allows additional avenues for monitoring, both visibility and control, over the clearinghouse to detect anomalies/spikes and reduce the risk of security breaches.

In some embodiments, the emergency data is obtained or received from an emergency data source 362 (such as an electronic device or third-party server, as described above) by the clearinghouse 350. Then, geofencing can be applied to the emergency data in various ways. In some embodiments, an ingestion geofence 374 (also referred to as "upstream filtering") is applied to restrict sending of data from emergency data sources 362 to the clearinghouse 350 from geographical areas that are not covered by the "combined authoritative jurisdiction" (i.e., covered one or more provisioned geofences in the geofence database 376). In such an embodiment, the geofence module 370 identifies a location associated with the emergency data (e.g., a device-based hybrid location received from a mobile phone as part of an emergency alert) and determines if the location falls within any of the geofences stored within the geofence database 376. In some embodiments, the ingestion geofence (also referred to as an "ingress filter") is applied to the ingestion module 358 to protect against accidental breaches of privacy. In some embodiments, the ingestion module 358 of the clearinghouse 350 drops location payloads that do fall within the geographical region covered by the "combined authoritative region." In some embodiments, geofencing is applied to determine if a location associated with emergency data received by the clearinghouse 350 falls within any of the geofences stored within the geofence database 376, and, if so, which entity is associated with the geofence that the location falls within, as described below.

In some embodiments, the clearinghouse 350 comprises one or more databases 357 (e.g., a database storing emergency data). For example, in some embodiments, the retrieval module 359 obtains emergency data from a clearinghouse database 357 to send to an emergency data recipient (e.g., an ESP) in response to an emergency data request, as described above. In some embodiments, the retrieval geofence 372 (also referred to as an "egress filter") is applied at the retrieval module 359 of the clearinghouse 350. Applying geofencing to retrieved emergency data will protect against abuse and limit the scope of security breaches in cases where credentials have been compromised. In some embodiments, one or more geofences are associated with one or more credentials associated with an ESP agency or organization. In some embodiments, the credentials associated with an ESP agency or organization confers authorization to access data such as emergency data from the clearinghouse. In some embodiments, specific authorization to access data is granted individually to members of a PSAP through tokens derived from the credentials for that PSAP.

In some embodiments, when the retrieval module 359 checks the coordinates of current location data (within retrieved emergency data) associated with a device identifier with the geofence(s) associated with the credentials in an emergency data request. If the current location is within the geofence region (enclosed by the geofence(s)), the current location is returned to the ESP and displayed within the ESP console. If not, the module 359 will return a "not found" message (as opposed to the retrieved location is outside the geofence) to protect privacy.

In some embodiments, geofences can be used for reporting results for internal metrics and monitoring the system. For example, the number of emergency data requests, locations provided, "no location found" etc., can be obtained for a geofence(s) associated with a PSAP. Using single or combined geofences, the emergency data can be obtained on county-wide, city-wide, postal code, course grid (rectangle overlay), state-wide, or country-wide basis. In some embodiments, ingress and egress counters (i.e., percent of emergency sessions where the location data was received, but not queried) and other similar metrics can be calculated and analyzed to identify problems and spikes. In some embodiments, different geofences are used for retrieval and for reporting.

In some embodiments, a location associated with a given emergency can be determined to fall within a plurality of geofences, as described below. In some embodiments, emergency data for the emergency is pushed to each PSAP having a geofence that the emergency (e.g., the location associated with the emergency) falls within. In some embodiments, emergency data for the emergency is transmitted to a subset of PSAPs having a geofence that encloses or encompasses the location associated with the emergency. In some embodiments, the location data of an individual device identifier is not transmitted to more than one PSAP at one time. Thus, the emergency data is only transmitted to one PSAP (i.e., a primary agency), but may be transmitted to multiple secondary agencies (e.g., police departments) and regional agencies. In some embodiments, the emergency data is transmitted to one or more emergency responders who may be associated with an ESP (e.g., police officers working for a police department). In some embodiments, wherein a device identifier egresses a geofence in which communication began and ingresses into a neighboring geofence, the location data is automatically transmitted to the neighboring PSAP with jurisdiction over the ingress geofence.

In some embodiments, to determine the appropriate ESP(s) for sharing emergency data, the authoritative jurisdiction (defined by one or more geofences) of an ESP (e.g., primary agency) must be evaluated before it is used by the geofence module 370. In case of irregularities (e.g., overlaps, islands, or other irregular features), steps may be taken to check with respective agency, geographical boundaries (national and international borders, county lines, rivers, hills, etc.), or other authority. In some embodiments, call routing data may be analyzed to see which ESP is answering the emergency call.

Raw geofences may be pre-processed to generate processed geofences using a variety of techniques. For removing irregularities, a geofence may be processed to resolve overlaps, remove islands and projections, smooth boundaries, modifying the file format or size, etc.

In some cases, there may be overlap between geofences of two or more ESPs. In some embodiments, the emergency data may be shared with the two or more ESPs to err on the side of making mission critical information to all entities that may be involved in the emergency response. In some embodiments, the two or more ESPs are primary agencies (e.g., PSAPs) and the emergency data has to be shared with one appropriate ESP. To determine the appropriate ESP(s) for sharing emergency data, the authoritative jurisdiction (defined by one or more geofences) of the overlapping ESPs by checking with respective agency, geographical boundaries (national and international borders, county lines, rivers, hills, etc.), sample routing data, etc. In contrast, if the overlapping ESPs include one or more secondary ESPs, the overlap may be retained and emergency data may be shared with one or more ESPs (e.g., one primary agency and two secondary agencies).

In some embodiments, a buffer (e.g., +10 km) is added to the geofence(s) so that results within the buffer zone are also returned. In many cases, PSAPs have discretion and incentive to respond to emergencies that are beyond their authoritative jurisdiction. As an example, a geofence that is a circular area with a radius of 10 km would have an area of 100 $\pi$ or ~314 km2, whereas the same area with a 10 km buffer around its circumference would have yield a combined radius of 20 km and a combined area of 400 $\pi$ or ~1256 km2. In some embodiments, the buffer is from 0.5 km to 5 km, from 0.5 km to 10 km, from 0.5 km to 15 km, from 0.5 km to 20 km, from 0.5 km to 25 km, or from 0.5 km to 30 km.

Figure 4:
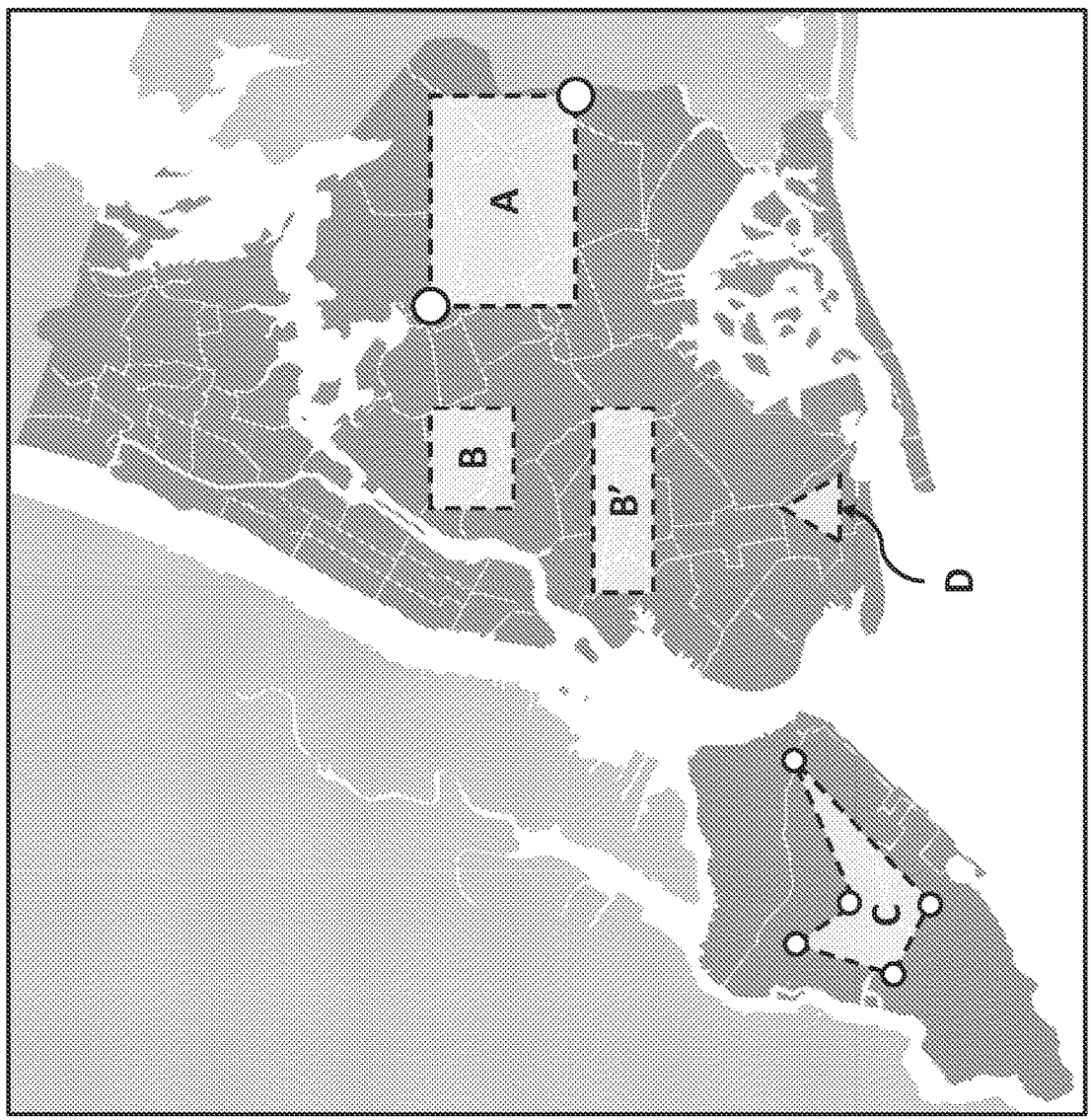
FIG. 4 illustrates a map of non-limiting examples of geofence approximations in accordance with one embodiment of the present disclosure.

FIG. 4 illustrates non-limiting examples of geofence approximations that may be submitted as an "authoritative jurisdiction" for an ESP. One or more geofences enclose the geofenced region which is under the authoritative jurisdiction of an ESP. In some cases, the geofenced region may be a complex polygon, but it may be approximated using an appropriate shape. For example, a rectangle (A), two disjointed rectangles (B, B'), a polygon with several sides (C) and a triangle (D), may represent different geofenced regions (defined by one or more geofences).

In some embodiments, an administrator of a PSAP submits the complex authoritative jurisdiction as one or more approximate geofence(s) by specifying points. For example, the PSAP administrator can submit geofenced region A by specifying two points—the north-west corner and the south-east corner using a drawing tool provided by the GUI of an emergency response application. In this example, the two points of the geofenced region are set using two latitude-longitude coordinates. In another example, the multiple-sided polygon C is submitted by specifying the five corners. In some embodiments, a PSAP administrator approximates a geofence for a PSAP by drawing one or more polygons using a drawing tool provided by the GUI of the emergency response application. In some embodiments, a geofence is generated using a series of points that are connected (e.g., entering three longitude-latitude points on a map to form a triangular geofence).

Approximating a complex geofenced region has several advantages. The geofence(s) are simple and the calculations can be quicker and less cumbersome for applications where exact calculations are not needed.

In some embodiments, a PSAP administrator can submit a GIS file (e.g., a shapefile) that represents the actual authoritative jurisdiction of the PSAP, which may then be provisioned in a geofence database. It is appreciated that a GIS file defining the authoritative jurisdiction may be saved in one or more industry-acceptable formats such as a shapefile, a GeoJSON file, KML file, etc. In some embodiments, the GIS file includes one or more features such as points, lines, polygons, density, and other shapes. A GeoJSON is open standard GIS file representing geographical features and non-spatial attributes based on JavaScript Object Notation. Some non-limiting examples of features include points (such as addresses and locations), line strings (streets, highways and boundaries), polygons (countries, provinces, tracts of land), and multi-part collections of these types. A Keyhole Markup Language (KML) file includes geographic annotations and visualization on internet-based maps on Earth browsers. A shapefile is a vector data format for storing the location, shape, and attributes of geographic features. A shapefile is stored in a set of related files, each of which may contain one feature class (e.g., lines, points, polygons, etc.). In some embodiments, the shapefile is a file with extension .SHP in ESRI file format where SHP is the feature geometry, SHX is the shape index position and DBF is the attribute data.

Various embodiments of the geofence database are contemplated. In some embodiments, one or more databases are searchable using a PSAP identifier, credentials, or other information. In some embodiments, an emergency location is searched through several geofences in the geofence database. In some cases, the geofenced region is shrunk for ease of storage and to simplify calculations.

Figure 5:
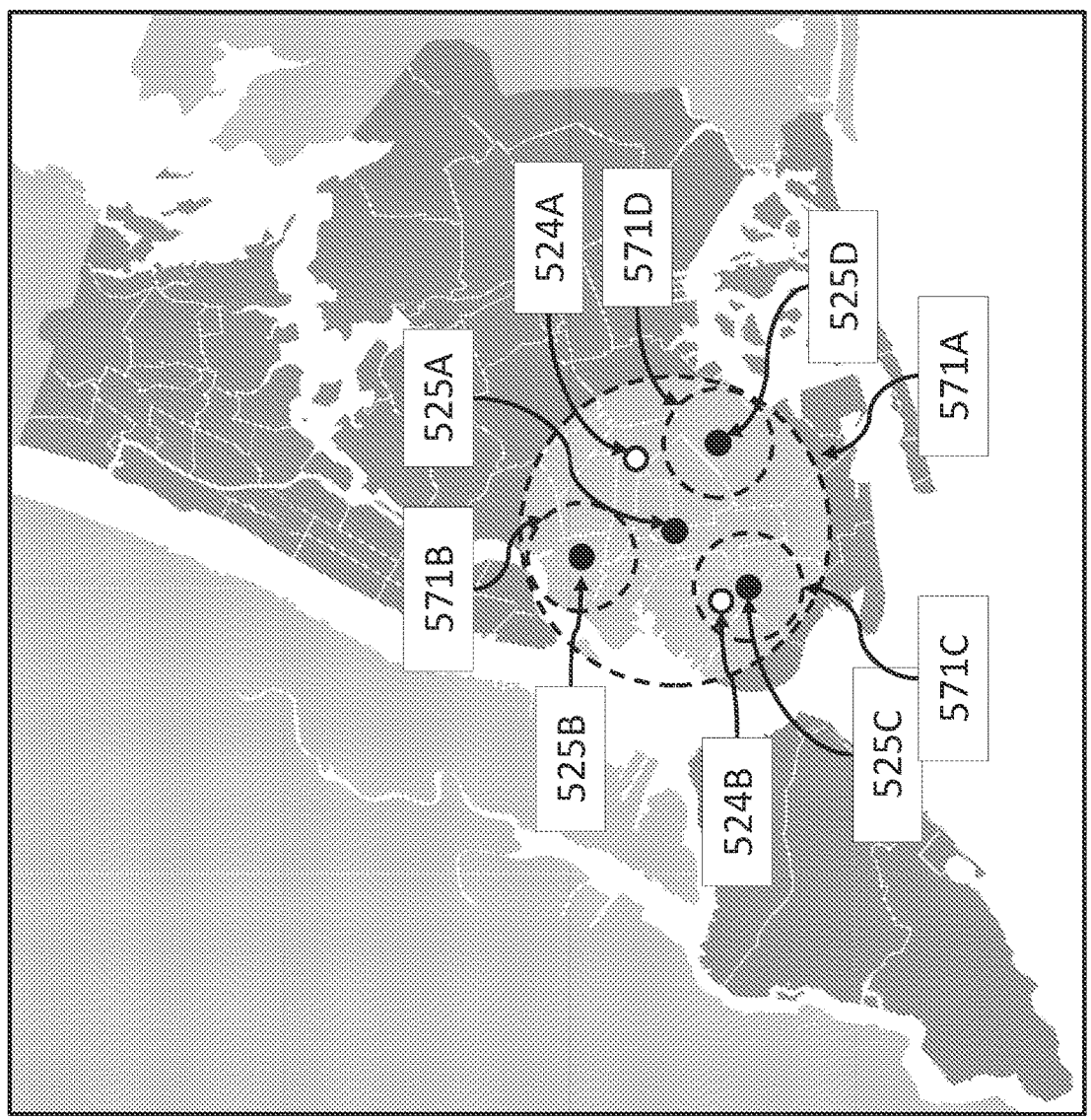
FIG. 5 illustrates non-limiting examples of geofenced regions defined by one or more geofences within the United States in accordance with one embodiment of the present disclosure.

FIG. 5 illustrates non-limiting examples of geofences stored within the geofence module. As described above, the geofence module and the geofence database can store, process, and functionalize geofence associated with different types of entities, in addition to emergency service providers. For example, location marker 525A (black dot with white outline) represents the location of an emergency service provider (ESP; e.g., a public safety answering point) and geofence 571A represents a geofence associated with the ESP. In this example, the geofence 571A is a circle defined by a radius from the location of the ESP. Three other location markers are depicted in FIG. 5, (location markers 525B, 525C, and 525D) each associated with its own geofence (geofences 571B, 571C, and 571D, respectively). In one example, each of the three location markers 525 represent the location of a secondary emergency service provider. For example, location marker 525B represents the location of a police department, location marker 525C represents the location of a fire department, and location marker 525D represent the location of a hospital. Or, for example, location markers 525B, 525C, and 525D represent the locations of three different fire departments. In another example, each of the three location markers 525B-525D represent the location of an individual emergency responder (e.g., a police officer) and the respective geofences 571B-571D are circles defined by a radius from the location of the individual emergency responder and are dynamically updated as the location of the individual emergency responder changes (e.g., as a police officer moves from one location to another). In another example, each of the three location markers 525B-525D and the geofences 571B-571D represent the locations and geofences different emergency response assets (e.g., a drone or a smart AED), respectively, as described below.

In addition to the location markers 525, two emergency locations 524A and 524B are depicted in FIG. 5. In some embodiments, the EMS can use the geofence system to determine which geofences (if any)—associated with which entities—that an emergency location falls within. For example, in the example in which location marker 525A represents the location of an emergency service provider (ESP) and the location markers 525B-525D represent the locations of different emergency response assets, the EMS can retrieve any and all geofences stored within the geofence database (e.g., geofences 571A-571D) and crosscheck the geofences with the emergency locations. In this example, the geofence system then determines that emergency location 524A falls within the geofence 571A associated with the ESP but does not fall within any of the geofences 571B-571D associated with the emergency response assets. However, the geofence system also determines that emergency location 524B falls within the geofence 571A associated with the ESP as well as the geofence 571C associated with emergency response asset represented by location marker 525C.

Emergency Response Application

As mentioned above, in some embodiments, data and information is shared between the emergency management system (EMS) and an emergency service provider (ESP) through an emergency response application. In some embodiments, the emergency response application is a software application either installed on a computing device at the ESP or accessed via the internet through a web browser on the computing device (e.g., the emergency response application is hosted on a cloud computing system by the EMS). Generally, the emergency response application functions to both facilitate a two-way communication link between the EMS and the ESP and visualize data (e.g., emergency data) received by the ESP from the EMS. The emergency response application 660 optionally includes various components, such as a frontend application (hereinafter "graphical user interface" or "GUI"), a backend application, an authorization module, and a user database. In some embodiments, the emergency response application 660 additionally or alternatively includes a credential management system or a geofence module. In some embodiments, the credential management system and the geofence module are external to the emergency response application 660 and communicatively coupled to the emergency response application 660 (e.g., the credential management system or geofence module can be housed or hosted on a cloud computing system by the EMS). Any or all of the components of the emergency response application may be hosted on a cloud computing system by the EMS, a computing device at an ESP, or some combination thereof.

In some embodiments, the emergency response application 660 is a webpage that can be accessed through an internet or web browser. In such embodiments, the emergency response application 660 can be quickly and easily integrated into the systems used by emergency service providers (ESPs), such as public safety answering points (PSAPs), because accessing and using emergency response application 660 requires no additional software or hardware outside of standard computing devices and networks. As previously discussed, one of the greatest hinderances that PSAPs face in providing emergency assistance to people experiencing emergency situations is in acquiring accurate locations of the emergencies and the people involved, because PSAPs are currently typically limited to verbally asking for and verbally receiving locations from callers. In some embodiments, the clearinghouse is capable of receiving accurate locations (as well as additional emergency data, as described above) from electronic devices such as smartphones and delivering the accurate locations to the appropriate PSAPs during emergency situations. Therefore, it is advantageous to provide the emergency response application 660 to PSAPs in the form of a webpage accessible through a standard web browser, in order to provide the potentially life-saving information stored within the clearinghouse to those capable of providing emergency assistance as quickly and easily as possible. However, in some embodiments, the emergency response application is a software application installed on a computing device at an ESP. The emergency response application may be provided by the EMS or by a third-party.

Figure 6:
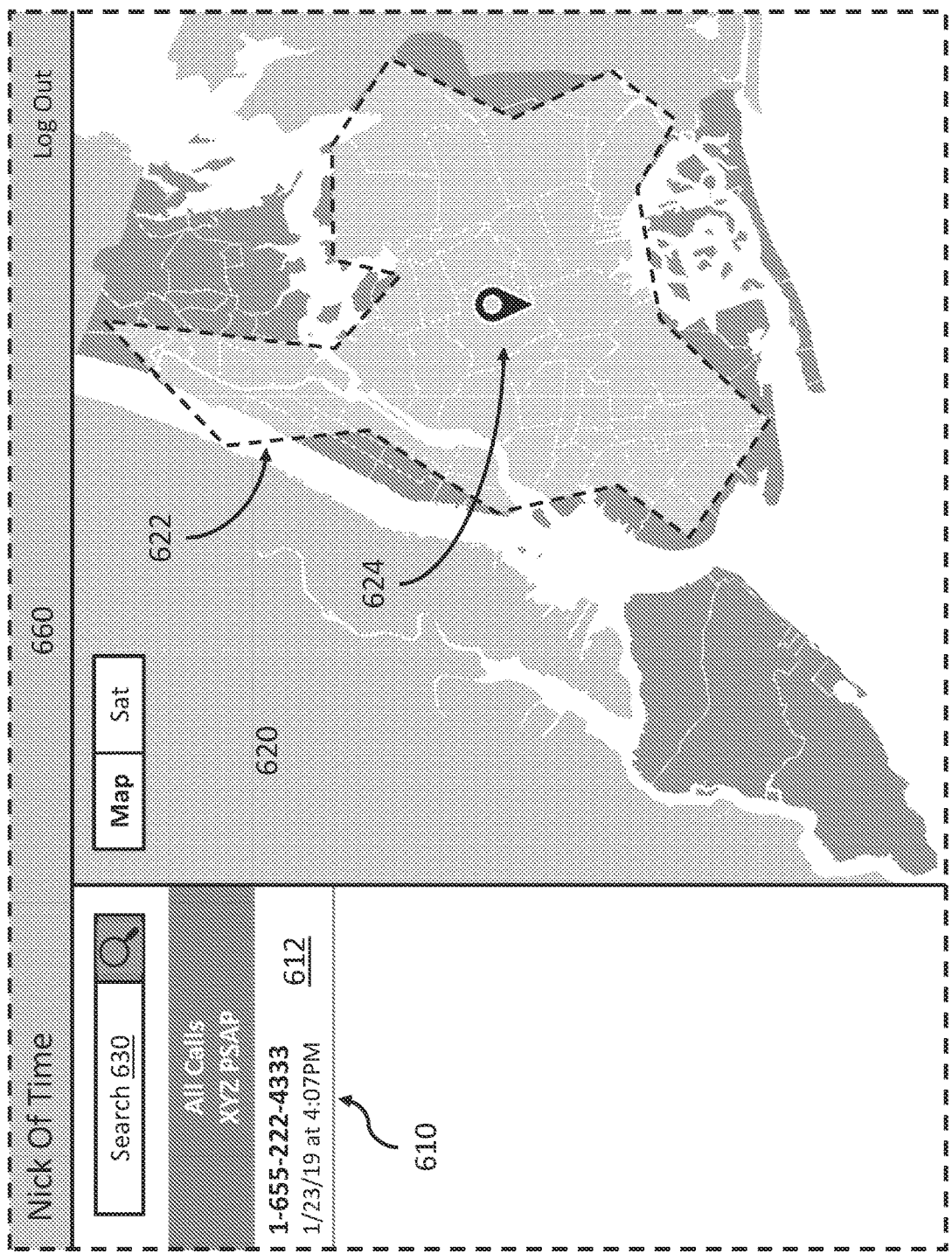
FIG. 6 illustrates a graphical user interface (GUI) of an emergency response application in accordance with one embodiment of the present disclosure.

FIG. 6 illustrates an embodiment of a graphical user interface (GUI) provided by an emergency response application 660. The dashboard is a page within the GUI that provides interactive elements that allow a user at an ESP to receive data from the EMS, visualize data received from the EMS, and transmit data to the EMS. For example, in some embodiments, the dashboard includes an entry field 630 through which a user can submit a device identifier, such as by typing or pasting the device identifier into the entry field 630. In some embodiments, after submitting a device identifier through the entry field 630, the user can prompt the emergency response application to generate and send an emergency data request by selecting a search button. The emergency response application 660 then generates an emergency data request including the device identifier and any other necessary information (e.g., a temporary access token) and transmits the emergency data request to the EMS. The EMS can then return any available emergency data associated with the device identifier to the emergency response application 660, as described above and below. In another example, in some embodiments, the emergency response application 660 can automatically receive emergency data from the EMS for emergencies relevant to an ESP (e.g., emergencies located within the jurisdiction of the ESP) without requiring a user to generate an emergency data request, as described above and below. After receiving emergency data from the EMS, the emergency response application 660 can then visualize the emergency data within the GUI of the emergency response application 660. For example, in some embodiments, the emergency response application 660 includes a list of incidents 610 and an interactive map 620, as illustrated by FIG. 6. As shown, in some embodiments, when the emergency response application 660 receives a location and a device identifier associated with an emergency occurring within the jurisdiction 622 of the receiving ESP, the emergency response application 660 displays the location associated with the emergency within the interactive map 620 as a location marker 624 and displays the device identifier associated with the emergency within the list of incidents 610 as an incident 612.

In addition to emergency locations, the emergency response application 660 can receive and visualize numerous types of emergency data from the EMS. For example, the emergency response application 660 can receive additional data regarding an emergency, such as demographic or medical data associated with a person involved in the emergency (e.g., an emergency caller). In another example, the emergency response application 660 can receive data from sensors associated with the emergency, such as heart-rate data collected by a sensor on an emergency caller's smartwatch. Or, for example, the emergency response application 660 can receive data regarding emergency response assets available for an emergency, as described below. The emergency response application 660 can visualize any emergency data received from the EMS within the GUI of the emergency response application.

Emergency Data Transmission—Requests & Subscriptions

As described above, in some embodiments, an emergency management system (EMS) maintains a clearinghouse that obtains and shares emergency data to aid emergency service providers (ESPs) in responding to emergencies. During an emergency, in some embodiments, an ESP can send an emergency data request to the EMS (e.g., through an emergency response application), and, in response, the EMS can send any available emergency data associated with the emergency back to the emergency response application. In some embodiments, as described above, the emergency response application includes an identifier associated with an emergency alert in the emergency data request. The EMS can then use the identifier associated with the emergency alert to retrieve emergency data associated with the emergency alert from the clearinghouse. For example, as described above, an ESP (e.g., a public safety answering point (PSAP)) can receive an emergency alert in the form of a 9-1-1 phone call (representative of an emergency or potential emergency) from a mobile phone associated with a phone number (e.g., (555) 555-5555). The ESP can then send an emergency data request including the phone number (i.e., the identifier associated with the emergency alert) to the EMS, which can then retrieve any emergency data within the clearinghouse associated with the phone number and return the available emergency data to the requesting ESP. This process of returning emergency data to an ESP in response to an emergency data request is referred to as "pulling" emergency data from the clearinghouse.

Figure 7:
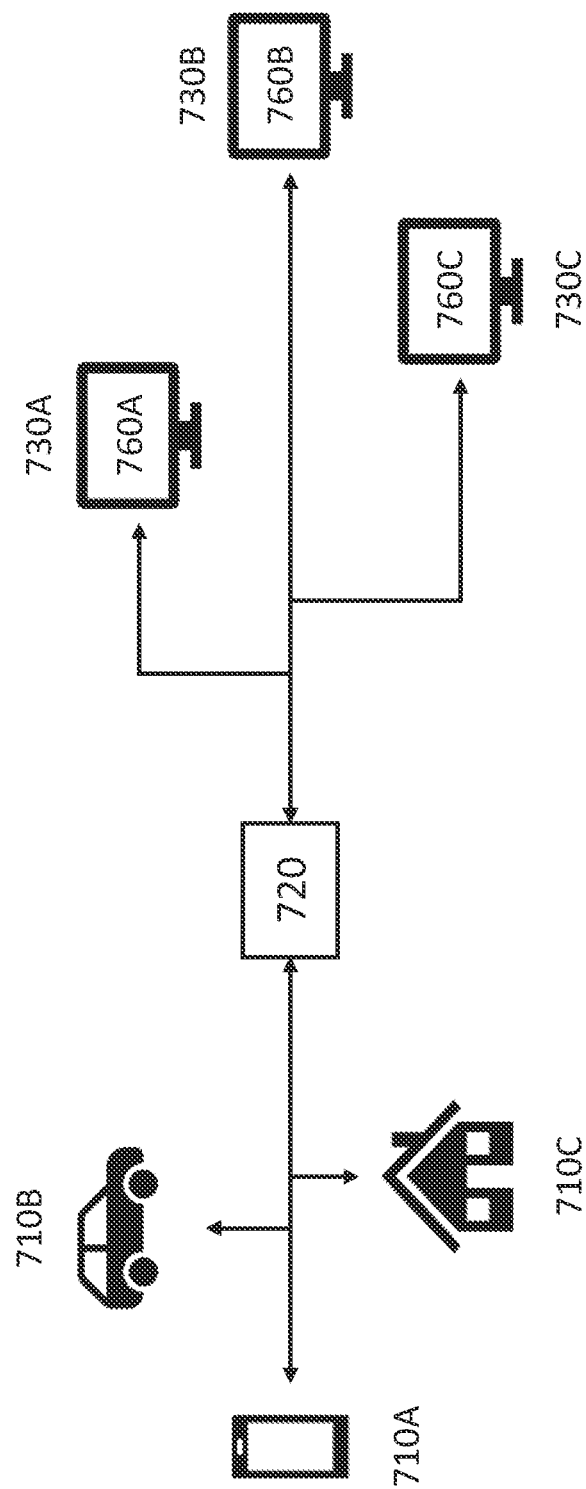
FIG. 7 depicts a diagram of a method for providing emergency assistance by an emergency management system (EMS) in accordance with one embodiment of the present disclosure.

As described above, in some embodiments, the emergency management system (EMS) can "push" emergency data from the Emergency Clearinghouse to emergency service providers (ESPs), such as by using an emergency data subscription system (hereinafter, "subscription system"). FIG. 7 depicts a flow diagram of a process for pushing emergency data from the Emergency Clearinghouse to one or more ESPs. In some embodiments, a member of an ESP (e.g., a PSAP staff member) logs into the emergency response application 760A at an ESP console 730A (e.g., a computing device associated with the ESP) by accessing the emergency response application 760A (e.g., by navigating to the emergency response application 760A through a web browser) and submitting their login information through the GUI of the emergency response application 760A. In some embodiments, when the ESP member logs into the emergency response application 760A by submitting their login information, the emergency response application 760A or EMS 720 then determines an ESP account ID associated with the ESP member's account and establishes a persistent or active communication link (e.g., a websocket connection) with the ESP console 730A, thereby automatically subscribing the ESP console to the ESP account ID for the duration of their login session. Then, as described above, when the EMS 720 receives an emergency alert including a location (e.g., when an emergency call is made from an electronic device 710A and sends an emergency alert to the EMS 720 including a location generated by the electronic device 710A), the EMS 720 retrieves a geofence associated with every ESP registered with the EMS 720 and determines if the location falls within any of the geofences. In response to determining that the location falls within a geofence associated with the ESP associated with the ESP account ID, the EMS 720 then associates the location with the ESP account ID, determines if there are any active or persistent communication links between the EMS 720 and any computing devices subscribed to the ESP account ID. In this instance, because the ESP console 730A is subscribed to the ESP account ID and actively linked to the EMS 720 through the persistent or active communication link, the EMS 720 automatically pushes (e.g., from the clearinghouse) the emergency alert or emergency data associated with the emergency alert (e.g., the location, a phone number, etc.) to the ESP console 730A for display within the emergency response application 760A. In some embodiments, emergency alerts or emergency data associated with emergency alerts that have been pushed to an ESP are displayed within a jurisdictional awareness view, as described below.

For example, ESP console 730A and ESP console 730B are two different ESP consoles associated with the same ESP (e.g., two computing devices at the same public safety answering point (PSAP)), PSAP A. ESP console 730C is associated with a second ESP, PSAP B. One day, PSAP call-takers access and successfully log into the emergency response application 760 (emergency response application 760A-760C) at each of the three ESP consoles (ESP console 730A-730C), thereby establishing three separate active communication links, one active communication link between the EMS 720 and each of the three ESP consoles. The ESP consoles are automatically subscribed by the EMS 720 to the ESP account IDs associated with their respective ESPs (ESP ID A for PSAP A and ESP ID B for PSAP B). Both PSAP A and PSAP B are associated with only one geofence, geofence A and geofence B, respectively. Geofences A and B do not overlap. The geofences have previously been tagged within the EMS 720 with their respective ESP account IDs (e.g., during the registration process for the emergency response application, as described above).

Later that day, an emergency call is made from communication device 710A, which causes communication device 710A to generate a first emergency alert including a first location of the communication device 710A and transmit the first emergency alert to the EMS 720. When the EMS 720 receives the first emergency alert, the EMS 720 retrieves some or all of the geofences stored within the EMS 720 and determines if the first location falls within any of the geofences stored within the EMS 720. In this example, the EMS 720 determines that the first location falls within geofence A, associated with PSAP A. In response, the EMS 720 tags the first location with the ESP account ID associated with geofence A, ESP ID A. The EMS 720 then determines if there are any active communication links between the EMS and any ESP consoles subscribed to ESP ID A and automatically pushes (e.g., from the clearinghouse) the first emergency alert to those ESP consoles. In this example, both ESP console 730A and ESP console 730B are subscribed to ESP ID A, so the EMS 720 automatically pushes the first emergency alert to both ESP console 730A and ESP console 730B for display within emergency response applications 760A and 760B, respectively, such as through a jurisdictional awareness view (as described below). The first location does not fall within geofence B, because geofence A and geofence B do not overlap, so the first emergency alert is not pushed to ESP console 730C, even though an active communication link has been established between the EMS 720 and ESP console 730C.

Three minutes later, the EMS 720 receives an emergency alert from electronic device 710C (e.g., a home security system) including a second location of the electronic device 710C. When the EMS 720 receives the second emergency alert, the EMS again retrieves some or all of the geofences stored within the EMS 720 and determines if the second location falls within any of the geofences stored within the EMS 720. In this example, the EMS 720 determines that the second location falls within geofence B, associated with PSAP B. In response, the EMS 720 tags the second location within the ESP account associated with geofence B, ESP ID B and automatically pushes the second emergency alert to ESP console 730C for display within emergency response application 760C, because ESP console 730C has an active communication link established with the EMS 720 and ESP console 730C is subscribed to ESP ID B. The EMS 720 does not push the second emergency alert to ESP console 730BA or ESP console 730B. Although ESP console 730A and ESP console 730B have active communication links established with the EMS 720, they are not subscribed to ESP ID B, and geofence A and geofence B do not overlap, meaning the second location does not fall within geofence A. Two minutes after that, the EMS 720 receives an emergency alert from electronic device 710B (e.g., an intelligent vehicle system) including a third location of the electronic device 710B. The EMS 720 determines that the third locations falls within geofence A (like the first location included in the first emergency alert) and thus automatically pushes the third emergency alert to both ESP console 730A and ESP console 730B for display within emergency response application 760A and 760B. In some embodiments, emergency response application 760A and emergency response application 760B display the first emergency alert and the third emergency alert simultaneously, such as through a jurisdictional awareness view, as described below.

Jurisdictional Awareness View

Figure 8:
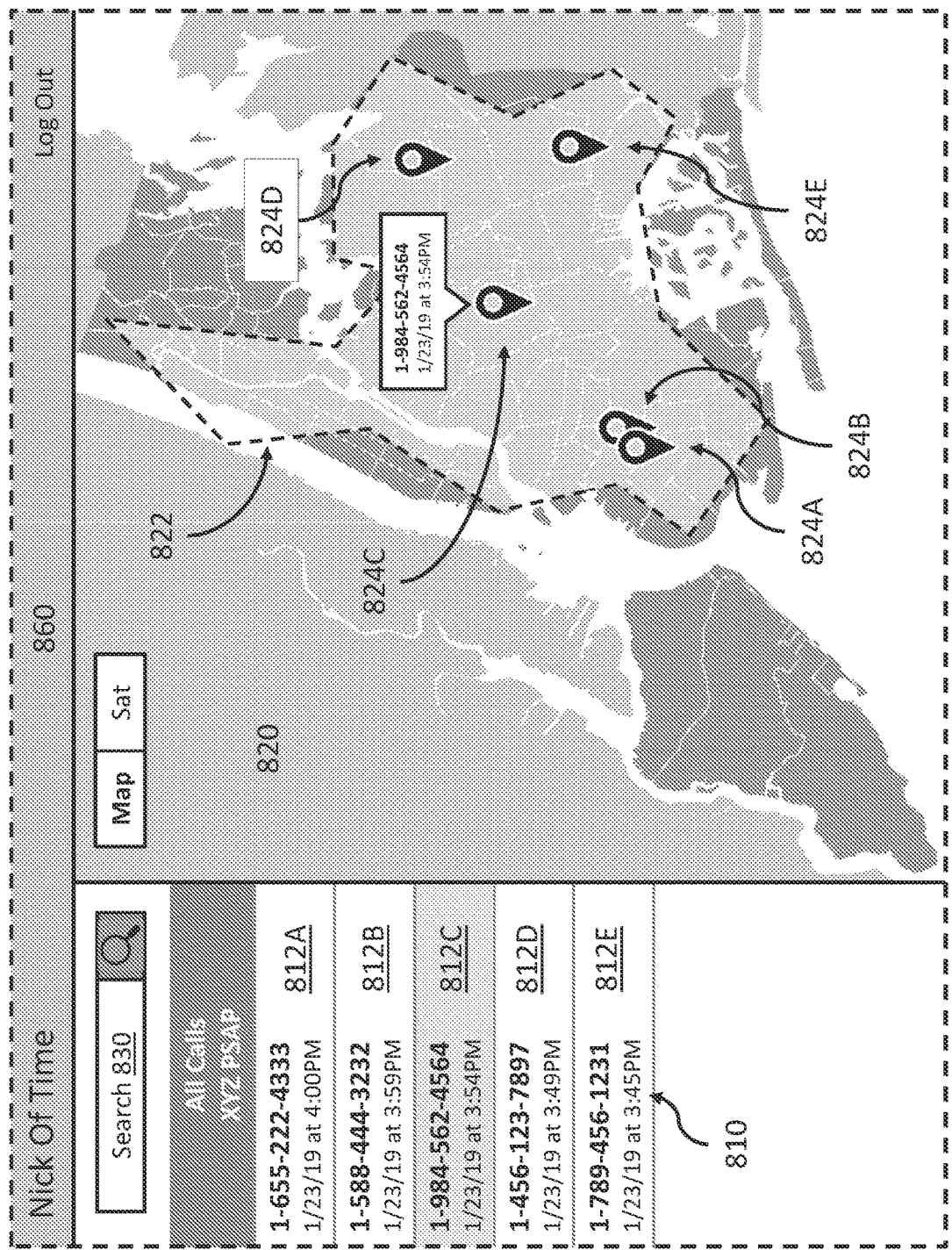
FIG. 8 illustrates an example of a graphical user interface (GUI) of an emergency response application in accordance with one embodiment of the present disclosure.

In some embodiments, the systems, applications, servers, devices, methods, and media disclosed herein provide a jurisdictional awareness view within the emergency response application, optionally for each of a plurality of emergency service providers (ESPs). In some embodiments, the jurisdictional awareness view enables an ESP to view one or more ongoing or recently received emergency alerts (e.g., emergency calls) within one or more geofenced jurisdictions. FIG. 8 illustrates the jurisdictional awareness view displayed within the emergency response application. In some embodiments, the jurisdictional awareness view includes a list of incidents 810 that displays one or more incidents 812 associated with one or more device identifiers (e.g. phone numbers, IP addresses). In some embodiments, the jurisdictional awareness view additionally or alternatively includes an interactive map 820 that displays one or more incident locations 824 associated with the one or more incidents 812 associated with the one or more device identifiers, as described below. In some embodiments, the jurisdictional awareness view displays incidents and incident locations only for emergencies occurring within the jurisdiction 822 of the ESP at which the emergency response application 860 is being accessed.

For example, in the example illustrated in FIG. 8, an ESP has accessed an emergency response application 860 provided by the EMS. In this example, the EMS has pushed emergency data associated with five different emergency alerts to the ESP (as described above) through the emergency response application 860. Accordingly, the emergency response application displays five different incidents 812 (e.g., incidents 812A-812E) within the list of incidents 810 and five corresponding incident locations 824 (e.g., incident locations 824A-824E) within the interactive map 820. As illustrated by FIG. 8, in some embodiments, incidents 812 and incident locations 824 may be selected or hovered over to highlight a particular incident 812. In this example, incident 812C and its corresponding incident location 824C have been selected and highlighted. In some embodiments, selecting a particular incident 812 or corresponding incident location 824 prompts the emergency response application 860 to display additional information associated with the particular incident 812 (e.g., additional emergency data or information associated with the emergency alert for which the particular incident 812 was created). Because the jurisdiction view can show an ESP numerous incidents 812 occurring within the jurisdiction 822 of the ESP simultaneously, the jurisdiction view can provide the ESP with situational awareness that the ESP otherwise would not have. For example, with the knowledge that incidents 812A and 812B originated in close proximity and at approximately the same time, an ESP personnel (e.g., a call taker at a public safety answering point) can determine that the two incidents may be related.

Emergency Response Asset Management

Disclosed herein are systems, servers, devices, methods, and media that provide emergency service providers (ESPs such as public safety answering points (PSAPs)) access to emergency response assets. In some embodiments, an emergency response asset is a device or system that can be leveraged or otherwise utilized to expedite or improve emergency response. In some embodiments, an emergency response asset is a non-human device or apparatus that can be remotely activated to perform a physical emergency response function. In some embodiments, activation of the emergency response asset includes opening or releasing a locking mechanism that secures the asset to its original starting location. For example, the emergency response asset can be an automated external defibrillator with a built-in locking mechanism that keeps it locked to an on-site fixed storage unit. The storage unit can be an enclosure (partial or wholly enclosed) that protects the emergency response asset from the elements and/or theft or vandalism. The storage unit may include visually distinctive elements such as one or more of design(s), colors, patterns, and/or lights (e.g., neon/bright/flashing lights similar to emergency vehicle lights) to grab the attention of passersby and/or first responders when the corresponding emergency response asset is activated. In some cases, the visually distinctive elements are apparent or show only when the emergency response asset is activated. For example, flashing lights may turn on along with an audio requesting assistance when a call taker remotely activates the emergency response asset. The visually distinctive elements can be present on the storage unit and/or the emergency response asset. In some embodiments, the emergency response asset is secured without requiring a storage unit. For example, an emergency response asset may be a drone carrying a medical kit that is secured to a fixture on the roof of a building via a locking mechanism, and release of the locking mechanism enables the drone to maneuver to the emergency location pursuant to instructions provided via the asset controls of the emergency response application by the remote user (e.g., call taker). The asset controls can be directly manipulated as virtual controls through the GUI interface of the application and/or physical controls that are in communication with the application (e.g., joystick, mouse, or other input devices connected to the computing device running the emergency response application). The drone can include both a forward facing camera for maneuvering to the (x, y) coordinates of the emergency location and a downward and/or upward facing camera for vertical maneuvering to prevent collision with power lines, trees, buildings, and other aerial vehicles. In some instances, the emergency response application provides real-time and/or predicted weather information to inform the call taker's decision on whether to utilize a particular asset such as a drone. For example, adverse weather conditions may preclude use of a drone due to risk of weather-induced flight failure.

Figure 9:
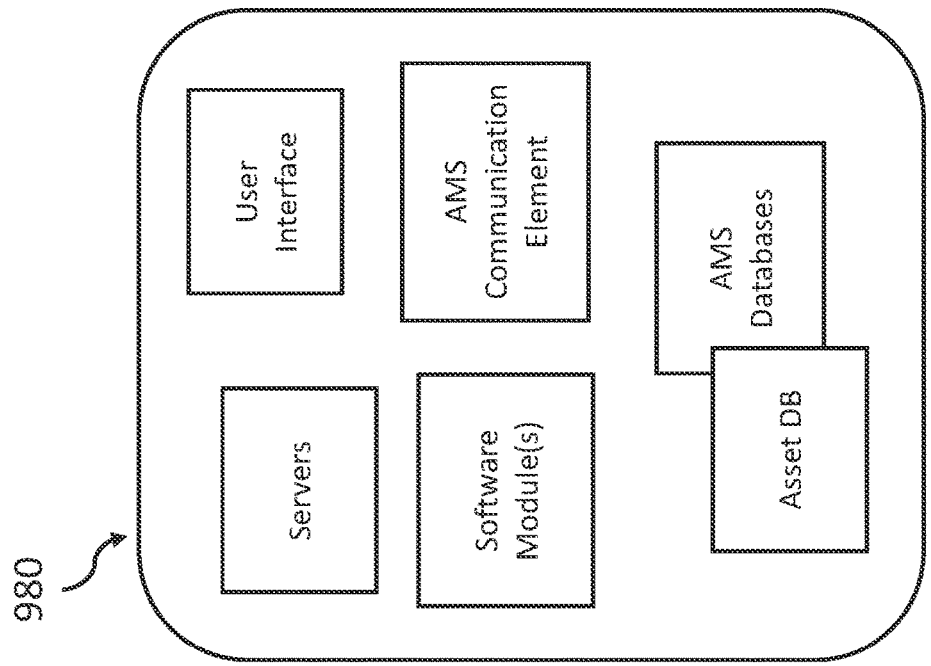
FIG. 9 depicts diagrams of (i) an emergency response asset and (ii) an asset management system (AMS) in accordance with one embodiment of the present disclosure.
Figure 9:
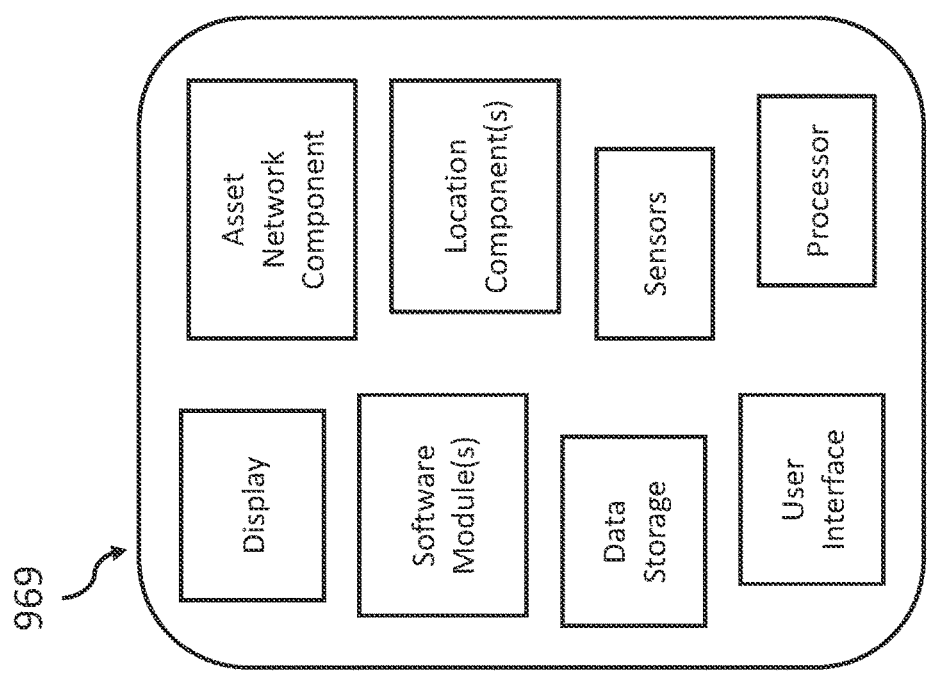

The emergency response assets can include non-human systems, devices, apparatuses, kits, or other equipment that can be used to respond to, address, or provide assistance in an emergency situation. Examples of emergency response assets include, but are not limited to: mobile communication devices, digital cameras, smart building systems (also referred to as "connected buildings" or "connected building systems"), drones, automated external defibrillators (AEDs; also referred to as "connected AEDs"), and telemedicine systems. In some embodiments, emergency response assets are managed by an asset management system (AMS), which may be a component of an emergency management system (as described above) or provided by an independent asset service provider (ASP). The AMS communicates directly with emergency response assets to activate and control the emergency response assets. In some embodiments, an emergency response asset must be registered with the EMS or AMS before the emergency response asset can be accessed by an ESP. FIG. 9 depicts a diagram of (i) an emergency response asset 969 and (ii) an asset management system (AMS) 980. In some embodiments, an emergency response asset 969 can include any or all of a display, one or more software modules, a data storage, a user interface, an asset network component, an asset location component, one or more sensors, and one or more processors. In some embodiments, an asset management system (AMS) 980 can include any or all of one or more servers, one or more software modules, an AMS communication element, a user interface, and one or more AMS databases, which may include an asset database. The asset database can include data and information about one or more emergency response assets 969 managed by the AMS, such as locations, geofences, and availability statuses associated with emergency response assets 969, as described below.

In some embodiments, an emergency response asset is privately owned and managed, and therefore is not a publicly owned asset, such as a traffic camera. In some embodiments, an emergency response asset is not a camera (e.g., private security camera). In some embodiments, an emergency response asset is not a human asset, such as a first responder (e.g., a policeman, fireman, or emergency medical personnel). In some embodiments, an emergency response asset is not a wearable device, such as a body camera. In some embodiments, an emergency response asset is not a handheld device, such as a firearm, a taser, or mace. In some embodiments, an emergency response asset is not a personal communication device, such as a smartphone or a laptop.

In some embodiments, an emergency response asset is associated with a fixed location or geofence that cannot be changed by the emergency response asset's own accord or under the emergency response asset's own ability, such as a connected building (as described above and below). Such emergency response assets may be referred to as static emergency response assets. In some embodiments, an emergency response asset is capable of moving or otherwise changing the location or geofence associated with the emergency response asset by the emergency response asset's own accord or under the emergency response asset's own ability, such as a drone or a mobile telemedicine unit (as described above and below). Such emergency response assets may be referred to as dynamic emergency response assets. In some embodiments, static and dynamic emergency response assets communicate with an EMS or an AMS in different ways. For example, a dynamic emergency response asset may need to communicate with an EMS or AMS on a continual basis, such as by providing the EMS or AMS with regular location updates. In another example, a static emergency response asset may only communicate with an EMS or AMS when the EMS or AMS seeks to activate the static emergency response asset (as described below). Likewise, in some embodiments, static and dynamic emergency response assets must be provisioned with an EMS or an AMS in different ways, as described below. In some embodiments, an individual AMS manages only one of static or dynamic emergency response assets. In some embodiments, an individual AMS manages both static and dynamic emergency response assets. In some embodiments, an EMS may be communicatively coupled to a plurality of AMSs, wherein some AMSs communicatively coupled to the EMS manage only static emergency response assets and wherein some other AMSs communicatively coupled to the EMS manage only dynamic emergency response assets.

Figure 10A:
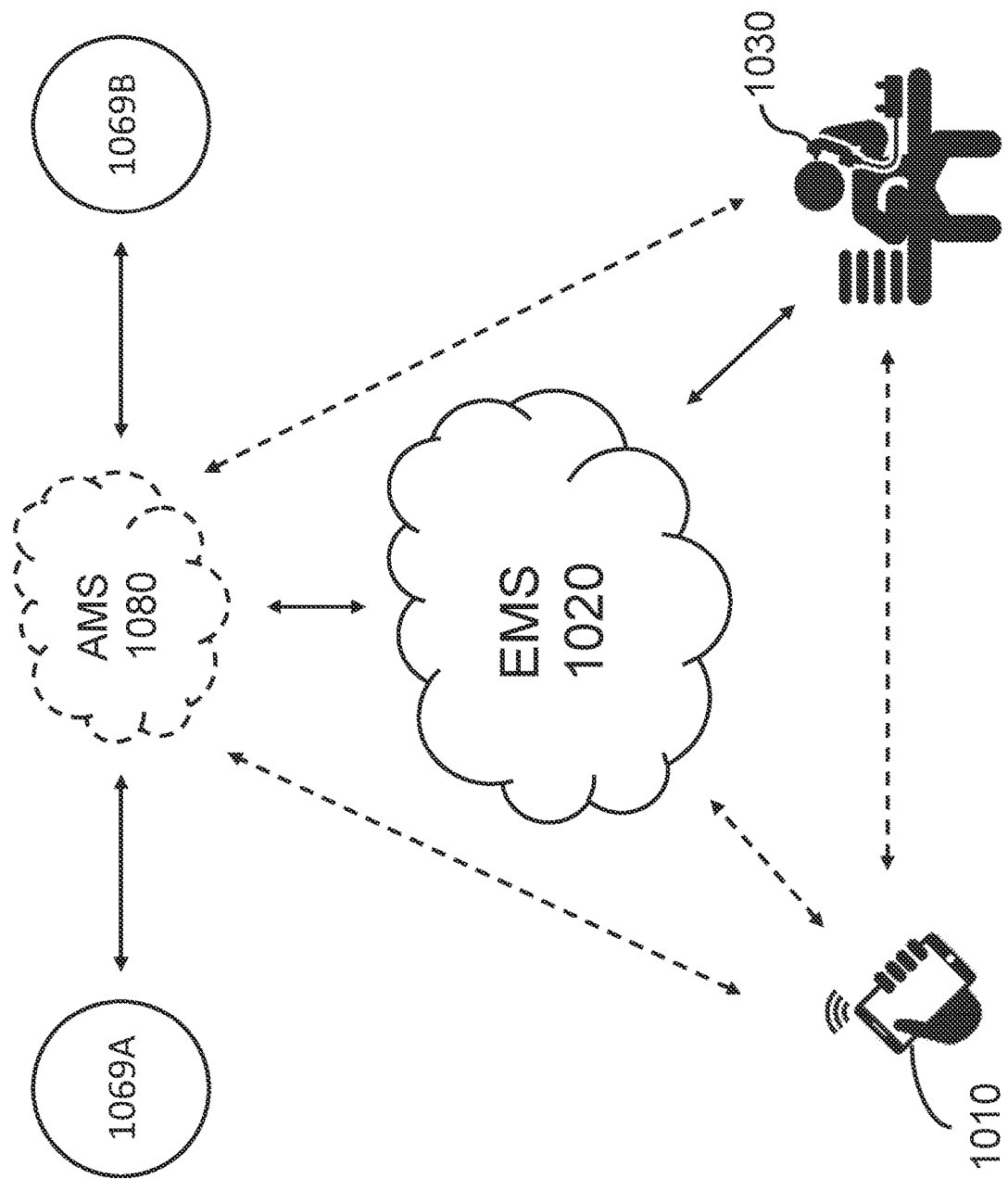
FIG. 10A and FIG. 10B depict diagrams of systems for providing emergency assistance by an emergency management system (EMS) and an asset management system (AMS) in accordance with one embodiment of the present disclosure.
Figure 10B:
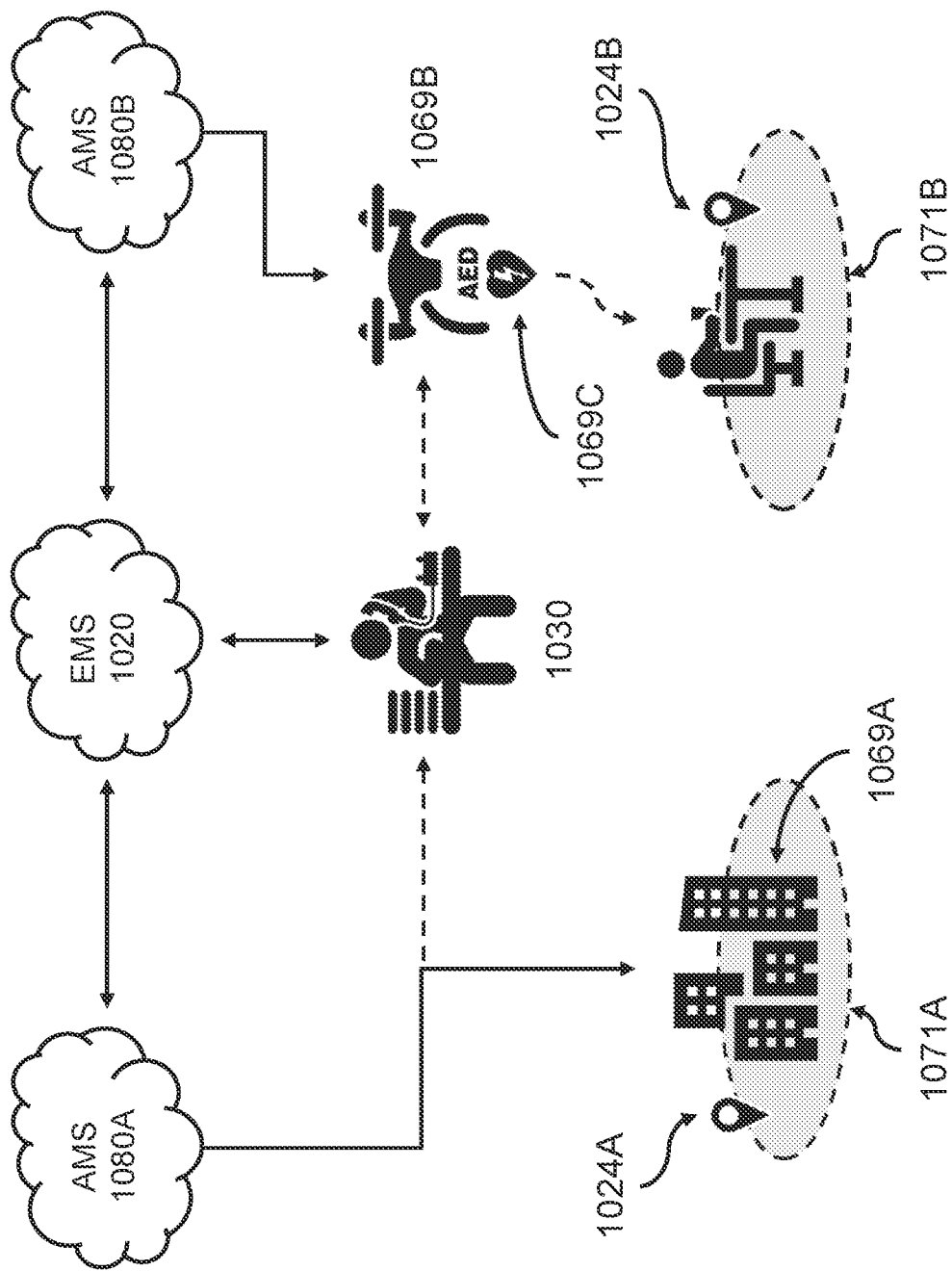

As mentioned above, in some embodiments, the components of an emergency management system (EMS) and an asset management system (AMS) function cooperatively to gather information regarding one or more emergency response assets, relay the information regarding the one or more emergency response assets to an emergency service provider (ESP), and provide access to the one or more emergency response assets to the ESP. FIGS. 10A and 10B depict embodiments of systems for gathering and relaying information regarding emergency response assets and providing access to emergency response assets to ESPs. As depicted in FIG. 10A, in some embodiments, when an emergency alert including an emergency location is received by the EMS 1020 from an electronic device 1010 (e.g., when an emergency call is made from the electronic device 1010 and the electronic device 1010 simultaneously transmits an emergency alert to the EMS 1020), the EMS 1020 communicates with the AMS 1080 (which may be a component of the EMS 1020 or provided by an independent asset service provider (ASP)) to determine if there are any emergency response assets 1069 available for the emergency location, as described below. If the EMS 1020 and AMS 1080 determine that there are one or more emergency response assets 1069 available for the emergency location, the EMS 1020 can transmit information regarding the one or more emergency response assets available for the emergency location to the ESP 1030 (such as by displaying the information regarding the one or more emergency response assets within the GUI of an emergency response application, as described above and below). In some embodiments, an emergency alert is not received by the EMS 1020 (e.g., when an emergency call is made from an electronic device 1010 and directed to the ESP 1030, but the electronic device 1010 does not simultaneously transmit an emergency alert to the EMS 1020), but the ESP 1030 can independently transmit an emergency location to the EMS 1020. The EMS 1020 can then use the emergency location received from the ESP 1030 to communicate with the AMS 1080 to determine if there are any emergency response assets available for the emergency location.

Once the EMS 1020 or AMS 1080 determines that one or more emergency response assets are available for an emergency location, the EMS 1020 can transmit information regarding the one or more emergency response assets to an ESP 1030 and provide the ESP 1030 with access to the one or more emergency response assets 1069. FIG. 10B depicts an embodiment of a system for providing an ESP with access to an emergency response asset. In one example, a first AMS 1080A is provided by a first ASP (asset service provider) that manages connected smart building assets, allowing users to remotely access and control various systems within a building, such as locking and unlocking doors, lighting, and video feeds from surveillance cameras. Building 1069A is an emergency response asset managed by the first ASP with doors and surveillance cameras that can be remotely accessed. In this example, if the EMS 1020 receives an emergency location 1024A (e.g., included in an emergency alert or received directly from an ESP 1030), the EMS 1020 can communicate with AMS 1080A to determine if there are any emergency response assets managed by the first ASP available for emergency location 1024A. For example, the EMS 1020 can share emergency location 1024A with the AMS 1080A, which can then retrieve a set of geofences associated a set of emergency response assets managed by the first ASP and determine if emergency location 1024A falls within any of the geofences within the set of geofences. Or, for example, the AMS 1080A can share a set of geofences associated with a set of emergency response assets managed by the first ASP, and the EMS 1020 can determine if emergency location 1024A falls within any of the geofences within the set of geofences. In the example depicted in FIG. 10B, the AMS 1080A determines that emergency location 1024A falls within the geofence 1071A associated with emergency response asset 1069A (the smart building), thereby determining that there is an emergency response asset available for emergency location 1024A (e.g., building 1069A). Once the AMS 1080A or EMS 1020 determines that there is an emergency response asset available for emergency location 1024A can transmit information regarding the emergency response asset (e.g., the location, type, or availability status) to an ESP 1030. In some embodiments, the information regarding the emergency response asset is pushed to the ESP 1030 (e.g., using a subscription system), as described above. In some embodiments, the information regarding the emergency response asset is transmitted to the ESP 1030 in response to an emergency data request, as described above and below.

After transmitting the information regarding the emergency response asset to the ESP 1030, the ESP 1030 can select to activate the emergency response asset. For example, in some embodiments, the information regarding the emergency response asset is displayed within the graphical user interface (GUI) of an emergency response application (as described above and below), and the GUI of the emergency response application additionally includes one or more asset controls for activating or otherwise controlling the emergency response asset. For example, in the case of the smart building 1069A, a call taker at ESP 1030 could use the asset controls within the GUI to select to view a feed from a surveillance camera within the building 1069A, and, if the call taker sees a person with a weapon within the building, the call taker can use the asset controls within the GUI to put the building 1069A in lockdown (e.g., locking hallway doors and sounding an alarm). In some embodiments, in response to detecting one or more user interactions with the asset controls through the GUI, the EMS 1020 can then transmit a request to the first ASP to activate the systems within the smart building 1069A according to the one or more user interactions with the asset controls made by the ESP 1020 through the GUI. In other embodiments, after detecting one or more user interactions with the asset controls through the GUI, the EMS 1020 can directly activate the asset(s) according to the one or more user interactions with the asset controls (e.g., if the AMS 1080A is a component of the EMS 1020). In some embodiments, an ESP 1020 provides consent for the EMS 1020 to share data generated by the ESP 1030 with an ASP by interacting with the asset controls presented within the GUI. In some embodiments, an ESP 1030 selects a consent button within the GUI to provide consent for the EMS 1020 to share data generated by the ESP 1030 with a CSP before the EMS 1020 is permitted to transmit a request to activate an asset to the ASP.

In another example, a second ASP manages drone (i.e., unmanned aerial vehicles) assets that carry automated external defibrillators (AEDs). AEDs can be used to diagnose and treat cardiac arrhythmias (i.e., irregular heartbeats) through defibrillation, wherein an electrical current is passed through the body to reset the heart. The chance of survival for a person in cardiac arrest can drop by as much as ten percent for each minute the person goes without successful defibrillation. Accordingly, it is imperative during such an emergency that a person receives an AED as quickly as possible. In this example, AMS 1080B (a second ASP) is a component of EMS 1020, and the second ASP can register a drone 1069B and an associated AED 1069C managed by the second ASP by providing the EMS 1020 (or the AMS 1080B) with a geofence 1071B of a region serviced by the drone 1069B. If the EMS 1020 then receives an emergency location 1024B (e.g., included in an emergency alert or received directly from an ESP 1030), the EMS 1020 can communicate with the AMS 1080B to determine if there are any emergency response assets available for the emergency location 1024B. For example, in the example depicted by FIG. 10B, the ESP 1030 receives an emergency call from a restaurant where a diner is apparently suffering from cardiac arrest. The caller relays the emergency location 1042B of the restaurant to the ESP 1030, which then relays the emergency location 1024B to the EMS 1020 (such as by submitting the location to the EMS 1020 through an emergency response application, as described above). In this example, the EMS 1020 then retrieves (such as by employing the AMS 1080B) a set of geofences associated with a set of emergency response assets managed by the second ASP (including the geofence 1071B associated with the drone 1069B) and determines that the emergency location 1024B falls within the geofence 1071B associated with the drone 1069B (i.e., the region serviced by the drone 1069B). In response, the EMS 1020 displays one or more asset controls for controlling the emergency response asset(s) (e.g., the drone 1069B and AED 1069C) through the GUI of an emergency response application accessed at the ESP 1030. For example, the one or more asset controls may include a button that an ESP personnel at the ESP 1030 can select to dispatch the drone 1069B and the AED 1069C to the emergency location 1024B (e.g., the location of the restaurant). In response to detecting one or more user interactions with the one or more asset controls through the emergency response application, the EMS 1020 can directly activate the emergency response asset(s) (such as by employing the AMS 1080B) according to the one or more user interactions with the asset controls.

In some embodiments, after receiving an emergency location, the EMS communicates with the AMS to determine if there are any emergency response assets available for the emergency location. In some embodiments, determining if there are any emergency response assets available for an emergency location includes determining if there are any emergency response assets in the vicinity of the emergency location (e.g., if the emergency location falls within a geofence associated with an emergency response asset, as described above and below). In some embodiments, determining if there are any emergency response assets available for the emergency location includes determining if there are any emergency response assets in the vicinity of the emergency location and determining if those emergency response assets in the vicinity of the emergency location are currently in use or not. FIGS. 11-14 illustrate exemplary processes for determining if there are emergency response assets available for an emergency location.

Figure 11:
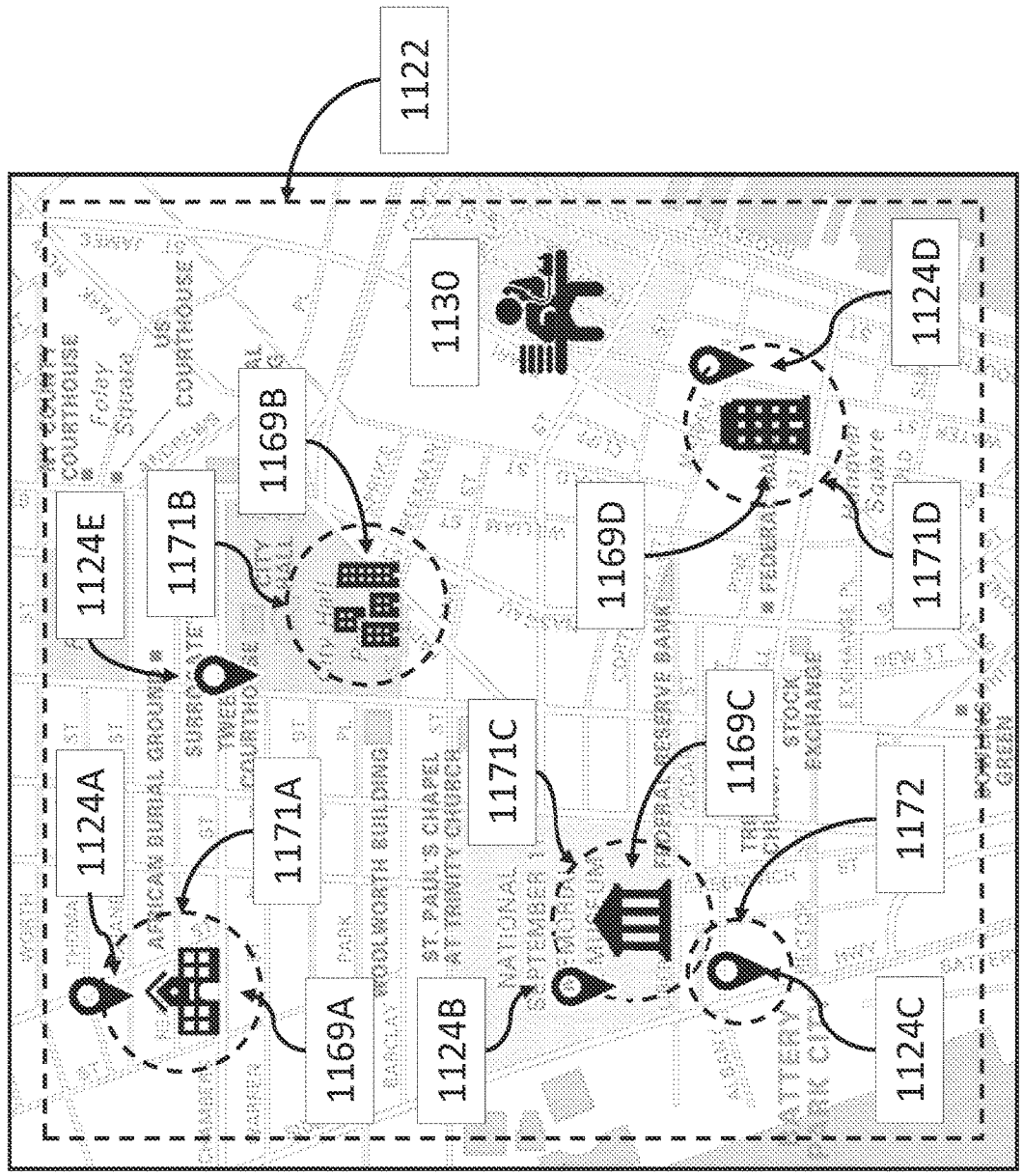
FIG. 11 illustrates an example of a process for determining if an emergency response asset is available for an emergency location in accordance with one embodiment of the present disclosure.

FIG. 11 illustrates a set of emergency response assets, a set of geofences associated with the set of emergency response assets, and various emergency locations. In the example illustrated by FIG. 11, each of the emergency response assets 1169 are smart building systems. For example, emergency response asset 1169A is a school building, emergency response asset 1169B is an office building, emergency response asset 1169C is a federal court building, and emergency response asset 1169D is an apartment building. Each of the smart building systems has an associated geofence (geofences 1171A-1171D, respectively). ESP 1130 has a jurisdiction that covers all of the emergency response assets 1169. As mentioned above, when the EMS receives an emergency location, the EMS or AMS can retrieve a set of geofences associated with a set of emergency response assets and determine if the emergency location falls within any of the geofences. For example, in the example illustrated in FIG. 11, if the EMS receives emergency location 1124A, the EMS or AMS (which may be a component of the EMS, in some embodiments) can retrieve the geofences 1171A-1171D associated with emergency response assets 1169A-1169D and determine if emergency location 1124A falls within any of the geofences 1171A-1171D. As illustrated in FIG. 11, emergency location 1124A does fall within the geofence 1171A associated with the emergency response asset 1169A (the school building) and only within geofence 1171A. In some embodiments, the EMS can then transmit information regarding emergency response asset 1169A (e.g., a link to an application for controlling the smart building system at the school building, as described below) to ESP 1130. In another example, if the EMS receives emergency location 1124E, the EMS or AMS can retrieve the geofences 1171A-1171D and determine that the emergency location 1124E does not fall within any of the geofences 1171A-1171D. Thus, in this example, there are no emergency response assets available for emergency location 1124E.

In some embodiments, the EMS can apply a radius around an emergency location to generate a range 1172 (also referred to as a "location range") and determine if the location range 1172 overlaps with a geofence associated with an emergency response asset. The location range 1172 may be defined by a radius of any predetermined or dynamic value (e.g., 100 meters, 0.5 miles, etc.). For example, in the example illustrated by FIG. 11, emergency location 1124B falls directly within the geofence 1171C associated with the emergency response asset 1169C (the federal court building). Emergency location 1124C does not fall directly within the geofence 1171C associated with the federal court building; however, when a range 1172 (e.g., a radius of 0.5 miles) is applied to the emergency location 1124C, the location range 1172 does overlap with the geofence 1171C associated with the federal court building, and thus emergency response asset 1169C may be available for emergency location 1124C. A range may be applied to an emergency location in various ways. For example, a range may be dynamically applied to an emergency location based on the type of emergency represented by the emergency location. For example, a range applied to an emergency location representing a medical emergency may be smaller (e.g., 100 meters) than a range applied to an emergency location representing a fire (e.g., 0.5 miles).

In some embodiments, an emergency management system (EMS) or asset management system (AMS) identifies an emergency response asset as available for an emergency location by identifying the emergency response asset as available to an emergency service provider (ESP) authorized to respond to the emergency represented by the emergency location. For example, in some embodiments, when an emergency response asset is provisioned with an EMS or AMS (such as through an asset provisioning interface, as described below with respect to FIGS. 19A-19C), the emergency response asset may be associated with or otherwise designated as at the disposal of one or more ESPs. In such an embodiment, when a user associated with one of the one or more ESPs (e.g., a 911 call taker at a PSAP) logs into an emergency response application communicatively coupled to the EMS, the EMS can automatically provide information regarding the emergency response asset to the ESP through the emergency response application (as described below). Then, for example, if the EMS later receives an emergency location associated with an emergency alert and determines that the ESP is authorized to respond to the emergency alert (or the emergency represented by the emergency alert), the EMS can automatically determine that the emergency response asset is available for the emergency location, based on the emergency location's and the emergency response asset's common association with the ESP.

In some embodiments, when a user associated with an ESP logs into an emergency response application communicatively coupled to the EMS, the EMS can retrieve a geofence associated with the ESP, identify any and all emergency response assets provisioned with the EMS (or an AMS communicatively coupled to the EMS) and having an associated location or geofence that at least partially overlaps with the geofence associated with the ESP, and provide information regarding those emergency response assets to the ESP through the emergency response application (as described below). Then, for example, if the EMS later receives an emergency alert associated with an emergency alert and determines that the emergency location also falls within the geofence associated with the ESP, the EMS can automatically determine that any and all of the emergency response assets having an associated location or geofence that at least partially overlaps with the geofence associated with the ESP as available for the emergency location, based on common overlap with the geofence associated with the ESP. For example, if geofence 1122 is a geofence associated with ESP 1130, the EMS can automatically identify all of emergency response assets 1169A-1169D as available for all of emergency locations 1124A-1124D, based on the emergency response assets' and the emergency locations' common overlap with geofence 1122 associated with ESP 1130 (See FIG. 11).

Figure 12:
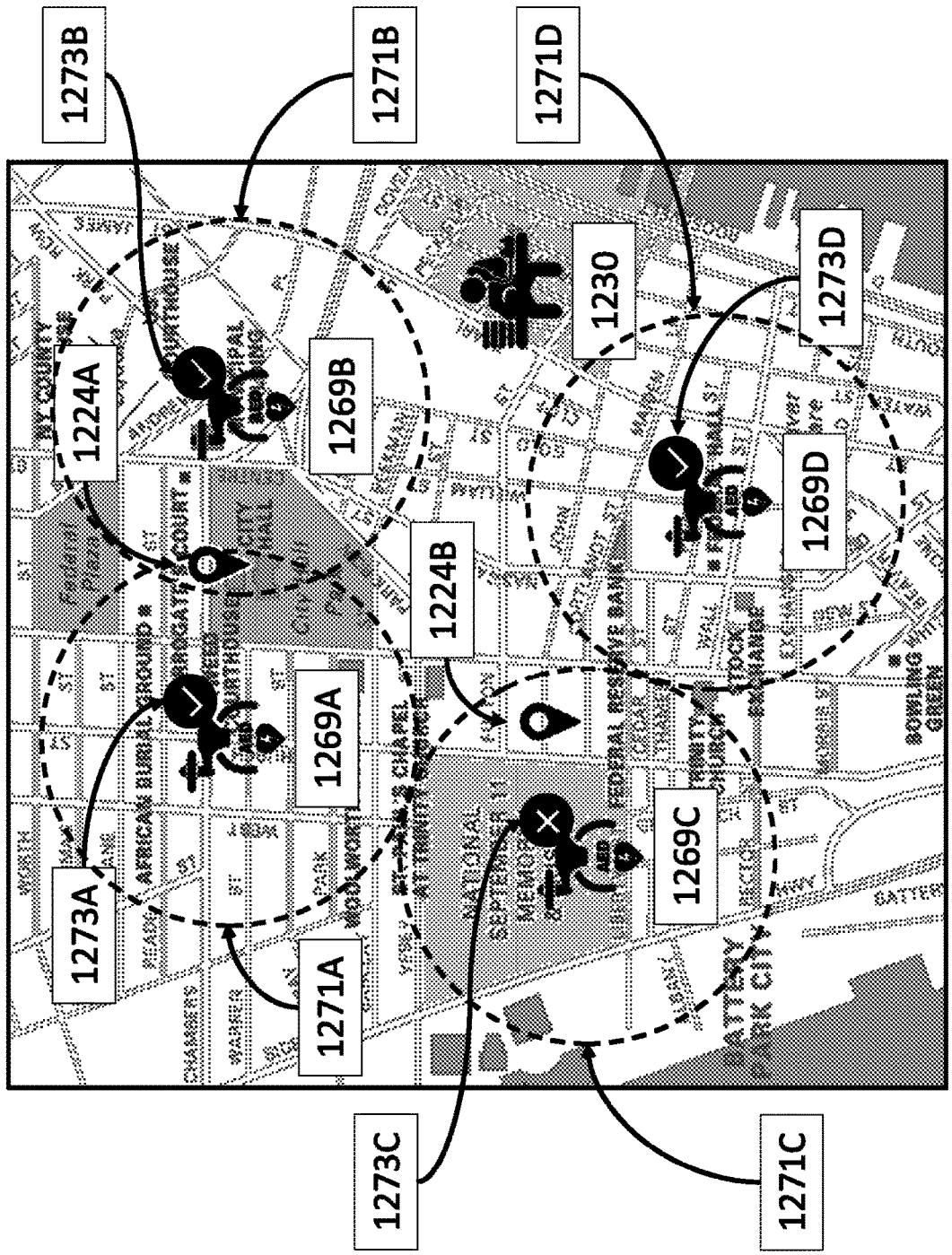
FIG. 12 illustrates an example of a process for determining if an emergency response asset is available for an emergency location in accordance with one embodiment of the present disclosure.

FIG. 12 illustrates a set of emergency response assets, a set of geofences associated with the set of emergency response assets, and various emergency locations. In the example illustrated by FIG. 12, each of the emergency response assets 1269A-1269D are drone equipped with automated external defibrillators (AEDs). Because drones are able to fly to the location of an emergency by a much more direct path (and a path devoid of traffic), a drone carrying an AED may be able to deliver the AED to the scene of the emergency significantly faster than an ambulance, potentially saving a life. Each of the drones has an associated geofence (geofences 1271A-1271D, respectively). In some embodiments, the geofences 1271 are static, representing an area serviced by a respective drone. In some embodiments, the geofences 1271 are dynamically generated by applying a radius around the current location of the drone. A geofence defined by a radius applied to the current location of an emergency response asset may be referred to as an "asset range." In some embodiments, in addition to a geofence (or an asset range), an emergency response asset may also have an availability status 1273. For example, in the example illustrated by FIG. 12, emergency response assets 1269A, 1269B, and 1269D have an availability status of available, represented by the "check" mark. Emergency response asset 1269C, however, has an availability status of unavailable, represented by the "x" mark. An emergency response asset may be unavailable for various reasons. For example, in the case of a drone, the drone may be unavailable if it has been damaged and rendered unable to fly, if the drone's battery is dead or low, or if the drone is already responding to another emergency.

In some embodiments, determining if there are any emergency response assets available for an emergency location includes determining an availability status for one or more emergency response assets. For example, in the example illustrated by FIG. 12, when the EMS receives emergency location 1224A, the EMS or AMS then retrieves the four geofences 1271A-1271D associated with the four emergency response assets 1269A-1269D (e.g., the four drones equipped with AEDs) and determines if the emergency location 1224A falls within any of the geofences 1271A-1271D. As illustrated by FIG. 12, emergency location 1224A falls within the geofences associated with two different drones, emergency response assets 1269A and 1269B. In some embodiments, the EMS or AMS can then additionally determine the availability status of both of the emergency response assets to determine which of the emergency response assets should be activated. In this example, both emergency response assets 1269A and 1269B have availability statuses (i.e., availability statuses 1273A and 1273B) of available. In some embodiments, the EMS or AMS can then additionally determine which of the two emergency response assets 1269A and 1269B is closest to the emergency location 1224A and select that emergency response asset as most appropriate to be activated for the emergency represented by emergency location 1224A. In this example, emergency response asset 1269B is closer to emergency location 1224A than emergency response asset 1269A, so the EMS can transmit information regarding emergency response asset 1269B to an ESP with a jurisdiction that covers emergency location 1224A (e.g., ESP 1230).

In another example, as illustrated by FIG. 12, if the EMS receives emergency location 1224B, the EMS or AMS can retrieve the four geofences 1271A-1271D associated with the four emergency response assets 1269A-1269D and determine if the emergency location 1224B falls within any of the geofences 1271A-1271D. As illustrated by FIG. 12, emergency location 1224B falls within the geofence 1271C associated with the emergency response asset 1269C. However, the EMS or AMS then determines the availability status 1273C of emergency response asset 1269C and discovers that emergency response asset 1269C is unavailable (e.g., the drone is running out of battery and needs to recharge). Therefore, an emergency response asset is not available for emergency location 1224B. However, in some embodiments, when no emergency response asset is available for an emergency location, the EMS or AMS can apply a tolerance to the asset range of one or more emergency response assets, thereby expanding their geofences. For example, in response to determining that emergency response location 1224B falls only within the geofence 1271C associated with emergency response asset 1269C but that emergency response asset 1269C has an availability status 1273C of unavailable, the EMS or AMS can expand the radius defining the asset range 1271D associated with emergency response asset 1269D (which has an availability status 1273D of available) by 0.5 miles. If emergency location 1224B then falls within the expanded asset range associated with emergency response asset 1269D, the EMS or AMS can then determine that emergency response asset 1269D is available for emergency location 1224B.

Figure 13A:
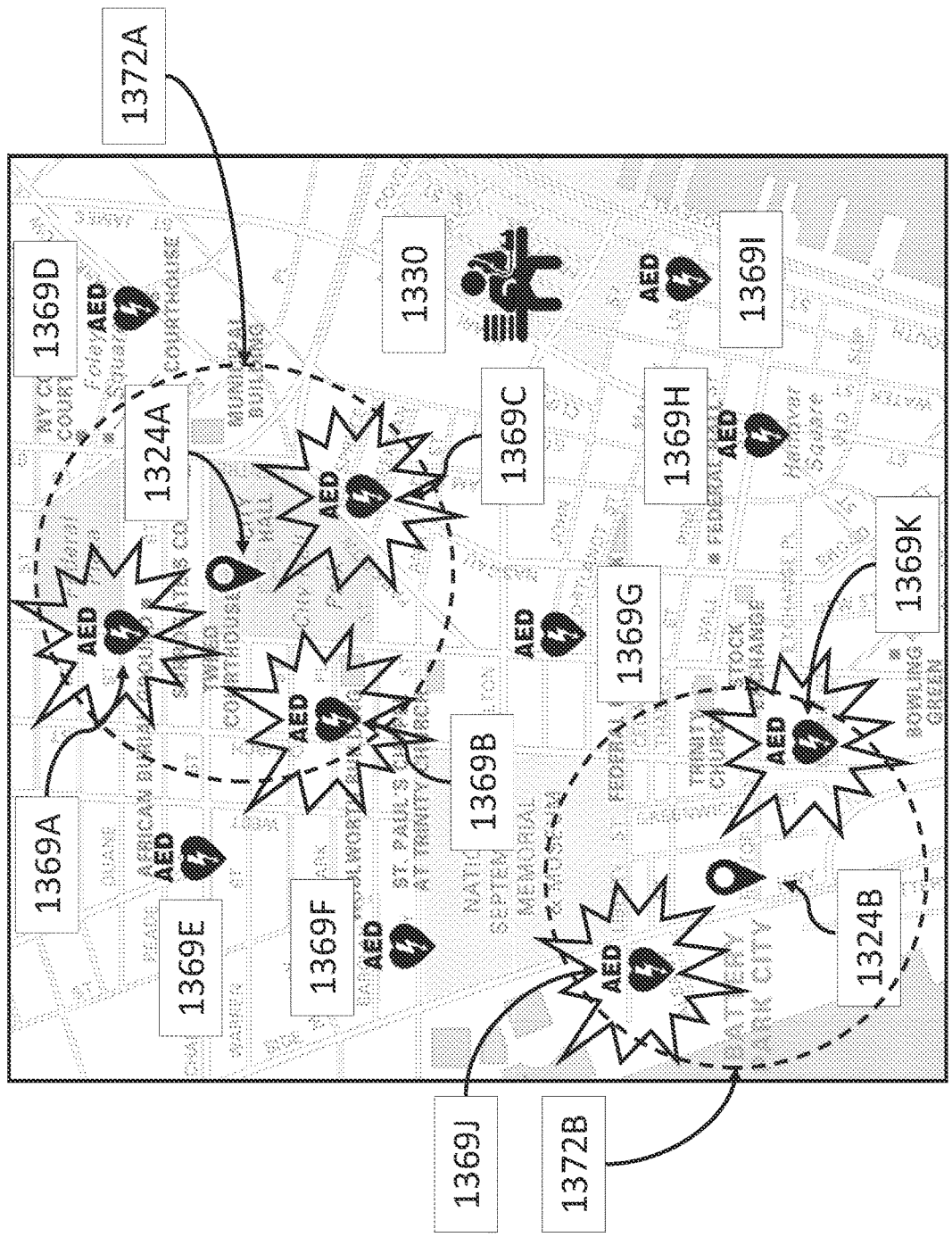
FIG. 13A and FIG. 13B illustrate examples of processes for determining if an emergency response asset is available for an emergency location in accordance with one embodiment of the present disclosure.
Figure 13B:
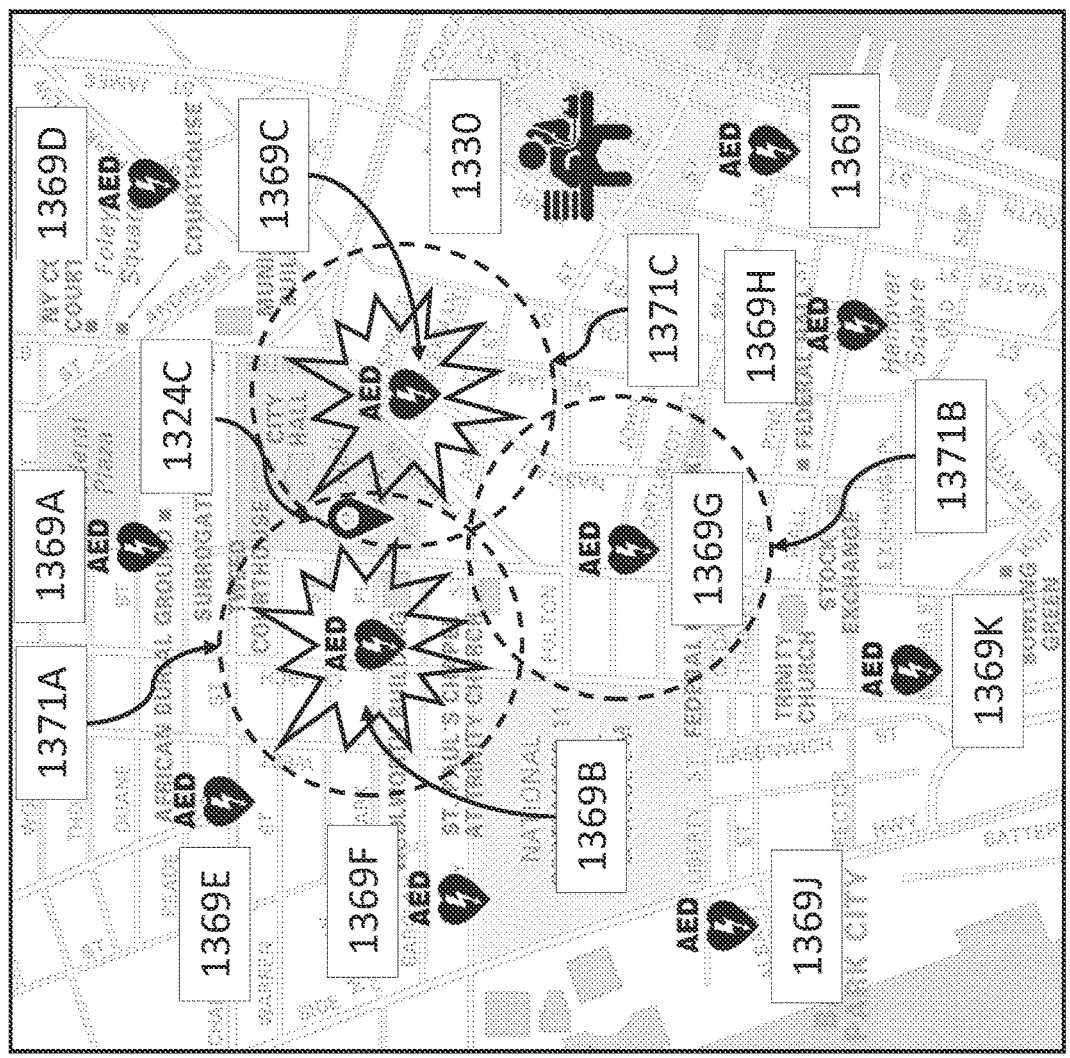

FIGS. 13A and 13B illustrate different processes for determining if there are emergency response assets available for an emergency location. FIG. 13A illustrates a set of emergency response assets, a pair of emergency locations, and location ranges associated with each of the emergency locations. In the example illustrated by FIG. 13A, each of the emergency response assets 1369A-1369K are smart AEDs (i.e., automated external defibrillators with internet connectivity) stationed throughout Lower Manhattan. The smart AEDs have built-in lights and sirens that can be remotely activated when an emergency occurs in the vicinity of the smart AED, and a digital screen that shows a map of where the emergency is occurring, so that a bystander may be alerted of the emergency and then take the AED to the emergency as quickly as possible. In this way, a smart AED may be able to arrive at the scene of an emergency significantly faster than an ambulance, potentially saving a life. In some embodiments, such as in the example illustrated by FIG. 13A, when the EMS receives an emergency location (e.g., emergency location 1324A), the EMS or AMS can generate a location range (e.g., location range 1372A) around the emergency location, as described above. The EMS or AMS can then determine if the location of any emergency response assets fall within the location range. For example, in the example illustrated by FIG. 13A, location range 1372A has been applied to emergency location 1324A. As illustrated, three smart AEDs, emergency response assets 1369A-1369C, fall within location range 1372A and are thus determined to be available for emergency location 1324A. The lights and sirens built into those three smart AEDs can then all be activated (e.g., in response to user interactions with asset controls by a call taker at ESP 1330, as described below), as illustrated by FIG. 13A, in response to the emergency represented by emergency location 1324A. The rest of the smart AEDs (i.e., emergency response assets 1369D-1369K) remain inactivated. In another example illustrated by FIG. 13A, location range 1372B has been applied to emergency location 1324B. As illustrated, only two smart AEDs, emergency response assets 1349J and 1369K fall within location range 1372B. The EMS or AMS can then activate those two emergency response assets in response to the emergency represented by emergency location 1324B.

FIG. 13B illustrates the same set of emergency response assets (smart AEDs or connected AEDs) illustrated in FIG. 13A. In this example, however, the EMS or AMS employs a different process for determining if there are emergency response assets available for an emergency location. In this example, each of the emergency response assets is associated with an asset range, as described above. For example, as illustrated in FIG. 13B, emergency response asset 1369B has an associated asset range 1371A, emergency response asset 1369C has an associated asset range 1371C, and emergency response asset 1369G has an associated asset range 1371B. In this example, if the EMS or AMS receives emergency location 1324C, the EMS or AMS can retrieve all of the asset ranges associated with the set of emergency response assets illustrated in FIG. 13B and determine if emergency location 1324C falls within any of the asset ranges. In this example, as illustrated by FIG. 13B, emergency location 1324C falls within the asset ranges 1371A and 1371C associated with emergency response assets 1369B and 1369C, respectively. Emergency response assets 1369B and 1369C are therefore determined to be available for emergency location 1324C, and can be activated (e.g., the lights and sirens built into the smart AEDs can be turned on) by the EMS or AMS (e.g., in response to user interactions with asset controls by a call taker at ESP 1330, as described below), as illustrated by FIG. 13B. Emergency location 1324C does not fall within the asset range 1371B associated with emergency response asset 1369G, so emergency response asset 1369G would not be determined to be available for emergency location 1324C and would not be activated, as illustrated in FIG. 13B.

In some embodiments, an emergency response asset is a vehicle carrying emergency response equipment. In some embodiments, an emergency response asset is transported by a vehicle. For example, in some embodiments, an emergency response asset is an automated external defibrillator (AED) carried in the trunk of a ride sharing vehicle (e.g., an Uber car). In another example, an emergency response asset is a ride sharing vehicle carrying a telemedicine unit in the trunk of the vehicle. Telemedicine refers to the practice of providing medical care to a patient without the provider and patient being physically present with each other. A telemedicine unit may include a computing or communication device, such as a laptop, for a medical care provider to remotely communicate with a patient, such as through a video conference. A telemedicine unit may also include one or more medical devices for the patient to use on themselves or for someone physically present with the patient (e.g., a family member or friend) to use on the patient. For example, a telemedicine unit (also referred to as a "mobile telemedicine unit") may include a stethoscope, a heartrate monitor, or a blood sampling device. The medical devices included in the telemedicine unit may be communicatively coupled to the computing or communication device included in the telemedicine unit, so that results and information recorded by the medical devices may be instantly transmitted to the medical care provider.

At present, when responding to a medical emergency, a call taker and/or dispatcher at a public safety answering point (PSAP) must dispatch an ambulance to the emergency, no matter how severe the call taker or dispatcher determines the medical emergency to be. There are generally various types of ambulance units that can be dispatched based on the severity or specific nature of the medical emergency, but there are no intermediate response options between no dispatch and an ambulance. Dispatching an ambulance is an expensive endeavor for both emergency service providers and patients. Additionally, an ambulance dispatched to one emergency is not available to be dispatched to another, concurrent emergency. Thus, dispatching an ambulance to a medical emergency that does not require emergent care is wastefully expensive and resource draining. Vehicular telemedicine units can provide a sensible intermediate option for call takers and dispatchers to employ when they determine that a medical emergency does not require an ambulance.

Figure 14:
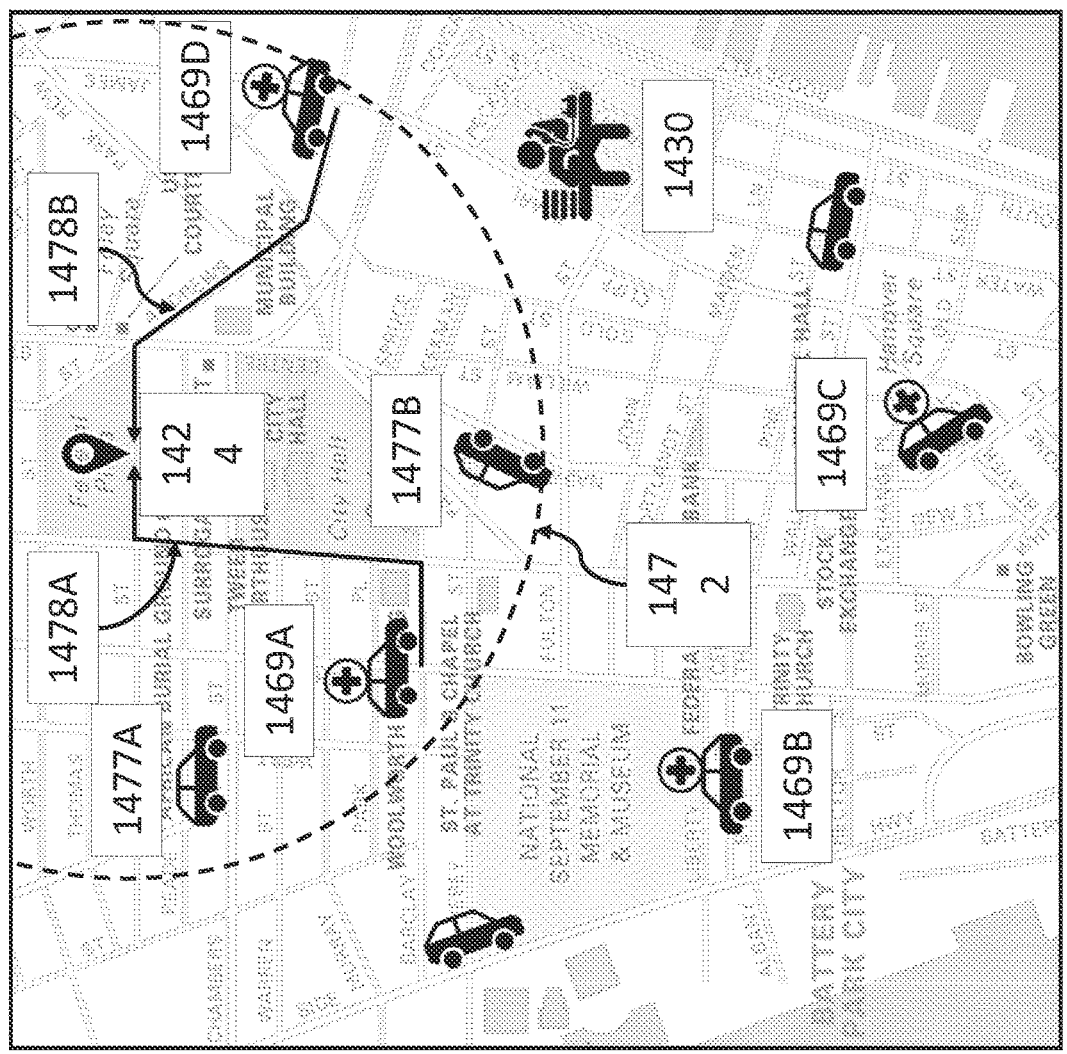
FIG. 14 illustrates an example of a process for determining if an emergency response asset is available for an emergency location in accordance with one embodiment of the present disclosure.

FIG. 14 illustrates a set of emergency response assets. In this example, each of the emergency response assets 1469 are mobile telemedicine units. For example, the emergency response assets 1469 are ride sharing vehicles carrying telemedicine units in their trunks. In this example, the ride sharing vehicles are managed by a ride sharing company, such as Uber or Lyft, which functions as an asset service provider (ASP), as described above. In this example, the ride sharing company (i.e., the ASP) hosts an AMS on their backend systems for managing the ride sharing vehicles. As illustrated by FIG. 14, the ride sharing company also manages ride sharing vehicles 1477 that are not carrying telemedicine units and are not considered emergency response assets. In this example, if the EMS receives emergency location 1424, the EMS can communicate with the AMS (hosted by the ride sharing company) to determine if there are any emergency response assets 1469 (ride sharing vehicles carrying telemedicine units) available for emergency location 1424. For example, the EMS can transmit emergency location 1424 to the AMS (hosted on the backend systems of the ride sharing company), and the AMS (potentially in conjunction with other backend functions or systems hosted by the ride sharing company) can determine if there are any ride sharing vehicles carrying telemedicine units in the within a threshold distance (e.g., location range 1472) of emergency location 1424. In the example illustrated by FIG. 14, the AMS determines that there are two emergency response assets 1469A and 1469D available for emergency location 1424 (e.g., both emergency assets 1469A and 1469D are within the location range 1472 applied to emergency location 1424). In some embodiments, the AMS can calculate a distance or estimated travel time of a travel route from one or more emergency response assets 1469 to an emergency location 1424. The AMS can then use this information (e.g., the distance or estimated travel time) to determine which emergency response asset should be selected for the emergency location 1424. For example, in the example illustrated by FIG. 14, the AMS determines that emergency response asset 1469D is likely to arrive at emergency location 1424 faster than emergency response asset 1469A, and thus selects 1469D as the emergency response asset available for emergency location 1424. The AMS can then transmit information regarding emergency response asset 1469D (e.g., the availability of emergency response asset 1469D for emergency location 1424, the distance or travel time from emergency response asset 1469D to emergency location 1424, etc.) to the EMS, which can then transmit the information regarding emergency response asset 1469D to an appropriate ESP, such as ESP 1430.

Remote Activation of an Emergency Response Asset

Current emergency response systems offer limited data access by emergency response personnel and call takers. The location data available to an emergency dispatch center may be inaccurate. The emergency information such as location indicator may be presented to a dispatcher on a map lacking in detail important for providing situational awareness. For example, an emergency situation arising inside a building can exacerbate problems with location accuracy. A caller requesting assistance in one part of a building could be mistakenly located as being in another part of the building that is accessible via different routes such that the first responder(s) arriving on the scene are unnecessarily delayed. In some cases, the caller may even be mistakenly located in a different building nearby. Moreover, details of the building layout or floor plan can be critical in certain scenarios, but are generally unavailable to the caller or first responder. As an illustrative example, firefighters who arrive on scene at a fire may want to know all the residential spaces that will need to be evacuated. They may also want to be aware of the available fire exits. If the building is a research/laboratory building, then they may also want to know where any hazardous substances (e.g., explosive, flammable, carcinogenic, radioactive, biohazardous) are stored in so they can take appropriate precautions or bypass those areas. Moreover, emergency responses are currently limited by the availability of human responders to arrive on scene. This can result in substantial delays especially in jurisdictions with delayed or depleted emergency response resources. Accordingly, an emergency dispatcher may be forced to simply wait for the human responders to arrive without having the ability to actively provide assistance while the emergency situation continues to deteriorate.

Accordingly, the systems, methods, devices, and media disclosed herein provide a technical solution to one or more of these problems whereby a plurality of emergency service providers are communicatively coupled to an emergency management system that enables the provisioning of accurate location for an emergency to the appropriate emergency service provider along with controls for activating one or more emergency response assets. The emergency management system disclosed herein is communicatively coupled to multiple emergency service providers along with multiple emergency asset management systems and third party data servers to form a distributed network that is capable of addressing specific emergencies wherever they may occur through the engagement of the appropriate emergency service provider with the appropriate emergency response asset to address the emergency based on an accurately provisioned location.

For example, the emergency management system can provision accurate real-time or near real-time location information associated with the emergency alerts transmitted by a user device (e.g., smartphone, home security alarm, etc). This location may utilize one or more of multiple modern locationing techniques such as GPS, Wi-Fi access points, Bluetooth beacons, etc., which can enhance indoor location accuracy. This information may be obtained directly from the devices via third party servers, and then conveyed to the appropriate emergency service provider responsible for the jurisdiction encompassing the location of the emergency. Furthermore, the location itself may be displayed along with additional information regarding the building such as, for example, the floor plan, entrances/exits, locations of emergency/fire exits, and other information relevant to the emergency (e.g., areas or locations containing hazardous materials, locations of fire extinguishers, locations of fire hydrants in proximity to the building, chemical eyewash or shower fixtures, locked or otherwise inaccessible areas, etc.). In some cases, the building floor plan is displayed as a 2D and/or 3D map, optionally with the location of the emergency embedded or visualized on the map. In some cases, one or more of the additional information is also shown on the map.

In some embodiments, after receiving an emergency location and determining that one or more emergency response assets is available for the emergency location, as described above, the EMS or AMS can automatically activate the one or more emergency response assets. For example, in the example illustrated in FIG. 13B, after receiving emergency location 1324C and determining that emergency response assets 1369B and 1369C (smart AEDs) are available for emergency location 1324C, the EMS or AMS can automatically activate emergency response assets 1369B and 1369C, such as by remotely turning on the lights and sirens built into the smart AEDs. Because emergency response assets can take many different forms (e.g., smart AEDs, drones, smart building systems, etc.), the activation of an emergency response asset can take many different forms as well. For example, the activation of a drone type emergency response asset may involve deploying the drone to an emergency location, while the activation of a smart building system may involve locking one or more doors or accessing a video feed from a surveillance camera. In some embodiments, as mentioned above, after the EMS or AMS receives an emergency location and determines that one or more emergency response assets are available for the emergency location, the EMS or AMS can transmit information regarding the one or more emergency response assets to an ESP, and then activate the one or more emergency response assets according to user interaction(s) with asset controls by the ESP, as described below. In some embodiments, emergency response assets, once they have been activated, can be controlled by one or more users, either remotely or directly, as described below.

In some embodiments, an emergency response asset does not perform a physical emergency response function, and the activation of the emergency response asset includes retrieving additional data pertaining to or associated with the emergency response asset (such as from an asset database, as described above) and transmitting the additional data to an ESP, such as through an emergency response application (as described below). For example, in some embodiments, a connected building does not perform any physical functions (such as locking doors or sounding alarms) but provides a two-dimensional or three-dimensional floor plan that emergency responders can use to more effectively respond to an emergency occurring in or around the connected building. In such an embodiment, activating the connected building includes retrieving the floor plan associated with the connected building (e.g., from an asset database, as described above) and providing the floor plan to an ESP (such as through an emergency response application, as described above).

In some embodiments, the floor plan depicts floors, rooms, corridors, entrances, exits (e.g., emergency exits), or any other building feature. In some embodiments, the floor plan depicts the locations of AEDs, eye-washing stations, surveillance cameras, showers, firehoses, or other functional equipment that can be leveraged for emergency response, which may include additional emergency response assets. In some embodiments, the floor plan is provided to a first responder (e.g., through an emergency response application accessed on a first responder's mobile device). In some embodiments, the floor plan depicts the placement of an emergency location within the floor plan. In some embodiments, the floor plan depicts the location of a first responder within the floor plan (e.g., the first responder provides their location to the EMS from the first responder's mobile device, and the EMS displays the first responder's location within the floor plan). In some embodiments, floor plans are displayed in a standard orientation (e.g., north always pointing up). In some embodiments, the floor plan includes an indicator of the floor plan's orientation (e.g., a compass). In some embodiments, as described below, the activation of an emergency response asset includes prompting the emergency response asset to perform a physical function and retrieving additional information pertaining to or associated with the emergency response asset. For example, in some embodiments, activating a connected building system includes retrieving and displaying a floor plan associated with the connected building within the graphical user interface (GUI) of an emergency response application, wherein the floor plan includes graphical elements that can be selected to prompt the connected building system to perform physical functions, such as locking/unlocking doors or sounding alarms.

Figure 15:
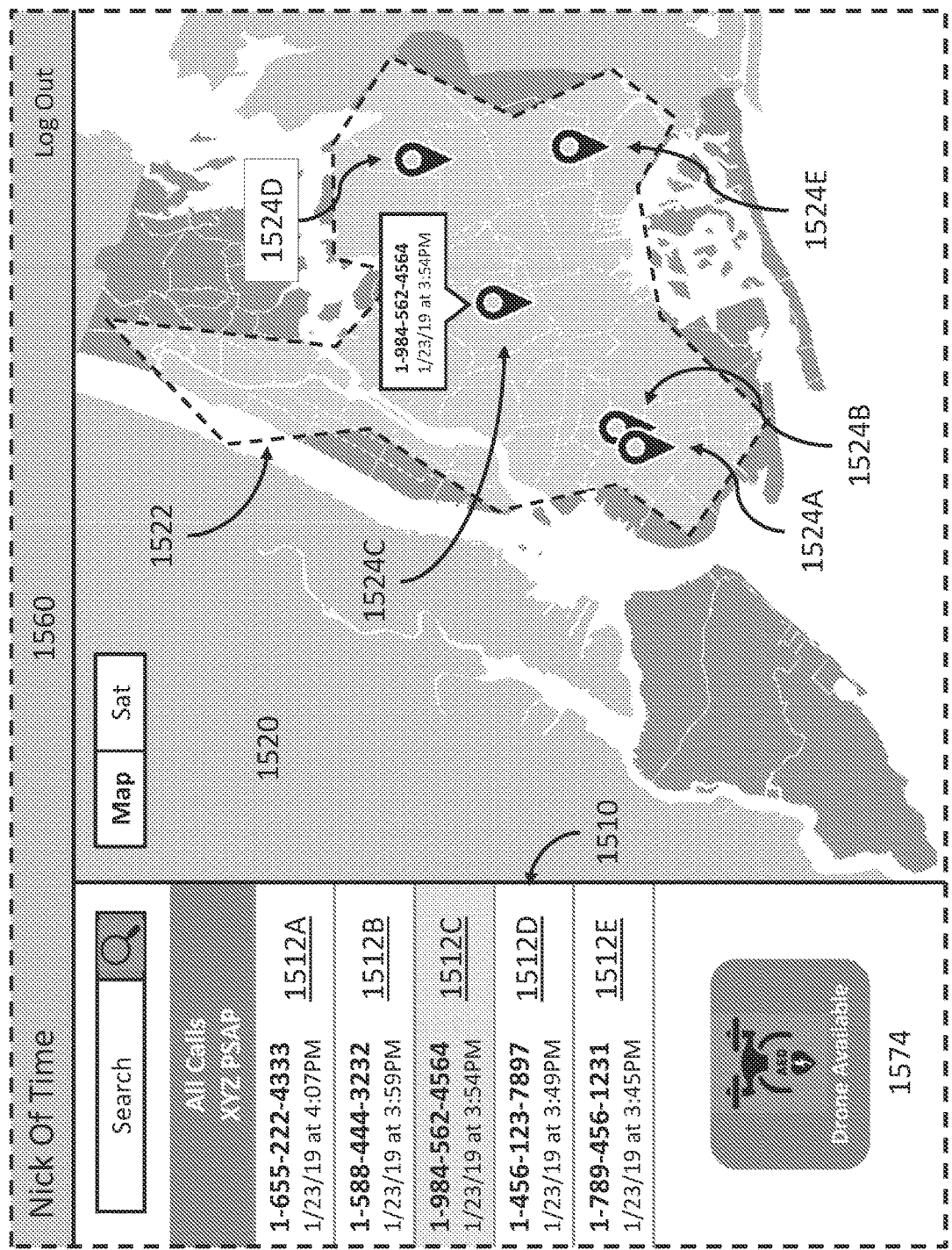
FIG. 15 illustrates an example of a graphical user interface (GUI) of an emergency response application in accordance with one embodiment of the present disclosure.

FIG. 15 illustrates an exemplary embodiment of an emergency response application accessed on a computing device at an emergency service provider (ESP; e.g., "XYZ PSAP"), as described above. In this example, the emergency response application 1560 has received emergency data associated with five different emergency alerts from the EMS and displays both an incident 1512 (e.g., incidents 1512A-1512E) within a list of incidents 1510 and an incident location 1524 (e.g., incident locations 1524A-1524E) within an interactive map 1520 for each of the emergency alerts. Each of the five emergency alerts were associated with emergency locations that fell within the jurisdiction (or geofence) 1522 associated with the ESP at which the emergency response application has been accessed (e.g., "XYZ PSAP"), and the emergency data associated with each of the five emergency alerts has been pushed to the emergency response application accordingly, as described above. In this example, as illustrated by FIG. 15, the EMS has communicated with an AMS and determined that an emergency response asset (e.g., a drone equipped with an AED) is available for the emergency location represented by incident location 1524C. Accordingly, the EMS has transmitted information regarding the drone to the emergency response application 1560, and the emergency response application 1560 now displays asset controls 1574 (e.g., a "Drone Available" button) to activate the drone within the GUI of the emergency response application. In some embodiments, the emergency response application 1560 only displays asset controls 1574 for activating an emergency response asset when the incident or incident location representing the emergency location for which the emergency response asset was determined to be available for is selected, as illustrated in FIG. 15. In this example, if a user at the ESP interacts with the asset controls 1574 (e.g., by selecting the "Drone Available" button), the emergency response application 1560 can transmit an electronic communication to the EMS or AMS instructing the EMS or AMS to activate the emergency response asset (e.g., the drone equipped with the AED), which, in this case, would involve dispatching a drone equipped with an AED to the emergency location represented by incident location 1524C. In some embodiments, the AMS or EMS only begins determining if an emergency asset is available for an emergency location after an incident 1512 or incident location 1524 associated with the emergency location has been selected within the GUI of the emergency response application 1560. For example, in some embodiments, the selection of an incident 1512 or an incident location 1524 prompts the emergency response application 1560 to transmit a request to determine if any emergency response assets are available for the emergency location associated with the incident 1512 or incident location 1524 to the EMS.

Figure 16A:
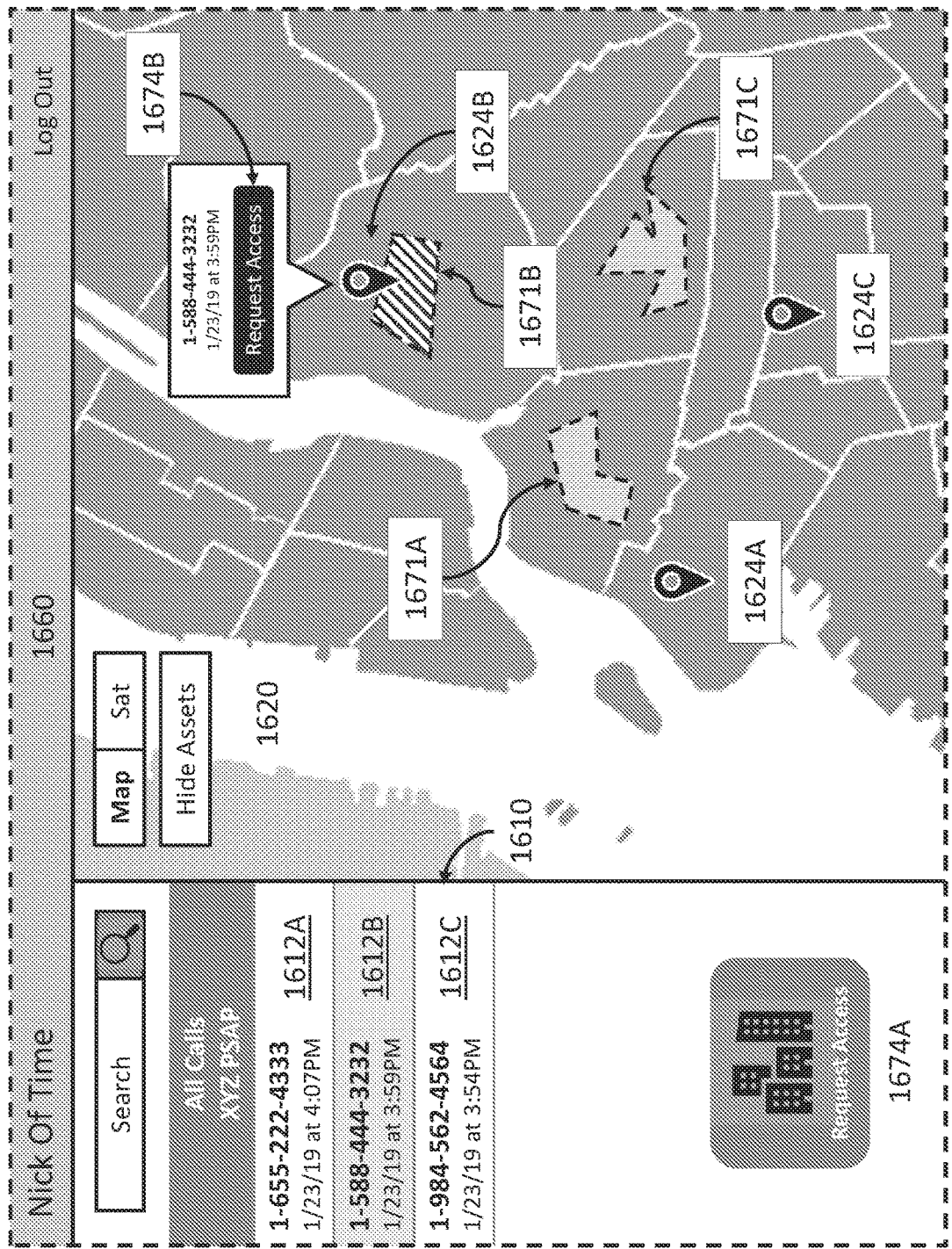
FIG. 16A and FIG. 16B illustrate examples of a graphical user interface (GUI) of an emergency response application in accordance with one embodiment of the present disclosure.
Figure 16B:
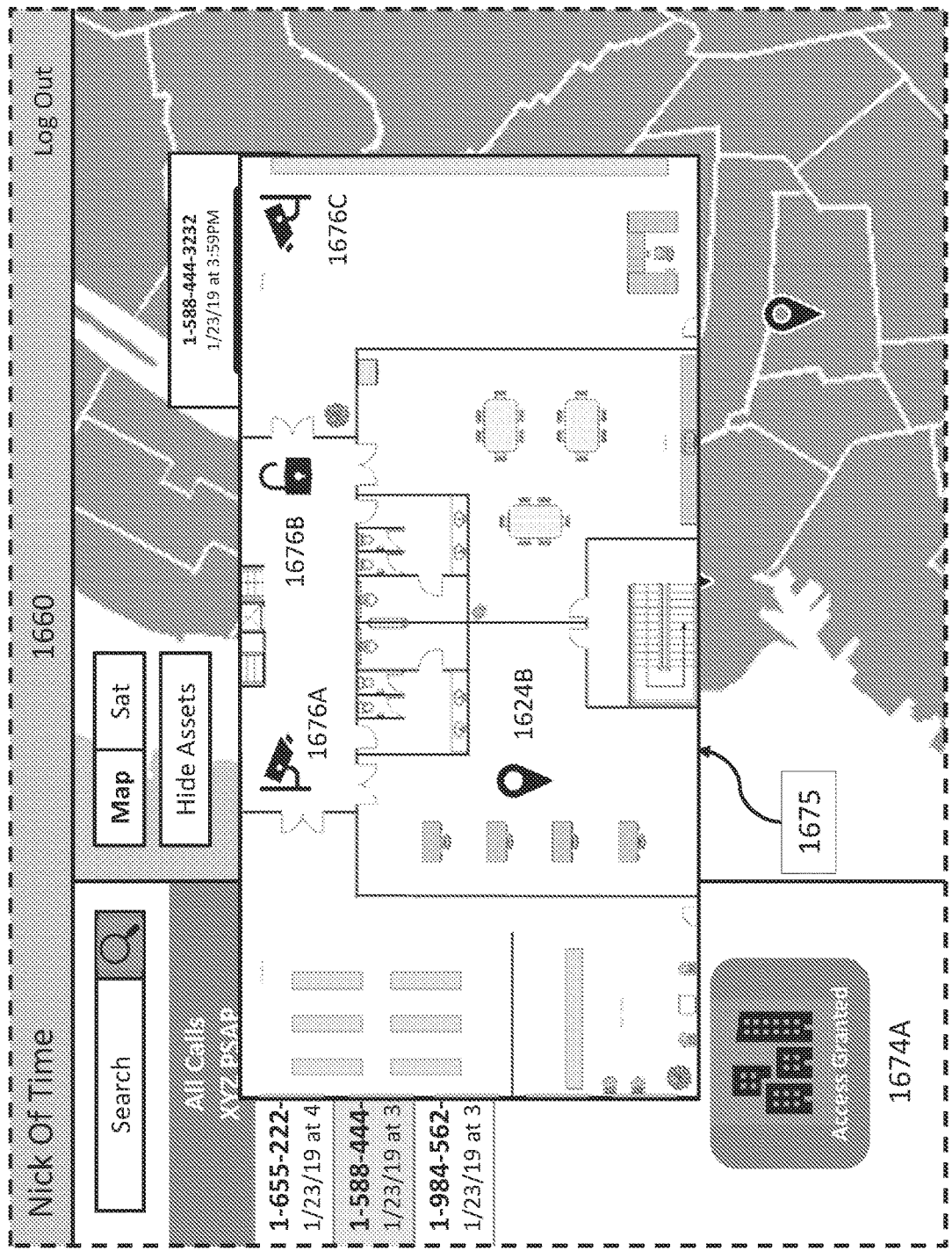

FIGS. 16A and 16B illustrate an exemplary embodiment of an emergency response application accessed on a computing device at an emergency service provider (ESP; e.g., "XYZ PSAP"), as described above. In this example, the emergency response application 1660 has received emergency data associated with three different emergency alerts from the EMS and displays an incident 1612 (e.g., incidents 1612A-1612C) with a list of incidents 1610 and an incident location 1624 (e.g., incident locations 1624A-1624C) within an interactive map 1620 for each of the three emergency alerts. In some embodiments, as illustrated by FIG. 16A, the emergency response application 1660 additionally displays geofences 1671 associated with emergency response assets within the interactive map 1620. In this example, three geofences 1671A-1671C associated with three different emergency assets (e.g., smart building systems) are displayed within the interactive map. As illustrated in FIG. 16A, in this example, incident location 1624B (representing an associated emergency location) falls within the bounds of geofence 1671B, which has already been determined by the EMS. Accordingly, the EMS has transmitted information regarding the smart building system associated with geofence 1671B to the emergency response application 1660, and, in this example, the emergency response application 1660 has highlighted geofence 1671B within the interactive map to give a user at the ESP a visual indicator that an emergency asset (e.g., the smart building system associated with geofence 1671B) is available for the emergency location represented by incident location 1624B. Noticing the highlighted geofence, a user at the ESP can select or hover over geofence 1671B (or incident 1612B, or incident location 1624B, alternatively), to prompt the emergency response application 1660 to display asset controls 1674B for activating the emergency response asset (e.g., the smart building system) associated with geofence 1671B. Alternatively or additionally, in some embodiments, the selection of the highlighted geofence 1671B (or incident 1612B, or incident 1624B) prompts the emergency response application 1660 to display asset controls 1674A for activating the emergency response asset associated with geofence 1671B within or below the list of incidents, as illustrated by FIG. 16A.

In some embodiments, activating an emergency response asset involves providing an ESP with a user interface for controlling the emergency response asset. For example, in some embodiments, after receiving selection of either asset controls 1674A or 1674B to activate the smart building system associated with highlighted geofence 1671B (as illustrated in FIG. 16A) by a user at XYZ PSAP, the emergency response application 1660 displays an asset interface 1675 for controlling the smart building system, as illustrated in FIG. 16B. In this example, the asset interface 1675 is a floorplan that shows where controllable doors and accessible surveillance cameras are located within the building managed by the smart building system and provides buttons for controlling those doors and surveillance cameras. In this example, the building has two surveillance cameras 1676A and 1676C represented by camera icons and one controllable door 1676B represented by a lock icon. The surveillance camera icons can be selected by a user at the ESP to tap into a live video feed from the surveillance cameras (e.g., received from the surveillance cameras by the AMS), and the lock icon can be selected to lock or unlock the controllable door. In some embodiments, selecting an element within the asset interface 1675 (e.g., one of the icons) prompts the emergency response application 1660 to transmit an electronic communication to the AMS (e.g., via the EMS) to access, execute, or activate the associated emergency response asset or a component of the emergency response asset. In some embodiments, the floor plan also shows an estimated location of where incident location 1624B is in relationship to the building. In some embodiments, access to the asset interface 1675 is provided by a deep link received from the AMS. In some embodiments, instead of being presented within the emergency response application 1660, the asset interface 1675 is opened externally, such as in a new tab or browser window of a web browser installed on the computing device executing the emergency response application 1660.

Figure 17A:
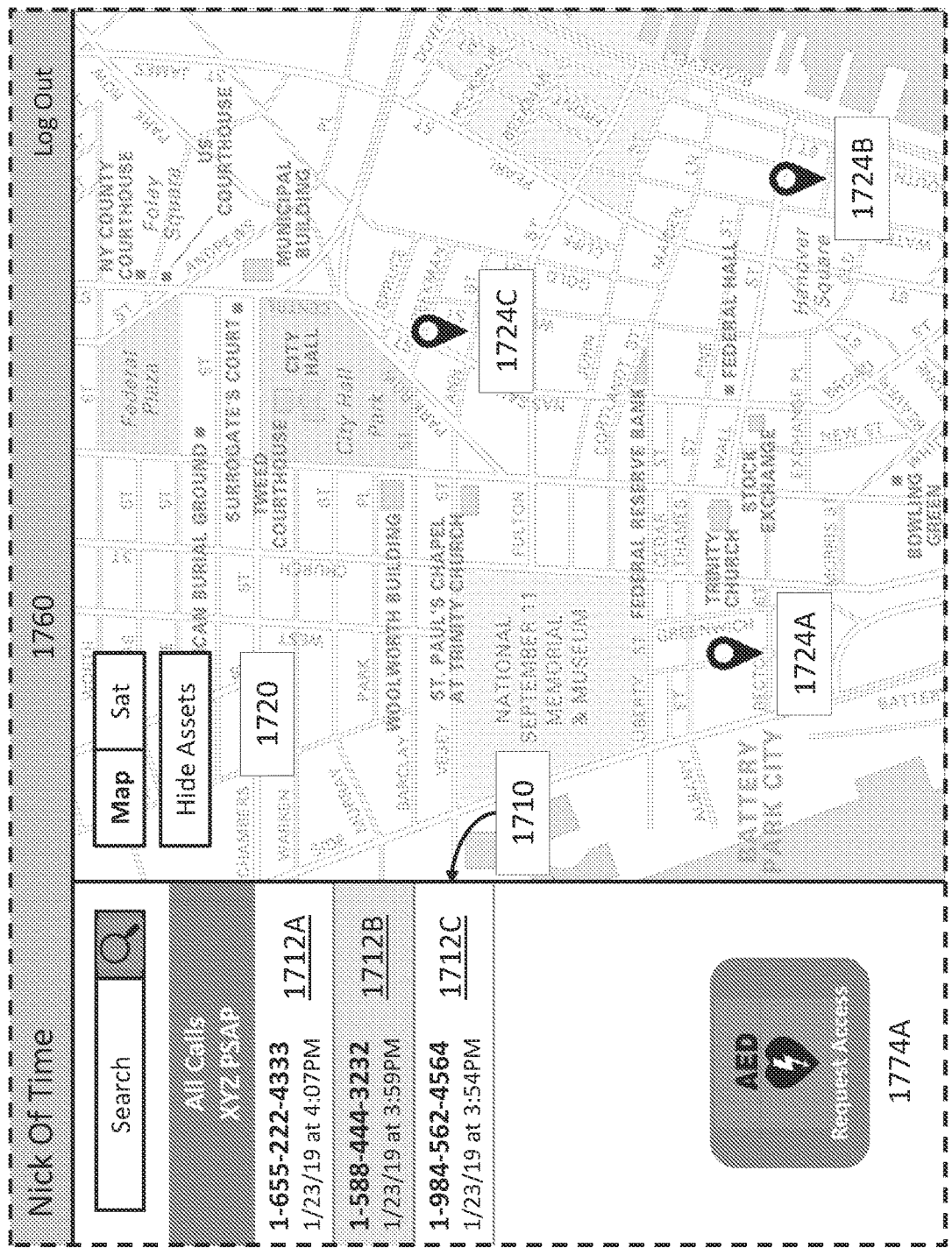
FIGS. 17A, 17B, 17C, and 17D illustrate an example of a graphical user interface (GUI) of an emergency response application in accordance with one embodiment of the present disclosure.
Figure 17B:
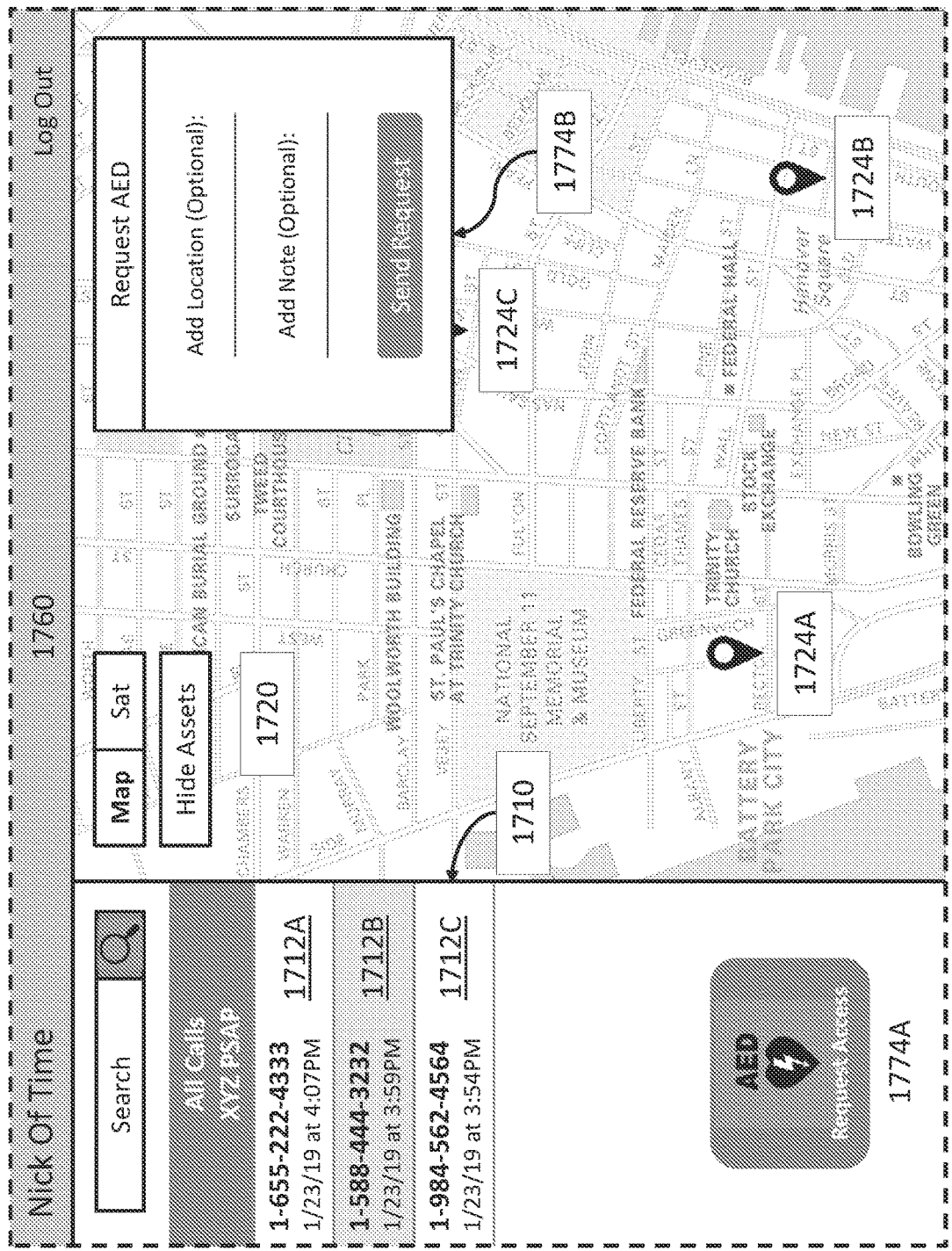

FIGS. 17A-17D illustrate an exemplary embodiment of an emergency response application accessed on a computing device at an emergency service provider (ESP; e.g., "XYZ PSAP"), as described above. As mentioned above, in some embodiments, an EMS or AMS identifies emergency response assets available for an emergency location only after receiving a request from an ESP. FIGS. 17A-17D depict one such embodiment. In the example illustrated by FIGS. 17A-17D, the EMS is communicatively coupled to an AMS that manages smart AEDs, as described above. In this example, a user of the emergency response application 1760 (e.g., a call taker at XYZ PSAP) is responding to the emergency represented by incident 1712B (as illustrated in FIG. 17A) and determines that the emergency is a cardiac emergency. Other emergency incidents (1712A, 1712C) with associated locations shown on the map (1724A, 1724C) may be handled by other users at the XYZ PSAP. The user may select asset controls 1774A to request an AED for the emergency represented by incident 1712B. In response, the emergency response application 1760 presents asset controls 1774B (as illustrated in FIG. 17B), which the user can use to optionally add a location (if they would like to dispatch the AED to a location different from the emergency location 1724B associated with the incident 1712B) or a note to the request. Finally, the user may select a button provided by the asset controls 1774B (such as the Send Request button) to transmit the request to the EMS. The emergency response application 1760 then prompts the EMS to transmit the request, including emergency location 1724B (or another location, if optionally included, as mentioned above) associated with incident 1712B to the AMS. The AMS then uses the emergency location 1724B to determine if they are any smart AEDs currently available for emergency location 1724B, as described above.

Figure 17C:
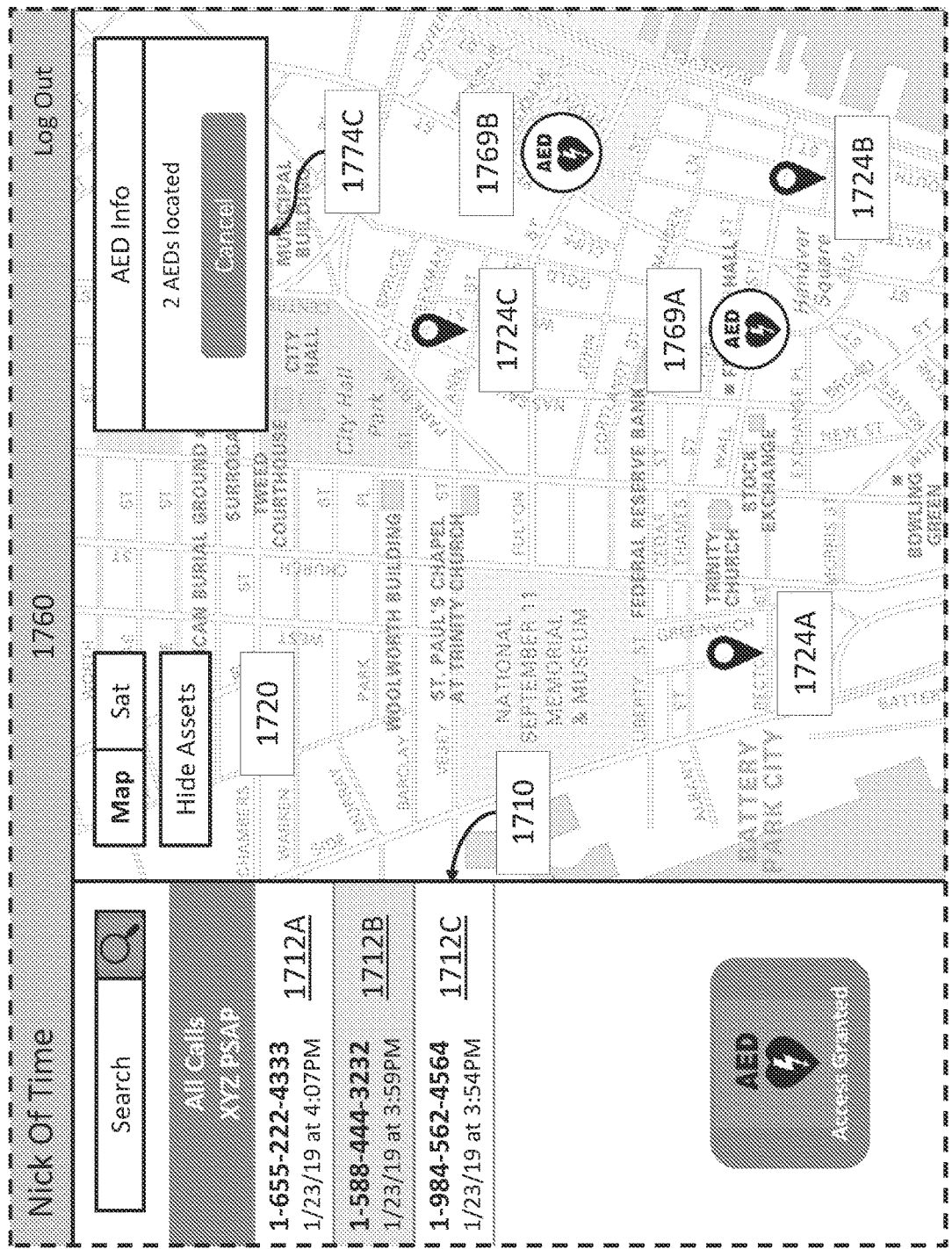
Figure 17D:
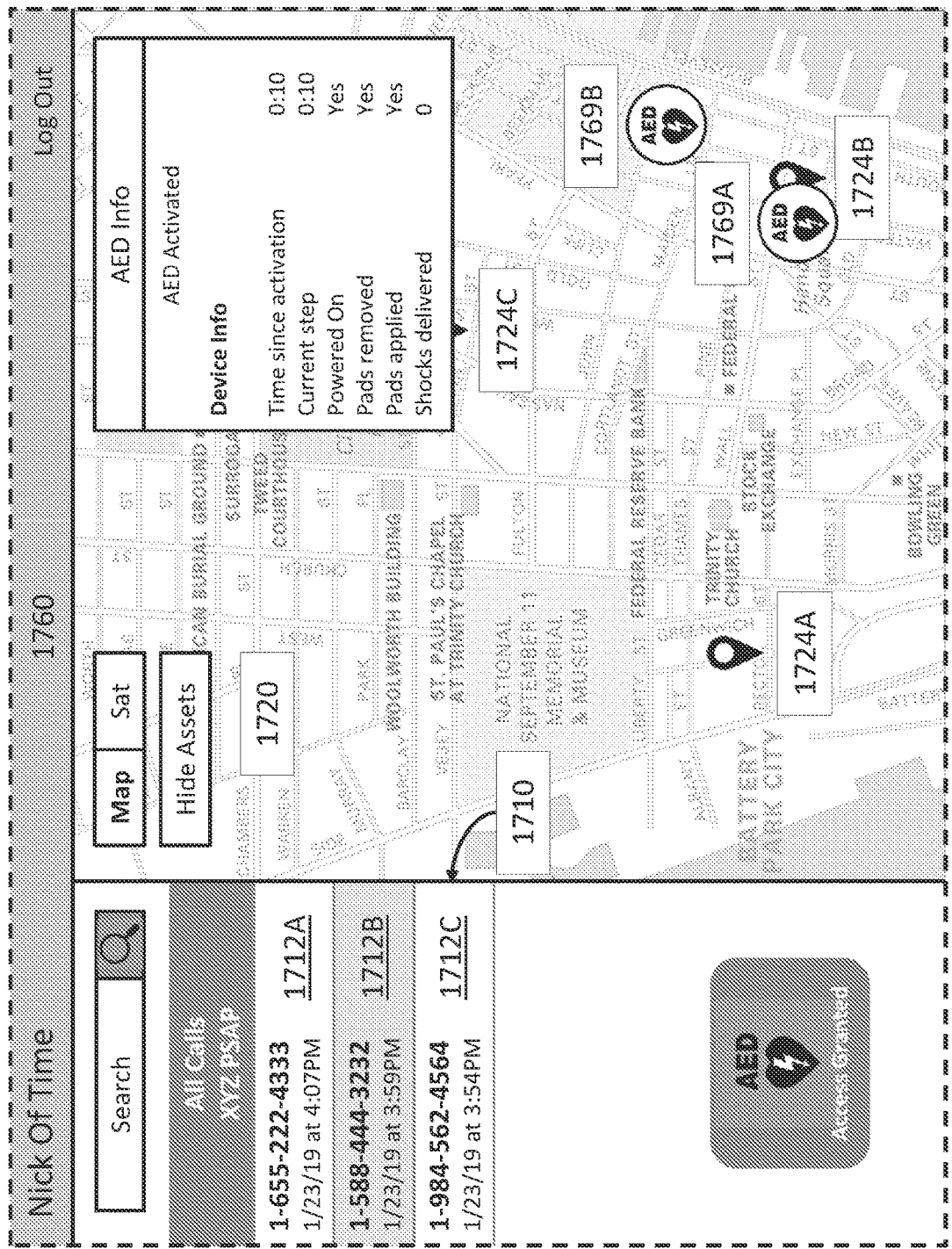

In this example, the AMS identifies two smart AEDs 1769A and 1769B available for emergency location 1724B, activates the two smart AEDs 1769, and returns information regarding smart AEDs 1769A and 1769B (e.g., the locations of the smart AEDs 1769) to the EMS, which then provides the information regarding the smart AEDs 1769 to the ESP through the emergency response application 1760. In this example, the activation of the two smart AEDs 1769 includes activating audio and visual alarms built into the smart AEDs 1769 and displaying emergency location 1724B on a display built into the smart AEDs 1769 (as well as any optionally included note in the request from the ESP, as described above) in order to instruct a first responder or a good Samaritan to take one of the smart AEDs 1769 to emergency location 1724B. As illustrated by FIG. 17C, the locations of the smart AEDs 1769A and 1769B are shown within the interactive map 1720. In some embodiments, the smart AEDs 1769 send periodic updates (e.g., location updates) to the EMS (such as through the AMS), which the EMS can relay to the ESP through the emergency response application 1760. The asset controls 1774C now provide the user of the emergency response application 1760 an option to cancel the activation of the emergency response assets 1769, if so desired. In this example, smart AED 1769A is carried to emergency location 1724B, as illustrated in FIG. 17D, and is being applied to a person at the scene of the emergency. During the application of smart AED 1769A, smart AED 1769A can transmit periodic updates to the EMS (such as through the AMS), which the EMS can relay to the ESP through the emergency response application 1760. For example, as illustrated in FIG. 17D, smart AED 1769A has provided updates showing that it has been in active use for ten seconds, that is has been powered on, that the pads have been removed, and that the pads have been applied.

As described above, in some embodiments, an emergency management system (EMS) or an asset management system (AMS), either separately or in combination, can determine if there are any emergency response assets available for an emergency location. If one or more emergency response assets are available for the emergency location, the EMS or AMS can transmit information regarding the one or more emergency response assets to an appropriate emergency service provider (ESP) through an emergency response application accessed at a computing device at the ESP. The emergency response application can display asset controls for activating the one or more emergency response assets through a graphical user interface (GUI) of the emergency response application. If the emergency response application detects one or more user interactions with the asset controls (e.g., by a user at the ESP), the emergency response application can transmit an electronic communication to the EMS or AMS prompting the EMS or AMS to activate the one or more emergency response assets according to the one or more user interactions with the asset controls. In some embodiments, a single EMS or AMS manages a single type of emergency response asset. For example, in some embodiments, a single EMS or AMS manages only smart AEDs. In some embodiments, a single EMS or AMS manages multiple types of emergency response assets. For example, in some embodiments, a single AMS manages both smart AEDs and drones equipped with AEDs. In some embodiments, a single EMS communicates with multiple AMSs that each individually manage one or more types of emergency response assets. For example, the single EMS may be communicatively coupled to two different AMSs: a first AMS associated with a first asset service provider (ASP) that manages both smart AEDs and drones equipped with AEDs and a second AMS associated with a second ASP that manages only smart building systems. In this way, a single EMS may act as a hub for various asset service providers (ASPs) to connect with emergency service providers (ESPs).

Figure 18:
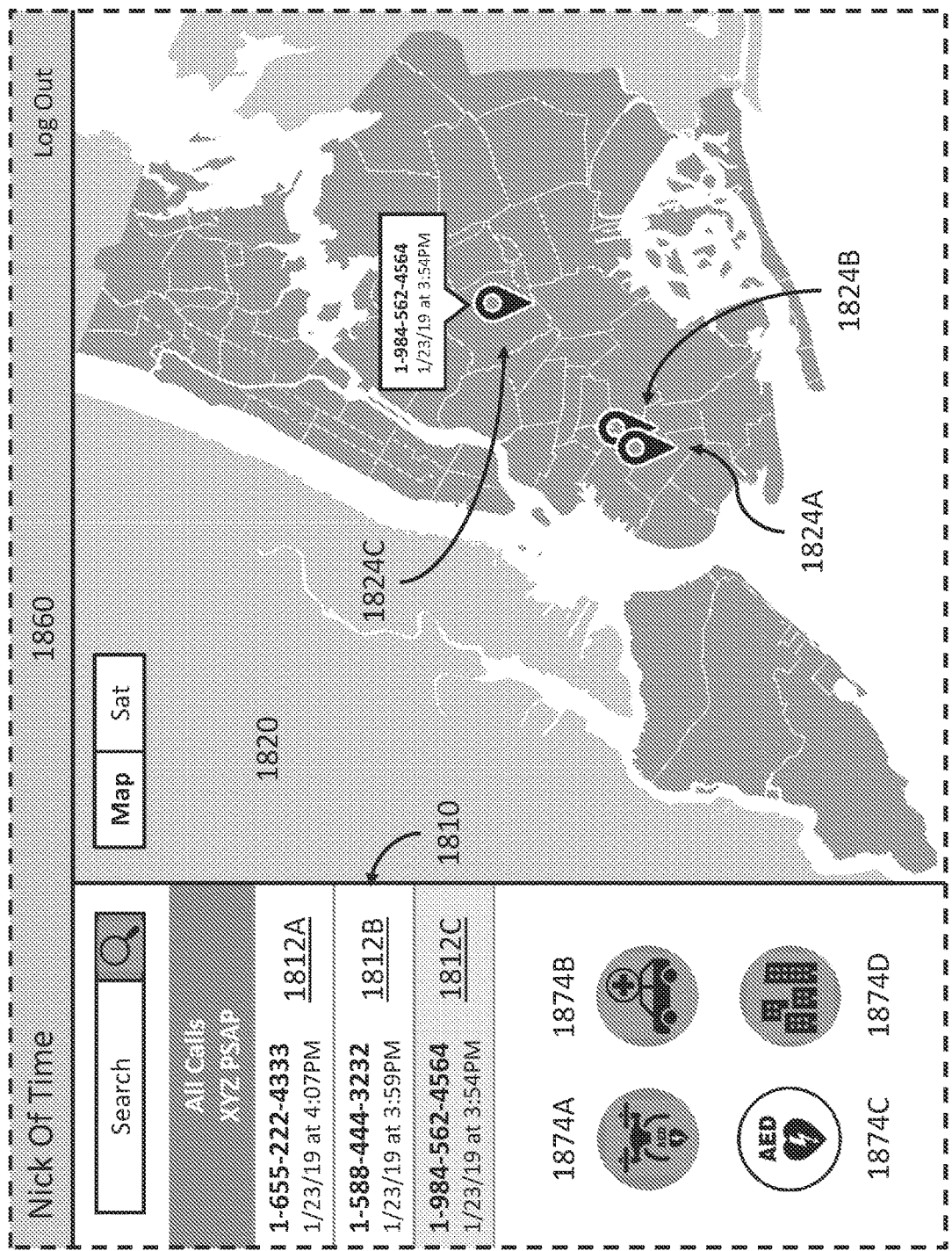
FIG. 18 illustrates an example of a graphical user interface (GUI) of an emergency response application in accordance with one embodiment of the present disclosure.

FIG. 18 illustrates an exemplary embodiment of an emergency response application accessed on a computing device at an emergency service provider (ESP; e.g., "XYZ PSAP"), as described above. In the example illustrated by FIG. 18, the emergency response application 1860 is communicatively coupled to a single EMS that is communicatively coupled to four different asset management systems (AMSs) associated with four respective asset service providers (ASPs). The four ASPs individually manage drones equipped with AEDs, vehicular telemedicine units, smart AEDs, and smart building systems, respectively. The EMS can therefore provide ESPs with access to the four different types of emergency response assets, depending on their availability. In some embodiments, as illustrated in FIG. 18, when the EMS receives an emergency location, the EMS can communicate with all four of the AMSs communicatively coupled to the EMS to determine if any of the four different types of emergency response assets are available for the emergency location. For example, incident location 1824C represents an emergency location received by the EMS and subsequently transmitted to the emergency response application, as described above. Other incidents (1812A, 1812B) at other locations (1824A, 1824B) may also be shown. In this example, the EMS, in parallel with transmitting the emergency location to the ESP, has communicated with each of the four AMSs communicatively coupled to the ESP to determine if there are any emergency response assets available for the emergency location, as described above. A user has selected incident location 1824C (representative of the emergency location) within the interactive map 1820 or its associated incident 1812C within the list of incidents, and the emergency response application 1860 now displays asset controls for each of the four different types of emergency response assets. In this example, three of the four asset controls (asset controls 1874A, 1874B, and 1874D, associated with the drones equipped with AEDs, the vehicular telemedicine units, and the smart building systems) are highlighted, indicating that the EMS has determined that there is a drone equipped with an AED, a vehicular telemedicine unit, and a smart building system are available for the emergency location represented by incident location 1824C. The fourth asset controls (asset controls 1874C associated with smart AEDs) is not highlighted, indicating that a smart AED is not available for the emergency location represented by incident location 1824C. In this example, a user of the emergency response application 1860 may interact with any or all of the asset controls 1874A, 1874B, and 1874D to transmit an electronic communication to the EMS indicating a request to activate any or all of the drone equipped with an AED, the vehicular telemedicine unit, and the smart building system determined to be available for the emergency location represented by incident location 1824C, as described above.

In some embodiments, various restrictions may be applied to emergency response assets. For example, in some embodiments, users of the emergency response application may be assigned different roles within the emergency response application. For example, an administrator of a public safety answering point (PSAP) may assign different roles within the emergency response application to different people associated with the PSAP, and the different roles may have different permissions or access levels. The permission or access levels may differ between roles based on the training a person has received (e.g., only personnel having undergone training to operate a drone is given permission to activate a drone for emergency response). For example, a "call taker 1" role within the emergency response application may have access to smart AEDs and drones equipped with AEDs but may not have access to smart building systems or vehicular telemedicine units. In this example, "call taker 2" role may have access to all types of emergency response assets. Thus, in this example, if a user with a "call taker 1" role is logged into the emergency response application and the EMS or AMS determines that there are one or more smart AEDs and one or more vehicular telemedicine units available for an emergency location transmitted to the PSAP through the emergency response application, the emergency response application would only display asset controls to the one or more smart AEDs. However, if a user with a "call taker 2" role is logged into the emergency response application and selects an incident location representing the same emergency location transmitted to the PSAP, the emergency response application will display asset controls to both the one or more smart AEDs and the one or more vehicular telemedicine units. In another example, in some embodiments, the EMS or emergency response application will provide access to a particular type of emergency response asset only for particular types of emergencies. For example, in some embodiments, vehicular telemedicine units are only made accessible for medical emergencies. In some embodiments, a user of the emergency response application can select an incident or its associated incident location and provide an indication of what type of emergency the incident represents. In some embodiments, the emergency response application can receive an indication of what type of emergency an incident represents from another software application installed on or accessed by a computing device at the ESP at which the emergency response application is being accessed. In some embodiments, an emergency alert received by the EMS includes a type of emergency. In some embodiments, the EMS can use emergency data associated with an emergency alert to determine a type of emergency for the emergency alert.

Post-Activation Communications

As described above, in various embodiments, an emergency management system (EMS) is communicatively coupled to one or more asset management systems (AMSs) and one or more emergency service providers (ESPs). When the EMS receives an emergency location, the EMS can communicate with the one or more AMSs to determine if there are any emergency response assets available for the emergency location. If one or more emergency response assets are available for the emergency location, the EMS can transmit information regarding the one or more emergency response assets to one or more appropriate ESPs (e.g., as determined by identifying one or more ESPs associated with jurisdictions that encompass the emergency location, as described above). In some embodiments, an emergency response application accessed by the one or more ESPs and communicatively coupled to the EMS displays asset controls for activating the one or more emergency response assets, and, in response to detecting one or more user interactions with the asset controls, the emergency response application can transmit an electronic communication to the EMS prompting the EMS or AMS to activate the one or more emergency response assets according to the one or more user interactions with the asset controls, as described above. As described above, the activation of an emergency response asset may take on various forms depending on the type of emergency response asset and the one or more user interactions with the asset controls. For example, activating a drone equipped with an AED may include dispatching the drone to the emergency location; activating a smart AED may include activating a siren or lights built into the smart AED; activating a smart building system may include accessing a surveillance camera or remotely locking a door; activating a vehicular telemedicine unit may include dispatching the vehicular telemedicine unit to the emergency location.

In some embodiments, after an emergency response asset has been activated, the emergency response asset can transmit post-activation communications to the AMS, EMS, or the ESP that interacted with the asset controls to activate the emergency response asset. For example, in some embodiments, the emergency response asset can transmit a status update to the ESP (e.g., via the AMS or EMS). For example, when a drone dispatched to an emergency location arrives at the emergency location, the drone can transmit a status update to the ESP indicating that the drone has arrived at the emergency location. In another example, a smart AED can transmit a notification to the ESP when the smart AED is used to administer a shock to a patient. In some embodiments, an emergency response asset activated by the AMS or EMS transmits periodic status updates to the AMS or EMS, which can subsequently transmit the periodic status updates to the ESP, such as by displaying the periodic status updates within a graphical user interface (GUI) of an emergency response application accessed by the ESP.

In another example, a telemedicine unit dispatched to an emergency location and used to administer a medical care session can transmit a status update to the AMS, EMS, or ESP once the medical care session has concluded. For example, an ESP selects to dispatch a telemedicine unit carried in the trunk of a ride sharing vehicle to an emergency location for a patient experiencing an unidentified illness. The driver of the ride sharing vehicle arrives at the emergency location, retrieves the telemedicine unit from the trunk of the vehicle, takes the telemedicine unit to the patient, and sets up the telemedicine unit for a medical care session via a video conference. A live doctor appears on the other side of the video conference and provides medical care to the patient, ultimately diagnosing the patient with a non-emergent, non-life-threatening case of heat exhaustion. The doctor instructs the patient to carefully hydrate and rest, and then selects an option within a software application accompanying the telemedicine unit to close the case. In response, the telemedicine unit transmits an electronic communication to the AMS indicating that the medical care session has concluded and that no further action is required. The AMS can then transmit the electronic communication to the EMS, which can then transmit the electronic communication to the ESP through the emergency response application. The emergency response application can then display a status or message indicating that the medical care session has concluded and that no further action is required. However, if the doctor had diagnosed the patient with an emergent or life-threatening condition and transmitted such an indication to the ESP (e.g., via the AMS or EMS), a user of the emergency response application at the ESP (e.g., a call taker at a PSAP) could be notified through the emergency response application that further action is required, such as dispatching an ambulance.

In some embodiments, once an emergency response asset has been activated in response to the detection of one or more user interactions with asset controls by a user of the emergency response application at an ESP, the ESP remains communicatively linked to the emergency response asset (e.g., via the emergency response application, the EMS, or the AMS) until the user selects to end the link with the emergency response asset. For example, in some embodiments, when a smart building system is activated, the emergency response application displays an asset interface for controlling the smart building system within the GUI of the emergency response application, as described above. In some embodiments, a user of the emergency response application may use the asset interface to control the smart building system (e.g., locking and unlocking various doors, accessing video feeds from various surveillance cameras) until the user selects to close the asset interface. However, in some embodiments, a user of the emergency response application has no further control or interactions with an emergency response asset once the user interacts with asset controls to activate the emergency response asset.

Figure 19:
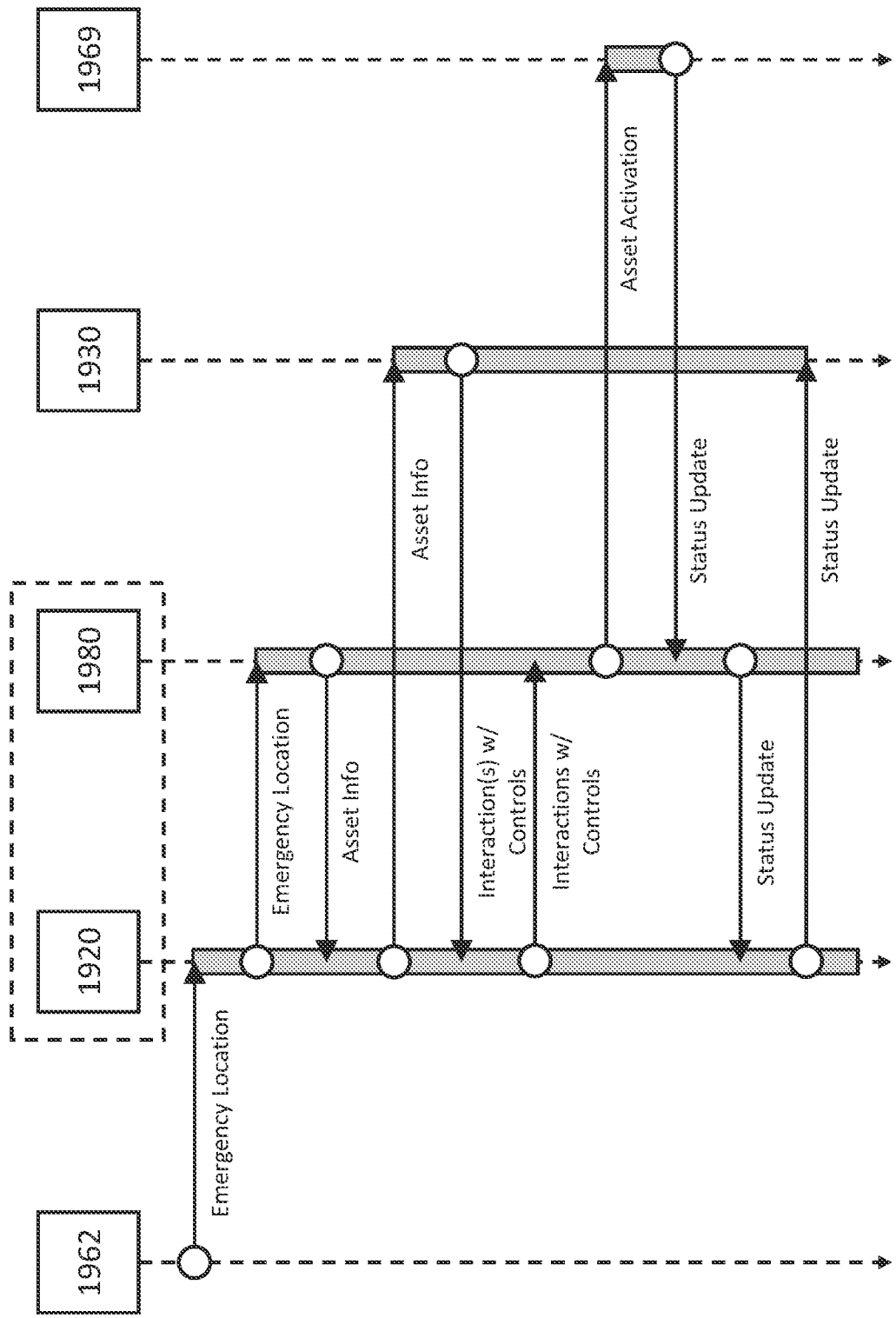
FIG. 19 depicts a ladder diagram of a method for providing emergency assistance by an emergency management system (EMS) and an asset management system (AMS) in accordance with one embodiment of the present disclosure.

FIG. 19 depicts a ladder diagram of an exemplary process for communicating with an emergency response asset. In some embodiments, as described above, an emergency management system (EMS) 1920 receives an emergency location from an emergency data source 1962, such as through an emergency alert. As depicted in FIG. 19, the EMS 1920 can then communicate with an asset management system (AMS) 1980 (which may be a component of the EMS) to determine if there are any emergency response assets 1969 available for the emergency location, as described above. If there are one or more emergency response assets 1969 available for the emergency location, the AMS 1980 can return information regarding the one or more emergency response assets 1969 to the EMS 1920, which can then transmit the information regarding the one or more emergency response assets 1969 to an appropriate emergency service provider (ESP) 1930, as described above. In some embodiments, an emergency response application accessed on a computing device at the ESP 1930 then displays asset controls for activating the one or more emergency response assets 1969. If a user of the emergency response application interacts with the asset controls, the ESP 1930 can transmit (e.g., through the emergency response application) to the EMS 1920 a request to activate the one or more emergency response assets 1969 according to the interaction(s) with the asset controls. In response, the EMS 1920 forwards the request to activate the one or more emergency response assets 1969 according to the interaction(s) with the asset controls to the AMS 1980 (such as by transmitting an API call including an API key associated with the emergency response asset to the AMS 1980, as described below), which then communicates with the one or more emergency response assets 1969 to activate the one or more emergency response assets 1969 according to the interaction(s) with the asset controls, as described above. In some embodiments, after the one or more emergency response assets 1969 have been activated, the one or more emergency response assets 1969 can transmit one or more status updates to the AMS 1980, as described above. The AMS 1980 can then forward the one or more status updates to the EMS 1920, which can then forward the one or more status updates to the ESP 1930. However, FIG. 19 only depicts one of many embodiments disclosed herein of processes for communicating with emergency response assets. For example, in some embodiments, the EMS 1920 can bypass transmitting information regarding the one or more emergency response assets 1969 received from the AMS 1980 and autonomously transmit a request to activate the one or more emergency response assets 1969 to the AMS 1980, as described above. In another example, in some embodiments, an ESP 1930 can communicate directly with an emergency response asset 1969 (e.g., without having to communicate with the emergency response asset indirectly through the EMS or AMS) after the information regarding the one or more emergency response assets is received by the ESP 1930. In another example, in some embodiments, emergency response assets 1969 do not provide status updates after they have been activated.

Provisioning of Emergency Response Assets

As described above, in various embodiments, an emergency management system (EMS), in communication with an asset management system (AMS), which may be a part of the EMS, functions to identify an emergency response asset available for an emergency location, provide information regarding the emergency response asset to an emergency service provider (ESP), and activate the emergency response asset either automatically or upon request. The EMS can be in communication with a plurality of asset management systems, for example, including a smart building AMS and an automated drone AMS. In some embodiments, before an emergency response asset can be utilized by the EMS, the emergency response asset must be registered (or "provisioned") with the EMS.

An emergency response asset may be registered or provisioned with the EMS in various ways. In some embodiments, all necessary information regarding an emergency response asset (e.g., identifying information associated with the emergency response asset, a location of the emergency response asset, instructions for how the EMS should communicate with the AMS associated with the emergency response asset, etc.) can be hardcoded into the programs written for the operation of the EMS. In some embodiments, the EMS exposes an endpoint to receive information regarding an emergency response asset from an asset service provider (ASP), such as via an AMS associated with the ASP. In some embodiments, emergency response assets may be provisioned through an asset provisioning interface provided by the EMS, as described below.

Figure 20B:
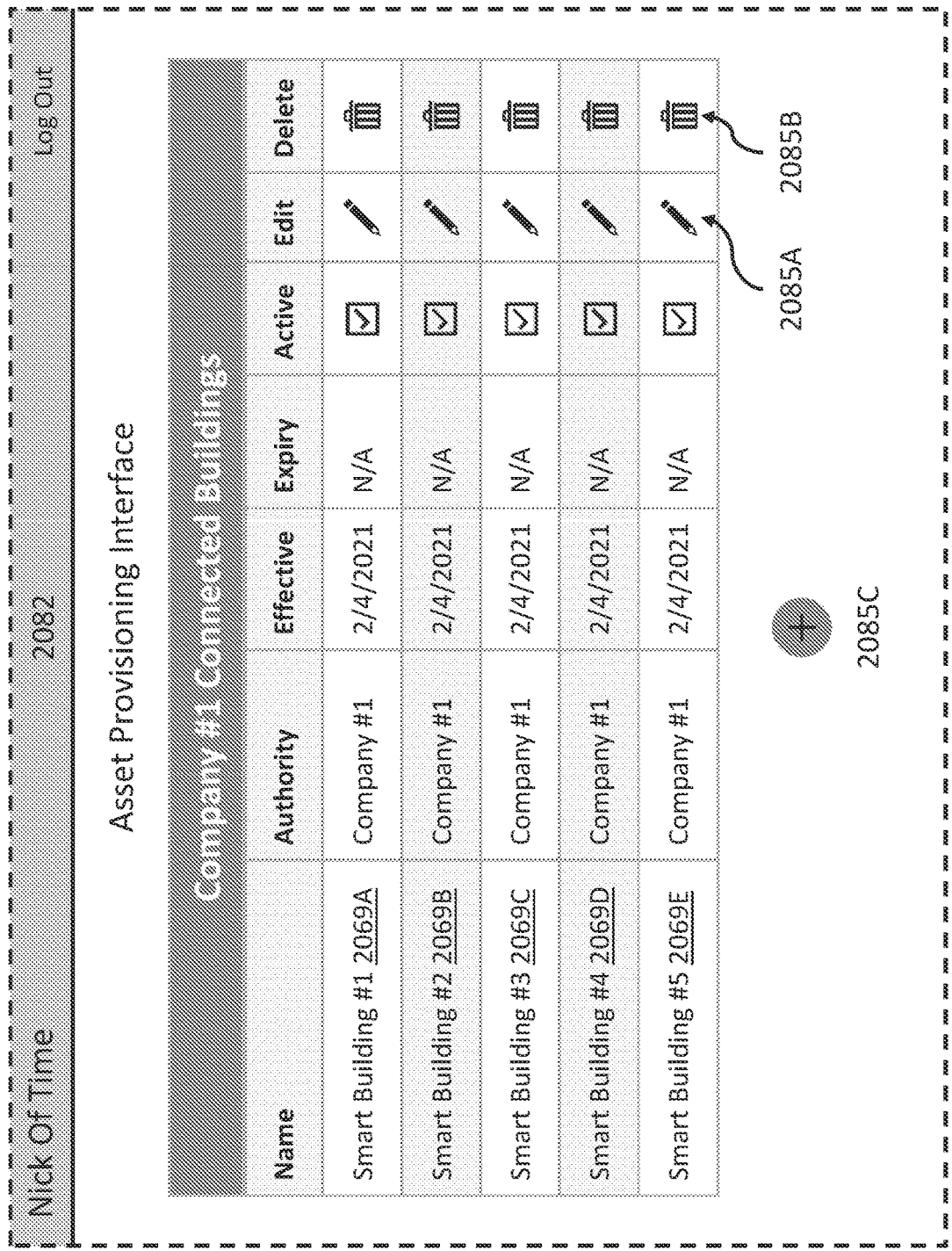
Figure 20C:
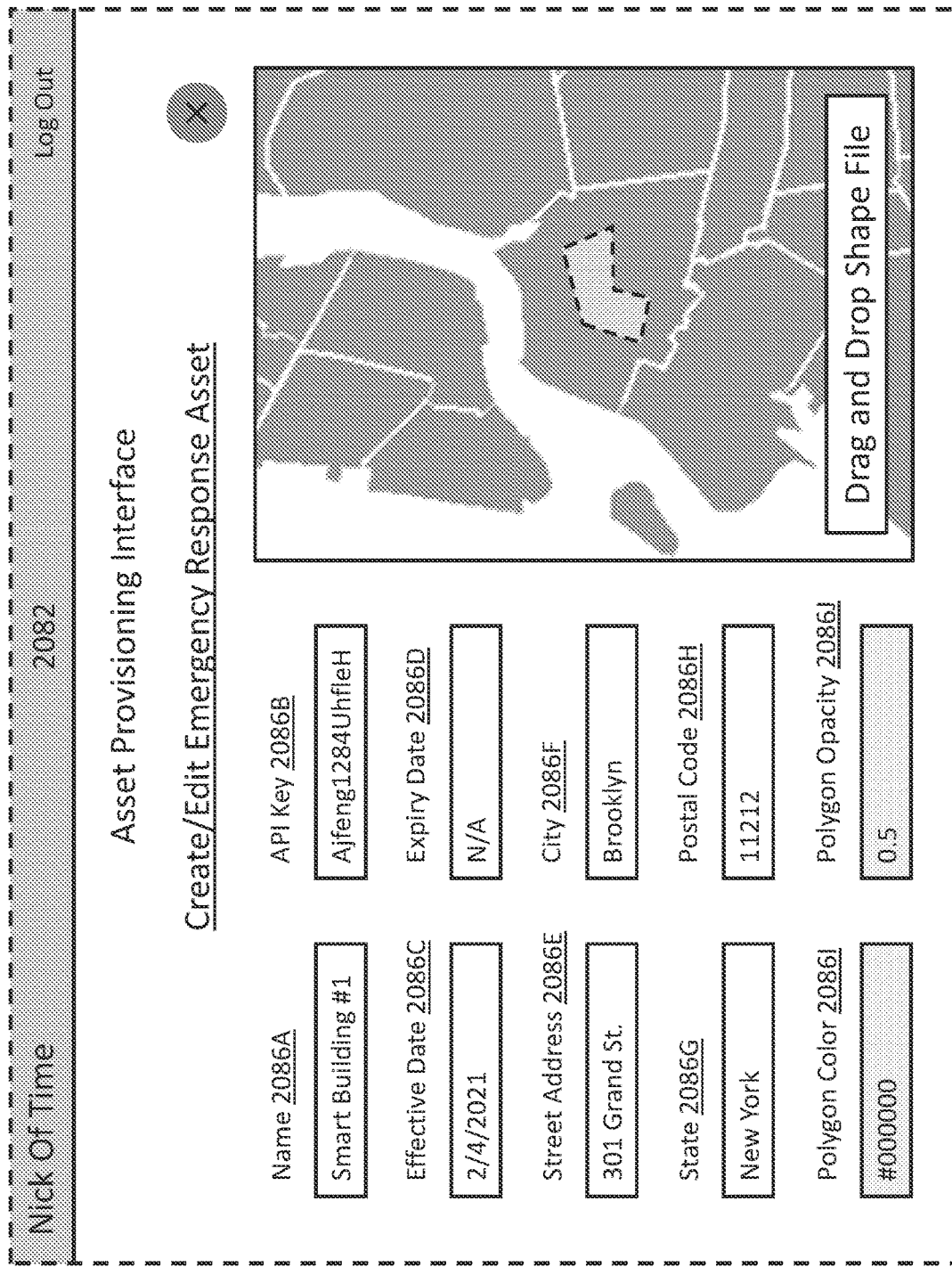

FIGS. 20A-20C illustrate an exemplary interface for provisioning emergency response assets (hereinafter, "asset provisioning interface") with an emergency management system (EMS) or an asset management system (AMS). In some embodiments, as illustrated by FIGS. 20A-20C, the asset provisioning interface 2082 is provided by an EMS or an AMS as a website or a web application accessible via a standard web browser. As illustrated, the asset provisioning interface 2082 allows a user to define a new type of emergency response asset, edit an existing type of emergency response asset, and add, delete, or edit emergency response assets. FIG. 20A illustrates the creation of a new type of emergency response asset. In some embodiments, as illustrated in FIG. 20A, an emergency response asset type may be defined by identifying information, such as a name 2083A, a source (e.g., an associated ASP) 2083B, and/or a category 2083D; functional information, such as an API Call 2083C; aesthetic features, such as a polygon color 2083E and polygon opacity 2083F; and other attributes 2084, such as a location or a geofence. However, emergency response asset types may be defined in any other way and with any other information.

In the example illustrated by FIG. 20A, a user of the asset provisioning interface 2082 uses the asset provisioning interface 2082 to define a new type of emergency response assets, named Company #1 Connected Buildings, supplied by Connected Building Company #1. As illustrated, the category of the new type of emergency response asset has been selected as Connected Buildings, a polygon color (e.g., for the connected building's geofence when displayed within the GUI of an emergency response application, as described above) has been submitted as #000000 (i.e., black) with a polygon opacity of 50%. The API Call for the emergency response asset type has been set to an API endpoint (in this example, http://company01.com/activate_building) provided by the AMS or ASP that manages the emergency response asset type (e.g., Connected Buildings Company #1). For example, in some embodiments, when a particular emergency response asset provisioned under this emergency response asset type is selected to be activated (as described above), the EMS transmits an API call using the URL provided under API Call and including an API key specific to the particular emergency response asset (as described below). Finally, in this example, other attributes 2084 defined for the new type of emergency response assets (Company #1 Connected Buildings) include an address, which requires four values: Street Address, City, State, and Postal Code. In some embodiments, a user may use the attributes 2084 section to define any number and type of additional pieces of information, required or optional, associated with a type of emergency response asset. For example, additional attributes 2084 required by the definition of a connected building emergency response asset may include a floor plan. In some embodiments, after defining a new type of emergency response asset, the definition of the new emergency response asset type is stored in an asset database, as described above. In some embodiments, a user may later use a similar interface to edit the definition of an emergency response asset type.

In some embodiments, as illustrated by FIGS. 20B and 20C, once a type of emergency response asset has been defined, a user of the asset provisioning interface 2082 can use the asset provisioning interface 2082 to provision emergency response assets of that type with an EMS or AMS. In the example illustrated by FIG. 20B, the user has provisioned five different emergency response assets 2069 under the Company #1 Connected Buildings type earlier established in the example illustrated by FIG. 20A, Smart Buildings #1-#5 (2069A-2069E). In this example, for emergency response assets 2069 that have already been provisioned (such as through a Create/Edit emergency response asset interface, as illustrated by FIG. 20C), the asset provisioning interface 2082 shows the name of the emergency response asset 2069, the managing authority of the emergency response asset (e.g., the source, as described above), the date that the emergency response asset was put into effect (hereinafter, "effective date"), the date that the emergency response asset will no longer be effective (if applicable; hereinafter, "expiry date"), whether or not the emergency response asset is active, and options to edit 2085A or delete 2085B the emergency response asset. However, the asset provisioning interface 2082 may display any available information associated with an emergency response asset 2069 provisioned with the EMS or AMS. Additionally, the asset provisioning interface 2082 may display an option to add 2085C a new emergency response asset 2069 under the earlier defined emergency response asset type.

FIG. 20C illustrates a non-limiting embodiment of a Create/Edit emergency response asset interface for Smart Building #1, the first emergency response asset 2069A provisioned under the Company #1 Connected Buildings emergency response asset type, defined in the example illustrated by FIG. 20A. In some embodiments, the Create/Edit emergency response asset interface provides input options 2086 for naming the emergency response asset, providing an API key associated with the emergency response asset (as described above), the effective and expiry date (as described above), all of which may be standard information for every emergency response asset provisioned with the EMS or the AMS. In some embodiments, the Create/Edit emergency response asset interface also provides input options for providing the address of the emergency response asset (Street Address, City, State, and Postal Code), as defined as required values for emergency response assets of this type (as illustrated in FIG. 20A). As shown, the Create/Edit emergency response asset interface also shows the polygon color and polygon capacity of the emergency response asset, which cannot be edited for the individual emergency response asset because it has been predefined by the definition of the associated emergency response type in this illustrative example (FIG. 20A). Finally, in this example, the Create/Edit emergency response asset interface also provides an option to submit a shape file for the emergency response asset (which may be required for emergency response assets of certain categories, such as connected buildings). In this example, a user is permitted to drag and drop a shape file into the definition of the emergency response asset.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device. In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random-access memory (FRAM). In some embodiments, the non-volatile memory comprises phase-change random access memory (PRAM). In some embodiments, the non-volatile memory comprises magneto resistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing-based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, trackpad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CS S). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-In

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™ PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Certain Terminologies

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, a "device" is a digital processing device designed with one or more functionality. A "triggering device" refers to a communication device with a communication component, which will allow it to send and receive information over a wireless channel, a wired channel, or any combination thereof (e.g., sending/receiving information over the Internet). Exemplary triggering devices include a mobile phone (e.g., a smartphone), a laptop, a desktop, a tablet, a radio (e.g., a two-way radio), and a vehicular communication system. In some embodiments, a triggering device includes a car security system (e.g., OnStar®), a home security system, or a home control system (e.g., a networked control system for providing network controlled and/or smart temperature control such as a Wi-Fi smart thermostat, lighting, entertainment, and/or door control, such as Nest®). In some embodiments, a triggering device is an Internet of Things (IoT) device. In some embodiments, the triggering device is a sensor for sensing environmental or health indicators. In some embodiments, the sensor may include a sensing component and a communication component. In some embodiments, the triggering device is a sensor in a sensor network or a device that controls a sensor network.

In some embodiments, a triggering device is a wearable device (e.g., a communication device worn by a user). In some embodiments, a triggering device (e.g., a wearable device) comprises one or more sensors. As used herein, a "mobile wireless device" refers to a device that is portable and communicates wirelessly. In some embodiments, a user wears or carries the mobile wireless device on the user's person or in the user's vehicle. Exemplary mobile wireless devices include mobile or cellular phones, wearable devices (e.g., smart watch, fitness tracker, wearable sensor, smart glasses, etc.).

As used herein, an "associated device" refers to a communication device that is associated with the triggering device. For example, a user may be using several communication devices such as a mobile phone, a wearable, a home security system, a car computer. The user may have registered these devices with his or her account and linked these devices with a username, user number(s), email address(es), home or other physical address(es). In some embodiments, associated devices may include communication devices of a second user who is associated with user, e.g., a husband and wife, a father and son, a victim and doctor, friends, work colleagues, etc. In some cases, the user may have added the second user as an emergency contact, a member of a group, etc. In some cases, user may have agreed to share location and other data with the second user. In some embodiments, the second user may be someone who is frequently contacted by the user and the communication device identifies the second user from the "Recently called" or "Frequently called" list. In some embodiments, the associated devices may be devices that are proximal or near-by to the triggering device such as obtained through a Wi-Fi scan. In some embodiments, an associated device is proximal to the triggering device when the location of the associated device is within 1, 5, 10, 15, 20, 25, 30, 35, 40, 45, 50, 60, 70, 80, 90, 100, 200, 300, 400, or 500 meters of the location of the triggering device.

As used herein, the "list of associated devices" refers to a list of communication devices that are associated with the user or the triggering device (e.g., a second resident in a smart home). The list of associated devices may be listed by username, phone number, email address, physical address, coordinates etc. The device entry in the list may include phone number, email address, physical address, coordinates, BSSID, SSID or MAC address. The list may be user defined or generated by the device or the EMS.

As used herein, a "emergency service request" refers to a request or message sent to an emergency service provider for emergency assistance. In some embodiments, a request for assistance is an emergency request for assistance (e.g., the request is associated with an emergency situation) such as, for example, an emergency alert. In some embodiments, an emergency alert comprises a request for assistance. In some embodiments, a request for assistance is associated with an emergency situation. In some embodiments, a request for assistance comprises an emergency indication. In further embodiments, an emergency indication is selected from one or more of the group consisting of traffic accident, police emergency, medical emergency, and fire emergency. In some embodiments, a request for assistance is associated with a non-emergency situation (e.g., request for a tow truck after car breaks down). In some embodiments, a request for assistance is associated with a device sending the request. In other embodiments, a request for assistance is associated with a device not sending the request (e.g., a proxy request on behalf of a second device and/or a member device in a group of devices). As used herein, a request is "associated" with a device or user when the request relates to an emergency or non-emergency situation involving the device or user. In some embodiments, a request comprises data associated with a device (or user thereof). In some embodiments, a request comprises a data set associated with a device. For example, in some embodiments, a request comprises a data set associated with a device, wherein the data set comprises current location data. In other embodiments, a request for assistance is sent and/or received separately from data associated with a device. For example, in some embodiments, a request is sent first, and the recipient subsequently queries the device that sent the request for data or a data set associated with the emergency and/or device or user involved in the emergency. Alternatively, in some embodiments, a request is sent first, and the recipient subsequently queries the device associated with the emergency for data or a data set associated with the emergency and/or device or user involved in the emergency.

As used herein, a "emergency responder" refers to any person or persons responsible for addressing an emergency situation. In some embodiments, a first responder refers to government personnel responsible for addressing an emergency situation. In some embodiments, a first responder is responsible for a particular jurisdiction (e.g., a municipality, a township, a county, etc.). In some embodiments, a first responder is assigned to an emergency by an emergency dispatch center. In some embodiments, a first responder responds to a request for emergency assistance placed by a user via a user communication device. In some embodiments, a first responder includes one or more fire fighters, police officers, emergency medical personnel, community volunteers, private security, security personnel at a university, or other persons employed to protect and serve the public and/or certain subsets of the population.

As used herein, an "emergency service provider" (ESP) is a public or private organization or institution responsible for providing emergency services. For example, in some embodiments, an EDC (e.g., a public safety answering point (PSAP)), a fire department, a police department, and a hospital may all be considered emergency service providers. In some embodiments, an emergency responder is a member of an ESP. In some embodiments, an ESP personnel is a person who works at an ESP. For example, an ESP personnel may be a call-taker at a PSAP or a first responder at a fire department.

As used herein, a "recipient" refers to one or more persons, services, or systems that receive a request for assistance (e.g., an emergency alert). The recipient varies depending on the type of request. In some embodiments, a recipient is an emergency service. In some embodiments, a recipient is an emergency service when he requests for assistance pertains to an emergency (e.g., a tier 2 emergency). In some embodiments, a recipient is an emergency management system. In some embodiments, a recipient is an emergency dispatch center. In some embodiments, a recipient is an emergency dispatch center, wherein the request is first routed through an emergency management system (e.g., request is sent to the EMS, but ultimately is sent to an EDC). In some embodiments, a recipient is a first responder (e.g., a communication device of a first responder). In some embodiments, a recipient is a non-emergency service or personnel, for example, a relative or friend. In such situations, a user of a communication device (or member device or second device) does not require emergency assistance, but does need help. As an example, a user of a member device in a group of devices is a child who is lost in a theme park. The parent of the child has a communication device in the same group of devices as the child's member device. The parent uses the communication device to send a request for assistance on behalf of the child's member device to theme park security guards who are closer to the child than the parent. Security is then able to pick up the child quickly using the data set associated with the member device, which they are given authorization to access by the parent's communication device.

As used herein, an "emergency data source" refers to any device, server, or system that can produce, generate, or communicate information or data pertinent to an emergency. In some embodiments, an emergency data source is a communication device, a wearable device, an internet of things (IoT) device, or any other type of device. In some embodiments, an emergency data source is a network server. As used herein, an "emergency data recipient" refers to any device, server, or system or user of any device, server, or system that can receive information or data pertinent to an emergency. In some embodiments, an emergency data recipient is an emergency service provider (ESP), ESP personnel, or an electronic device associated with an ESP. In some embodiments, an emergency data recipient is a person in an emergency or an electronic device associated with a person in an emergency.

As used herein, a "victim" refers to a person experiencing an emergency. As used herein, a "medical service provider" is a facility that provides people with medical services, such as a hospital, healthcare clinic, emergency room, urgent care center, etc. As used herein, a "preferred medical service provider" is a medical service provider covered under a victim's medical insurance or a medical service provider or has better (e.g., more optimal or less expensive) coverage under the victim's medical insurance than another medical service provider. In some embodiments, a preferred medical service provider may be referred to as an "in-network hospital" or "in-network medical service provider." As used herein, a medical service provider is "proximal" to a location if the medical service provider is within the vicinity of the location (e.g., within 1 mile, 2 miles, 3 miles, 4 miles, or 5 miles of the location).

As used herein, a "user" refers to one or more person or persons associated with a device (e.g., communication device, member device, second device, device of a first responder, etc.). In some embodiments, a user utilizes a device to place a request for assistance. In some embodiments, user refers to one or more persons who are paid subscribers of a network access service, for example, cellular service subscribers. In some embodiments, a user refers to anyone who gains access to a network via a router, for example, a Wi-Fi router, and is not a paid subscriber of any access service. In some embodiments, a device associated with a user is a device carried or worn on the person of the user (e.g., a phone or wearable device). In some embodiments, a device associated with a user is not carried or worn on the person of the user (e.g., a home security sensor or camera installed in the home of the user, a vehicle tracking system installed in a vehicle of the user, etc.).

As used herein, "data" refers to a collection of information about one or more entities (e.g., user of a user communication device) and/or an environment that pertains to characteristics of the one or more entities. In some embodiments, an entity is a person. In some embodiments, an entity is a thing (e.g., a house). For example, in some embodiments, data comprises sensor data from home sensors associated with a house. In this example, the data is also associated with one or more persons (e.g., the homeowner(s) and/or inhabitant(s)). In some embodiments, data refers to meta-data. In some embodiments, data comprises health data about the user of a communication device. In some embodiments, data comprises information about the surrounding environment of the user of the user communication device (e.g., surrounding temperature, location, elevation, barometric pressure, ambient noise level, ambient light level, surrounding geography, etc.). In some embodiments, data comprises information about other users that is pre-stored in a device or in a database (e.g., a database within a group of devices who are related to the user of the user communication device as predefined by the user). In some embodiments, the data set comprises information from two or more users of user communication devices, wherein each user is affected by the current emergency situation. As an example, two unrelated users are involved in a vehicular collision, and each user sends a separate emergency request (for traffic accident) using his/her communication device. In this example, the separate emergency requests are associated (e.g., by an emergency management system and/or emergency dispatch center) with the same emergency based on the proximity of time, location, and emergency indication of the emergency requests. As a result, the data set for this accident comprises information from both user communication devices. In further embodiments, current data comprises information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old. In further embodiments, current data comprises information that equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, data comprises historical data. In further embodiments, historical data comprises information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old. In further embodiments, historical data comprises information that equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, the age of information is calculated from the date the information is first collected (e.g., when a sensor first detects a sensed parameter such as, for example, heart rate).

As used herein, "health data" refers to medical information associated with a user of a device. In some embodiments, health data comprises medical history such as, for example, past illnesses, surgery, food and/or drug allergies, diseases, disorders, medical diagnostic information (e.g., genetic profile screen), or any combination thereof. In some embodiments, health data comprises family medical history (e.g., family history of breast cancer). In some embodiments, health data comprises current health information such as, for example, current symptoms, current medications, and/or current illnesses or diseases. In some embodiments, health data comprises user age, height, weight, blood type, and/or other biometrics.

As used herein, "user data" refers to general information associated with a user of a device. In some embodiments, user data comprises user identity, user name, height, weight, eye color, hair color, ethnicity, national origin, religion, language(s) spoken, vision (e.g., whether user needs corrective lenses), home address, work address, occupation, family information, user contact information, emergency contact information, social security number, alien registration number, driver's license number, vehicle VIN, organ donor (e.g., whether user is an organ donor), or any combination thereof. In some embodiments, user data is obtained via user input.

As used herein, "sensor data" refers to information obtained or provided by one or more sensors. In some instances, a sensor is associated with a device (e.g., user has a communication device with a data link via Bluetooth with a wearable sensor, such as, for example, a heart rate monitor or a pedometer). Accordingly, in some embodiments, the device obtains sensor data from the sensor (e.g., heart rate from the heart rate monitor or distance traveled from the pedometer). In some instances, the sensor data is relevant to an emergency situation (e.g., heart rate during a cardiac emergency event). In some embodiments, a sensor and/or sensor device comprises an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, or any combination thereof, and in some embodiments, sensor data comprises information obtained from any of the preceding sensors. In some embodiments, one or more sensors are physically separate from a user device. In further embodiments, the one or more sensors authorize the user device to obtain sensor data. In further embodiments, the one or more sensors provide or send sensor data to the user device autonomously. In some embodiments, the user device and the one or more sensors belong to the same group of devices, wherein member devices are authorized to share data. In some embodiments, a user device comprises one or more sensors (e.g., user device is a wearable device having a sensor or sensing component).

As used herein, "communication link" refers to a communication pathway from a device (e.g., communication device) to another device or to an intermediate device (e.g., a router) on a network. In some embodiments, the communication device establishes a communication link with another device or an intermediate device to transfer information (e.g., a location of the device) or to obtain information from a recipient such as, for example, location of a first responder assigned to a request for assistance associated with the communication device (e.g., device of first responder). A communication link can refer to the point-to-point communication channels, point-to-point and end-to-end data sessions, and the physical hardware facilitating the communication channel(s) (e.g., antennas used to communicate/transmit information). In some embodiments, a data session comprises session parameters and the network route taken from one device to another device.

As used herein, "voice or speech recognition software" refers to computer programs that can recognize a person's speech to identify trigger phrases (e.g., iListen, Voice Navigator, Google Now, LilySpeech, etc.). In some embodiments, the software may be able to recognize the identity of the speaker. As used herein, "voice command" refers to words or phrases that a user may use to give command to the triggering device. The trigger phrases may be user-defined or may be from a library of phrases on the trigger device or at a remote server.

As used herein, "sound detection software" refers to computer programs for detecting trigger sounds in and around the triggering device. The trigger sounds may be user-defined or may be from a library of phrases on the trigger device or at a remote server. The trigger sounds may be sounds (alarms, breakage, gunshots, explosion, fire, car crash, etc.) or absence of sound (e.g., no heartbeat, etc.). For example, a glass break detector software may use the microphone in the trigger device to monitor any noise or vibrations to detect burglaries in a smart home. If the vibrations exceed a baseline, they may be analyzed by the software. The software may analyze frequencies typical of glass shattering and trigger an emergency alert if the sound is above a trigger threshold. In some cases, the software may compare detected sounds with glass-break profiles analysis and trigger an alert if the amplitude threshold and/or statistically expressed similarity threshold are breached. In some embodiments, an emergency is detected or triggered when a trigger sound exceeds a threshold.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

EXAMPLES

The following illustrative examples are representative of embodiments of the invention described herein and are not meant to be limiting in any way.

Just In Time, an emergency response company, aids emergency service providers (ESPs; e.g., public safety answering points, or "PSAPs") by providing a central hub for connected devices and systems (e.g., mobile phones, IoT devices, etc.) to communicate with ESPs. Through this central hub, connected devices and systems may transmit data and electronic communications to ESPs and ESPs may transmit data and electronic communications to connected devices and systems. Traditionally, PSAPs and other ESPs are only technologically capable of receiving telephone calls (e.g., 9-1-1 emergency calls) with no additional data. Thus, typically, when a person is in an emergency, they must make an emergency call (e.g., by dialing 9-1-1 in the United States) and verbally communicate the details of their emergency to a call taker at an ESP. The central hub provided by Just In Time (also referred to as an "emergency clearinghouse") provides ESPs with new and additional ways to respond to emergencies.

One of the new and additional ways to respond to emergencies provided by Just In Time's Emergency Clearinghouse is the access to emergency response assets. Emergency response assets are connected devices and systems built and maintained by various organizations (private or public) to respond to emergencies. For example, an emergency response asset may be a drone equipped with an automated external defibrillator (AED), a smart AED, a smart building system, or a vehicular telemedicine unit. Emergency response assets may provide ESPs with faster or more efficient modes of emergency response, as illustrated in the examples below.

Example 1

A PSAP in Chicago, Illinois employs an emergency response application, Nick Of Time, communicatively coupled to Just In Time's backend systems. A private company, Heart Saver, builds and maintains smart AEDs that are dispersed throughout the city of Chicago. The smart AEDs are connected devices with built-in sirens and lights that can be remotely activated in the case of an emergency. The smart AEDs also have displays that can show locations of emergencies so that, when the sirens and lights are activated on a smart AED, anyone can carry the smart AED to the appropriate location. Heart Saver maintains a backend cloud computing system that is communicatively connected to each of the smart AED dispersed throughout Chicago as well as Just In Time's Emergency Clearinghouse. Heart Saver's backend system maintains a real-time database of the location and availability of each of the smart AEDs.

In one instance, a call taker at the PSAP receives an emergency call from a person that believes that they are having a heart attack. The call taker submits the caller's location to Just In Time through the emergency response application Nick Of Time. Just In Time's backend systems receive the caller's location and automatically transmit the caller's location to Heart Saver's backend system. Heart Saver's backend system then automatically determines if there are any smart AEDs within a half mile radius of the caller's location. Two different smart AEDs are identified that are within a half mile radius of the caller's location, one west of the caller and one south. Heart Saver's backend system transmits an electronic communication to Just In Time's backend systems indicating that there are one or more smart AEDs available for the caller's location. Just In Time subsequently transmits an electronic communication to the PSAP through Nick Of Time indicating that there are one or more smart AEDs available for the caller's location, and Nick Of Time displays a selectable button within the application's graphical user interface (GUI) allowing the call taker to activate the one or more smart AEDs available for the caller's location.

The call taker selects the button to activate the smart AEDs, which prompts Nick Of Time to transmit an electronic communication to Just In Time prompting Just In Time to transmit an electronic communication to Heart Saver prompting Heart Saver to activate the sirens and lights built into the smart AEDs within the half mile radius of the caller's location. The smart AEDs have built-in locking mechanisms that keep them secured to an enclosure. Once activated, the locking mechanisms can be disengaged to allow them to be removed from the enclosure. A good Samaritan hears the siren from the smart AED to the south of the caller's location and approaches the smart AED. The AED has a digital screen that displays information about the emergency location and a request for assistance. The good Samaritan sees the information on the screen and presses a button indicating he is willing to help. This is relayed to the call taker who then communicates with the good Samaritan through an audio output of the AED to instruct him on what to do. The call taker's verbal instructions and the map showing the caller's location on the display screen built into the smart AED gives the good Samaritan the necessary instructions to allow him to carry the smart AED to the caller's location. The AED then displays visual instructions allowing the good Samaritan to operate the AED to assist the caller long before an ambulance would be able to arrive.

Example 2

A second private company, Quick Lock, installs and maintains smart building systems. The smart building systems include remotely controllable doors and remotely accessible surveillance cameras than can be activated during emergencies. Quick Lock maintains a backend cloud computing system that is communicatively linked to all of Quick Lock's smart building systems as well as Just In Time's backend systems. Quick Lock has installed their smart building systems into many public middle and high schools throughout the city of Chicago. Each smart building system has an associated geofence representing the physical territory associated with the building at which the smart building system is installed. Quick Lock proactively shares these geofences with Just In Time.

A week after the events of Example 1, the Chicago PSAP from Example 1 receives an emergency call from a caller describing an active shootout nearby. In this example, Just In Time has already received the caller's location (e.g., the caller's mobile phone automatically transmitted the caller's location to Just In Time's Emergency Clearinghouse in response to the emergency call being dialed) and has automatically communicated with both Quick Lock's backend system and Heart Saver's backend system to determine what, if any, emergency response assets are available for the caller's location. Heart Saver's backend determines that there is a smart AED within a half mile radius of the caller's location and therefore available for the caller's location, and communicates the determination back to Just In Time's backend systems. Just In Time's backend systems cross-checks the caller's location with each of the geofences associated with smart building systems received from Quick Lock and determines that the caller's location falls within a geofence associated with a middle school at which a Quick Lock smart building system is installed. Just In Time's backend systems then communicate with Quick Lock's backend system to retrieve a link to an interface for controlling the smart building system installed at the middle school.

Just In Time transmits the caller's location and electronic communications to Nick Of Time indicating that there are one or more smart AEDs as well as a smart building system available for the caller's location. Nick Of Time, accordingly, displays asset controls for activating the one or more smart AEDs Additionally, Nick Of Time highlights the geofence associated with the middle school within an interactive map displayed within the Nick Of Time GUI. The call taker at the Chicago PSAP immediately sees that the caller's location falls within the highlighted geofence associated with the middle school, and, knowing that the emergency is an active shootout, selects the asset controls to activate the smart building system installed at the middle school. The asset controls are embedded with the link to the interface for controlling the smart building system, and Nick Of Time accordingly opens the interface for controlling the smart building system within the Nick Of Time GUI. Through the interface for controlling the smart building system, the call taker is able to remotely lock all of the external doors to the middle school, increasing the likelihood no students, teachers, and school administrators at the middle school remain safe and uninvolved in the gun violence occurring outside of the school. However, knowing that the emergency is an active shooting, the call taker does not select the asset controls to activate the one or more smart AEDs available for the caller's location.

Example 3

A PSAP in Chicago, Illinois employs an emergency response application, Nick Of Time, communicatively coupled to Just In Time's backend systems. A private company, Heart Saver, builds and maintains smart UAVs carrying AEDs that are dispersed throughout the city of Chicago. The smart UAVs are connected devices with built-in sirens and lights that can be remotely activated in the case of an emergency. The smart UAVs also carry a portable 2-way communication device with a display for video chat. Each UAV is programmed to autonomously navigate close to the designated emergency location upon receiving instructions to respond to the emergency. For example, a UAV may be programmed to remain aloft at a minimum and/or maximum elevation once it reaches the (x, y) coordinates of the emergency. A remote user at Heart Saver may then be alerted in order to remotely guide the UAV to land at the emergency location. Heart Saver maintains a backend cloud computing system that is communicatively connected to each of the smart UAVs dispersed throughout Chicago as well as Just In Time's Emergency Clearinghouse. Heart Saver's backend system maintains a real-time database of the location and availability of each of the smart UAVs.

The fleet of smart UAVs are individually configured to carry various loadouts such as automated external defibrillators, blood packs, wound dressing, and other medical supplies. Some UAVs are configured with a loudspeaker enabling a remote operator to communicate through the UAV. The camera of the UAV may also capture video feed that is streamed back to the Heart Saver computing system for storage. In the event of a crime underway, the stored video footage can be preserved and tagged with the emergency alert (e.g., time stamp, emergency identifier such as the number of the phone used to request emergency assistance, and/or other identifying emergency information).

During a particular emergency, a person experiences a ventricular arrhythmia while walking on the sidewalk. The person is wearing a smart watch with a pulse/heart rate sensor, and he presses a panic button on the smart watch to request emergency assistance. The smart watch sends an emergency alert message to a local 911 dispatch center while also transmitting its current GPS location, heart rate sensor data, and smart watch identifier to a third party server, which then provides the information to the emergency management system. The EMS then provides this information to a dispatcher at a public safety answering point. The dispatcher informs first responders who are proceeding en route to the emergency location but become caught in a traffic jam. Knowing the first responders may be delayed in arriving at the emergency location, the dispatcher uses the emergency response application installed on the computing device to activate an UAV carrying a defibrillator and a portable 2-way communication device that is located at a hospital closer to the emergency location. The UAV then flies to the emergency location, activates its lights and sirens, and then lands with optional guidance by a remote operator. Upon landing, the UAV drops off its cargo loadout which is a box containing the defibrillator and 2-way communication device. The communication device broadcasts a message via its speakerphone requesting someone to pick up the device. A bystander picks up the communication device, and the dispatcher provides instructions together with video guidance shown on the display of the communication device to operate the defibrillator to correct the arrhythmia. The use of the defibrillator corrects the arrhythmia and stabilizes the patient until the first responders finally arrive and transport him to the hospital.

What is claimed is:

1. A method for determining availability of an emergency response asset, the method comprising:
   providing an emergency response application to an emergency service provider, the emergency response application comprising a graphical user interface comprising a list of incidents and an interactive map;
   receiving information regarding an emergency response asset, the information regarding the emergency response asset comprising a geofence associated with the emergency response asset;
   determining that an incident location associated with an incident from the list of incidents and displayed within the interactive map falls within the geofence associated with the emergency response asset; and
   displaying a visual indication, within the interactive map, that the emergency response asset is available for the incident.

2. The method of claim 1, further comprising:
   receiving an emergency alert comprising an emergency location;
   displaying the emergency location as the incident location within the interactive map; and
   transmitting the emergency location to an asset management system associated with the emergency response asset.

3. The method of claim 1, wherein the emergency response asset is a smart building system.

4. The method of claim 3, further comprising providing the emergency service provider with access to a video captured by a camera managed by the smart building system.

5. The method of claim 3, further comprising providing the emergency service provider with an ability to prompt the smart building system to lock or unlock a controllable door managed by the smart building system.

6. The method of claim 3, further comprising providing the emergency service provider with access to a floor plan of a building managed by the smart building system.

7. The method of claim 1, further comprising displaying the geofence associated with the emergency response asset within the interactive map.

8. The method of claim 7, wherein displaying the visual indication that the emergency response asset is available for the incident comprises highlighting the geofence associated with the emergency response asset.

9. The method of claim 1, wherein displaying the visual indication that the emergency response asset is available for the incident comprises displaying a button, within the graphical user interface of the emergency response application, configured to provide the emergency service provider with access to the emergency response asset when selected.

10. The method of claim 9, wherein the button is further configured to provide the emergency service provider with access to the emergency response asset when selected by providing the emergency service provider with access to an asset interface for controlling the emergency response asset.

11. The method of claim 1, wherein the geofence associated with the emergency response asset is a shapefile representative of a jurisdiction associated with the emergency service provider.

12. A system for determining availability of an emergency response asset, the system comprising a network component, a memory, and at least one processor operatively coupled to the network component and the memory, the at least one processor operative to:
provide an emergency response application to an emergency service provider, the emergency response application comprising a graphical user interface comprising a list of incidents and an interactive map;
receive information regarding an emergency response asset, the information regarding the emergency response asset comprising a geofence associated with the emergency response asset;
determine that an incident location associated with an incident from the list of incidents and displayed within the interactive map falls within the geofence associated with the emergency response asset; and
display a visual indication, within the interactive map, that the emergency response asset is available for the incident.

13. The system of claim 12, wherein the at least one processor is further operative to:
receive an emergency alert comprising an emergency location;
display the emergency location as the incident location within the interactive map; and
transmit the emergency location to an asset management system associated with the emergency response asset.

14. The system of claim 12, wherein the emergency response asset is a smart building system.

15. The system of claim 14, wherein the at least one processor is further operative to provide the emergency service provider with access to a video captured by a camera managed by the smart building system.

16. The system of claim 14, wherein the at least one processor is further operative to provide the emergency service provider with an ability to prompt the smart building system to lock or unlock a controllable door managed by the smart building system.

17. The system of claim 14, wherein the at least one processor is further operative to provide the emergency service provider with access to a floor plan of a building managed by the smart building system.

18. The system of claim 12, wherein the at least one processor is further operative to display the geofence associated with the emergency response asset within the interactive map.

19. The system of claim 18, wherein the at least one processor is further operative to display the visual indication that the emergency response asset is available for the incident by highlighting the geofence associated with the emergency response asset.

20. The system of claim 12, wherein the at least one processor is further operative to display the visual indication that the emergency response asset is available for the incident by displaying a button, within the graphical user interface of the emergency response application, configured to provide the emergency service provider with access to the emergency response asset when selected.

* * * * *